United States Patent [19]
Kantor

[11] 4,010,018
[45] Mar. 1, 1977

[54] ROTARY THERMODYNAMIC APPARATUS AND METHOD

[76] Inventor: Frederick W. Kantor, 2875 Broadway, New York, N.Y. 10025

[22] Filed: Apr. 18, 1975

[21] Appl. No.: 569,478

Related U.S. Application Data

[63] Continuation of Ser. No. 78,552, Oct. 6, 1970, abandoned, which is a continuation-in-part of Ser. No. 864,112, Oct. 6, 1969, Pat. No. 3,808,828, which is a continuation-in-part of Ser. No. 608,323, Jan. 10, 1967, Pat. No. 3,470,704.

[52] U.S. Cl. .............................. 62/499; 165/183
[51] Int. Cl.² ........................................ F25B 3/00
[58] Field of Search ............ 63/115, 499; 165/179, 165/183

[56] References Cited

UNITED STATES PATENTS

| | | | |
|---|---|---|---|
| 2,393,338 | 1/1946 | Roebuck | 62/499 |
| 2,451,873 | 10/1948 | Roebuck | 62/467 |
| 2,576,284 | 11/1951 | Crocchi | 62/499 X |
| 3,332,253 | 7/1967 | Alexander | 62/499 |
| 3,613,368 | 10/1971 | Doerner | 62/499 X |

FOREIGN PATENTS OR APPLICATIONS

| | | | |
|---|---|---|---|
| 418,500 | 9/1925 | Germany | 62/115 |
| 437,009 | 10/1935 | United Kingdom | 62/115 |

OTHER PUBLICATIONS

J. R. Roebuck, *A Novel Form Of Refrigerator*, Journal of Applied Physics, vol. 16, May 1945 pp. 285–295.

*Primary Examiner*—Ronald C. Capossela
*Attorney, Agent, or Firm*—Curtis, Morris & Safford

[57] ABSTRACT

Rotary thermodynamic compression and refrigeration apparatus and methods in which the mechanical impedance and/or thermodynamic impedance of the system are controlled in order to obtain stable operation. By controlling these impedances, the overall pressure drop of the fluid flow in the system is made to increase with increasing fluid flow rate, thus ensuring stable operation.

19 Claims, 76 Drawing Figures

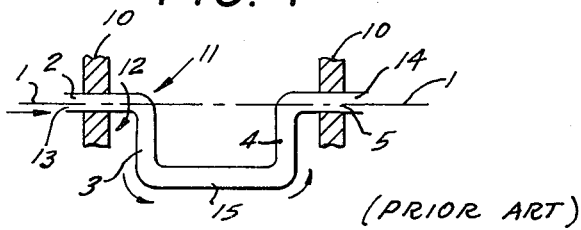
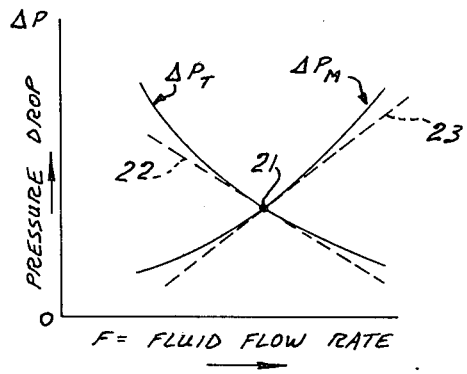
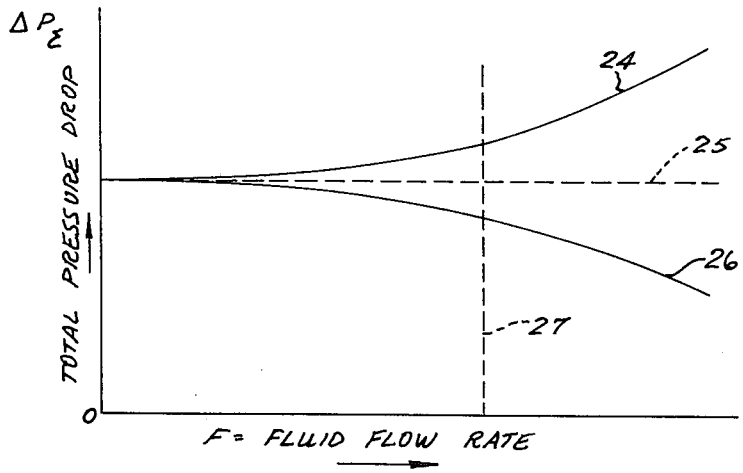
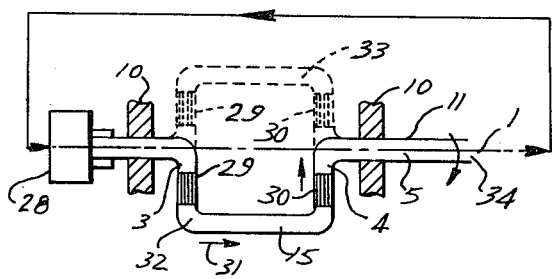
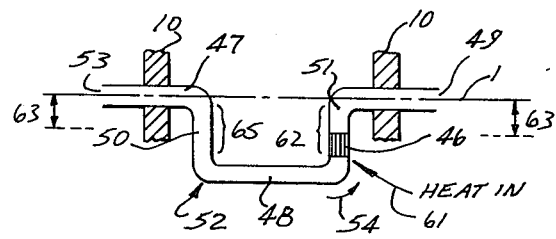

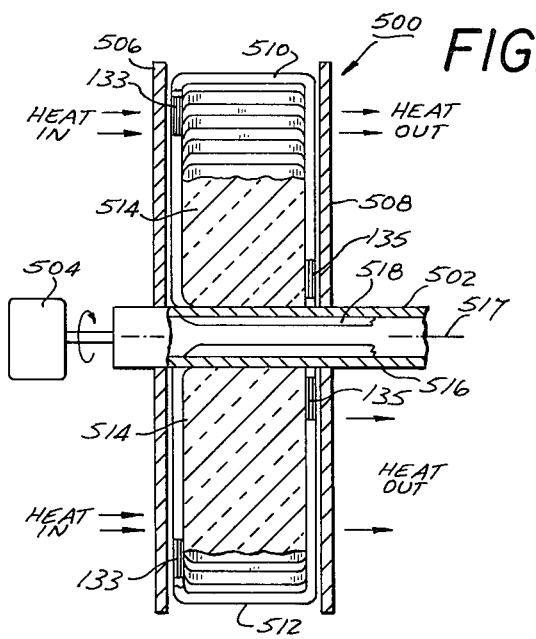
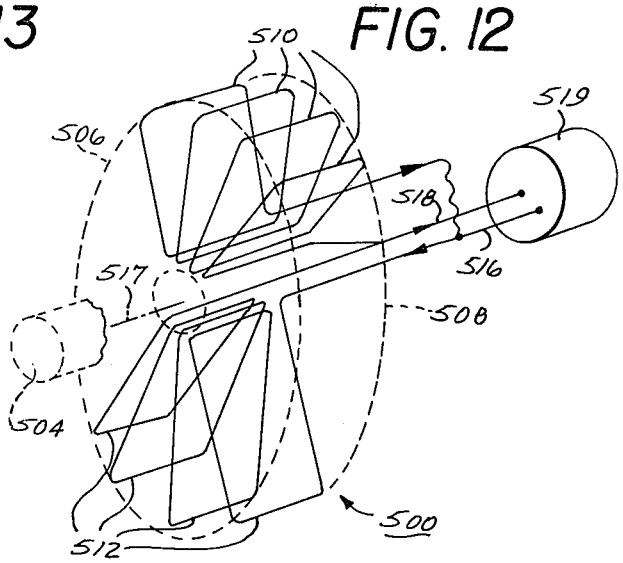
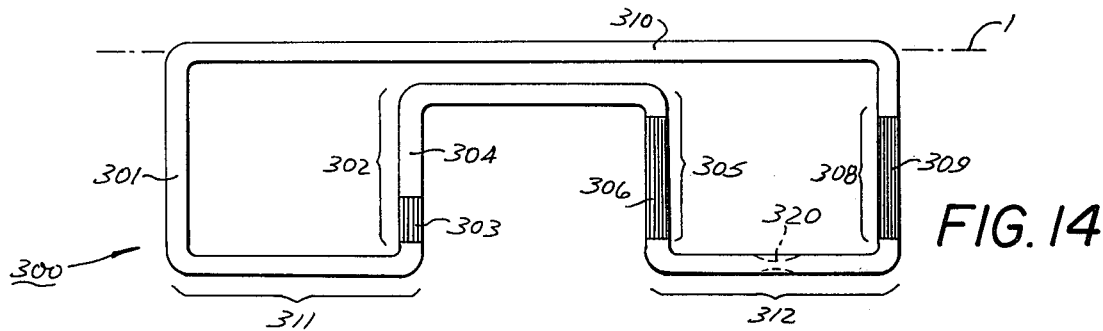
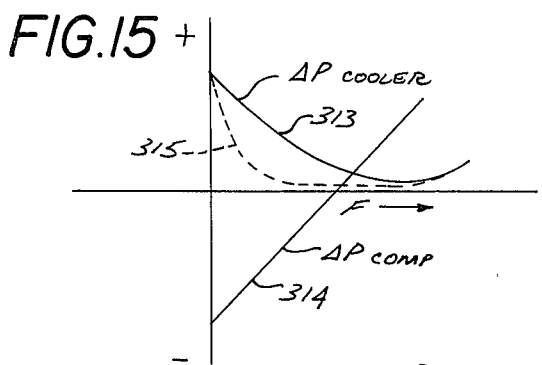
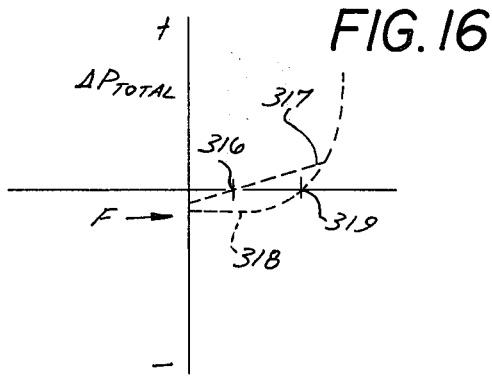
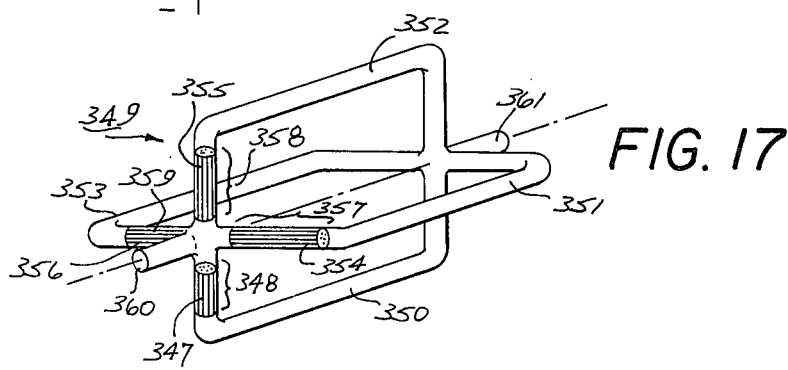

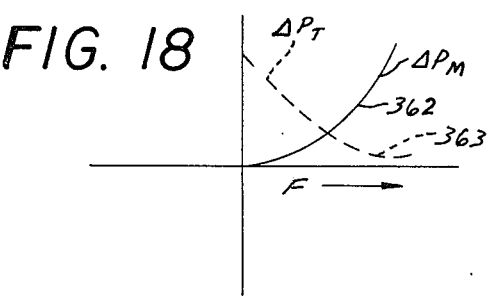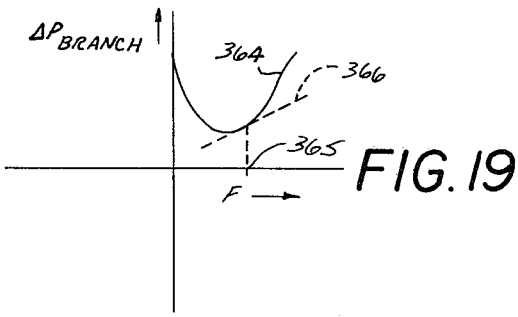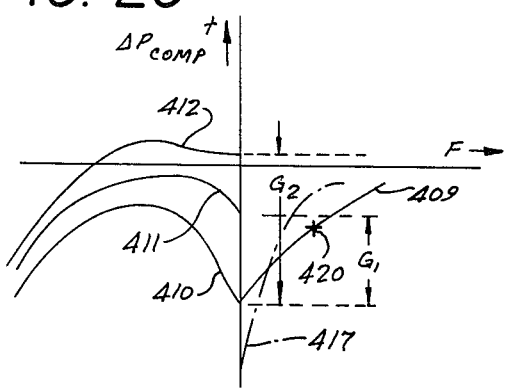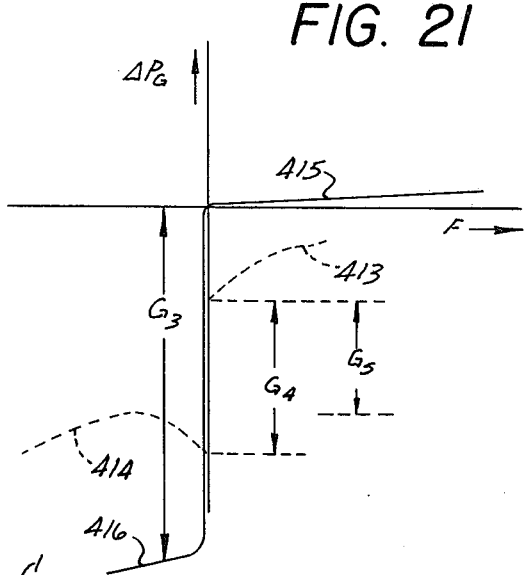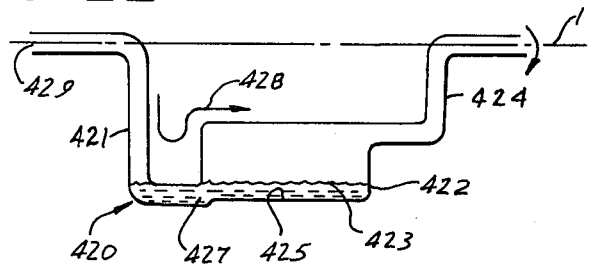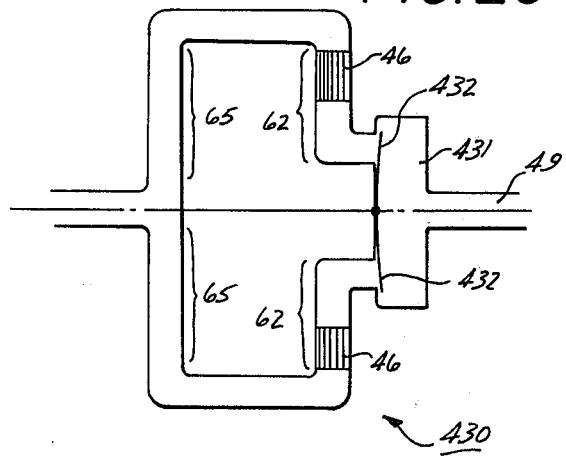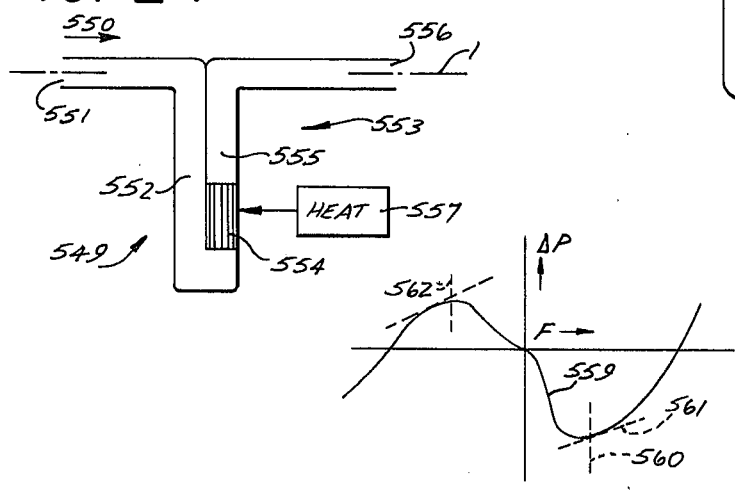

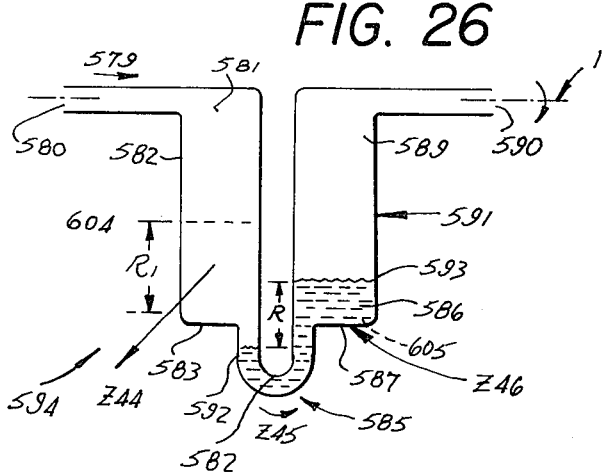
FIG. 26
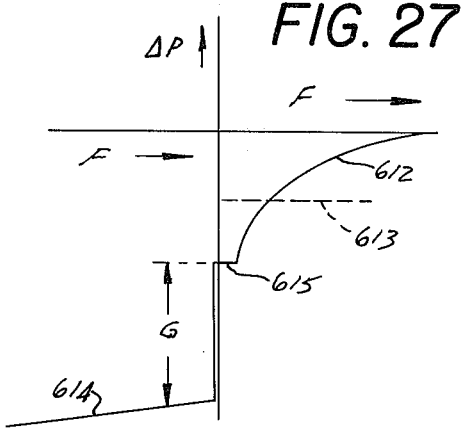
FIG. 27
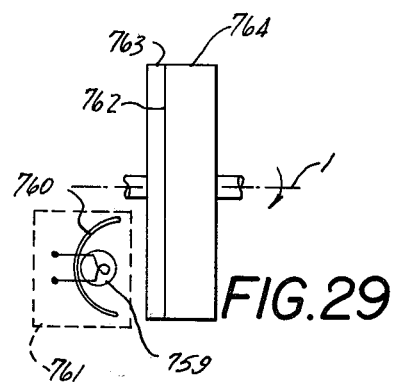
FIG. 29
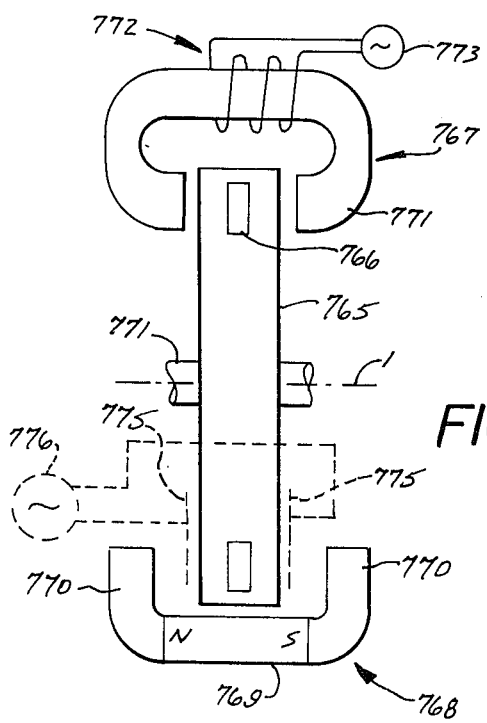
FIG. 28
FIG. 30
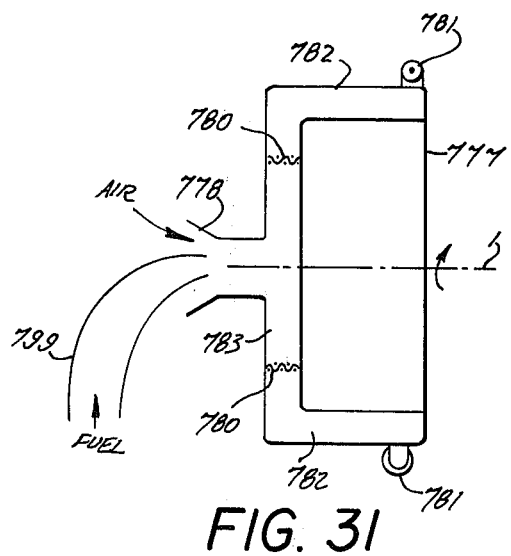
FIG. 31

FIG. 32
FIG. 33
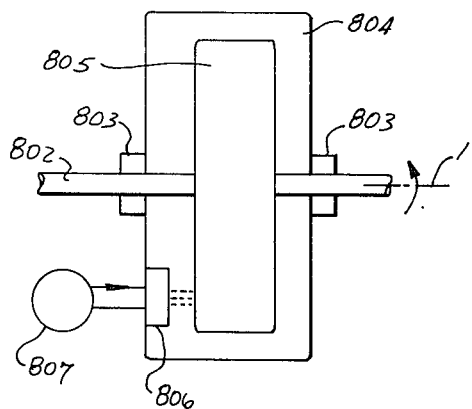
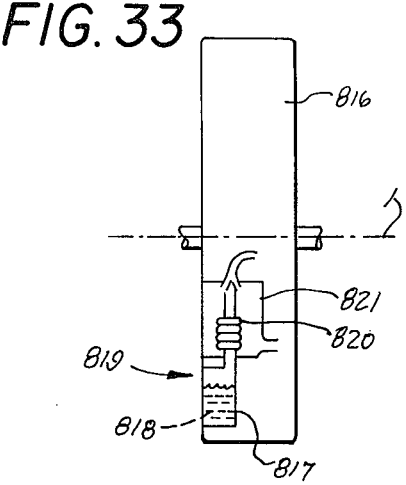
FIG. 34
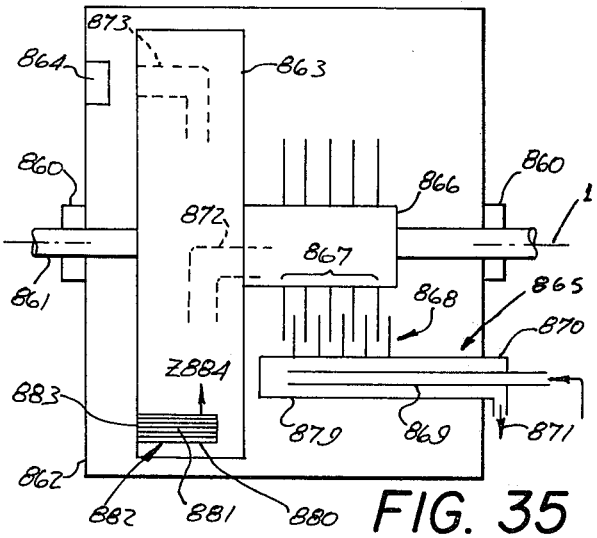
FIG. 35
FIG. 36
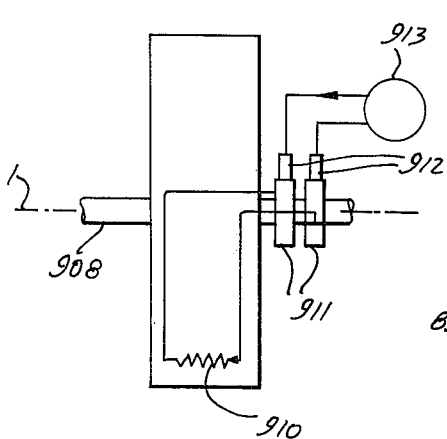
FIG. 37
FIG. 38
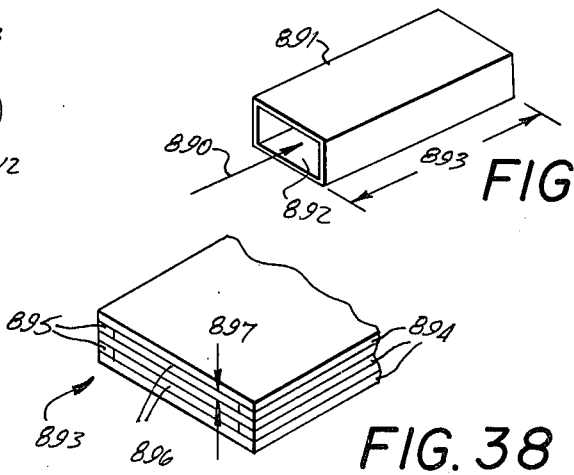
INVENTOR
FREDERICK W. KANTOR

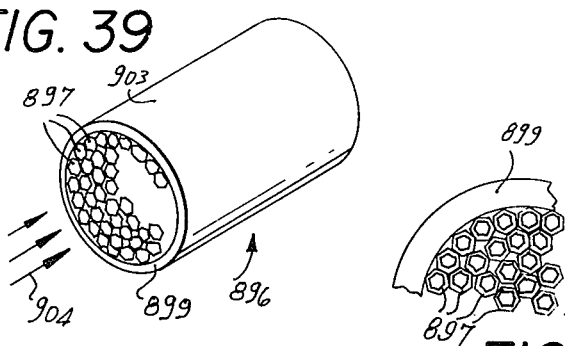
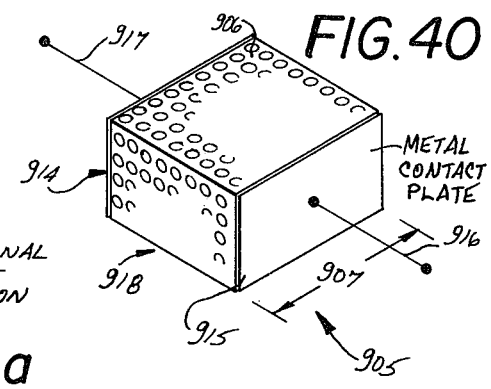
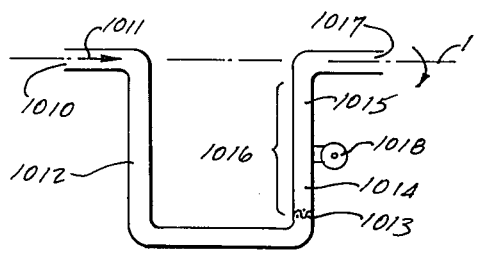
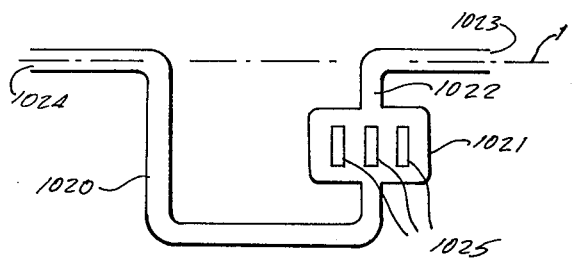
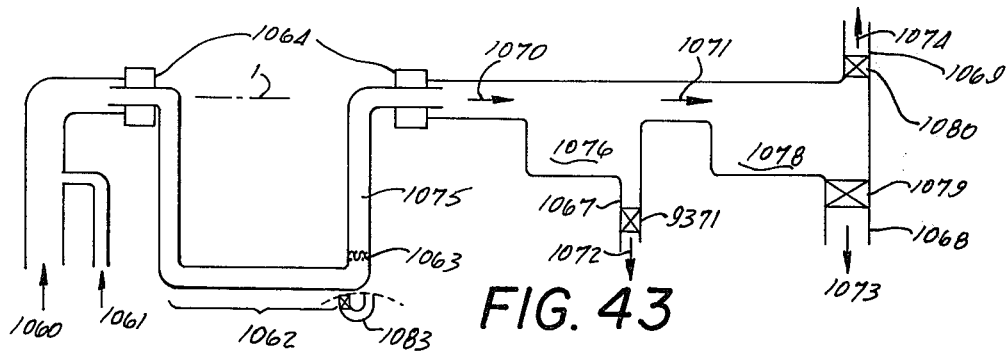
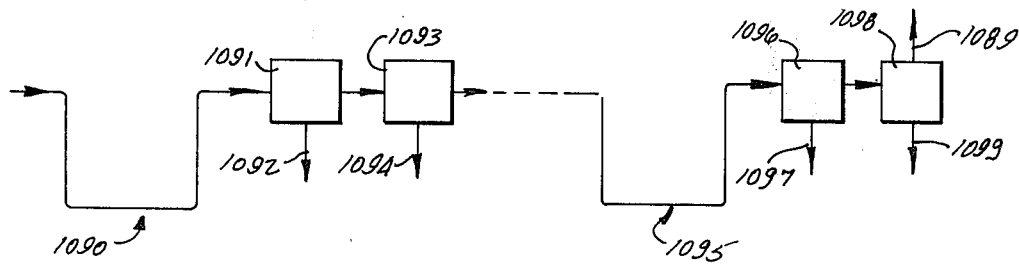
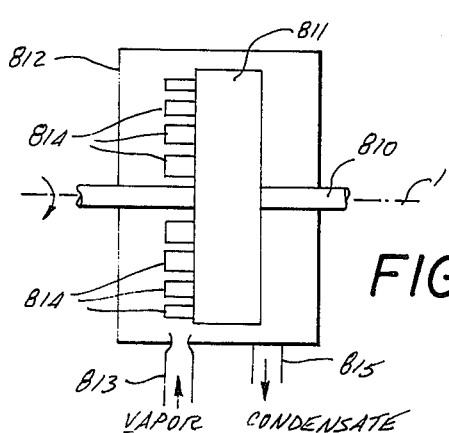

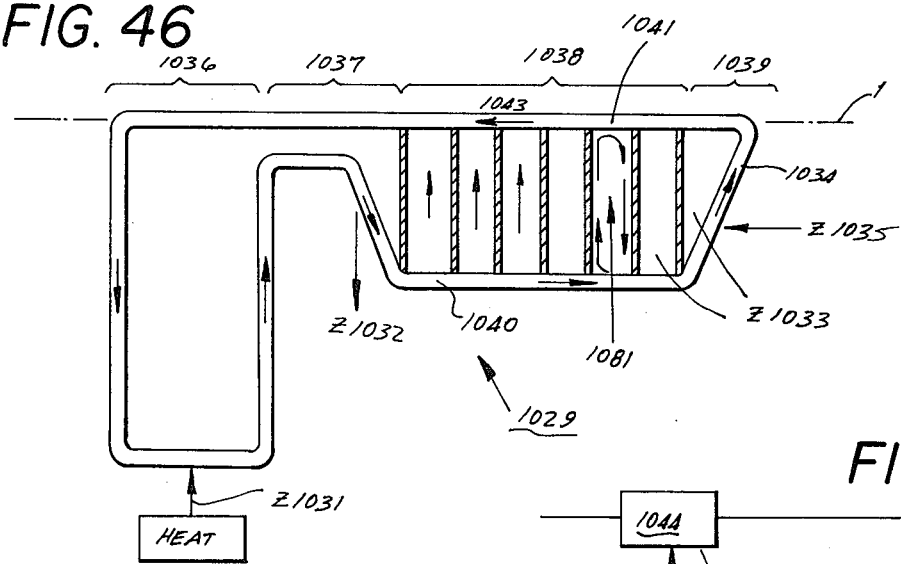
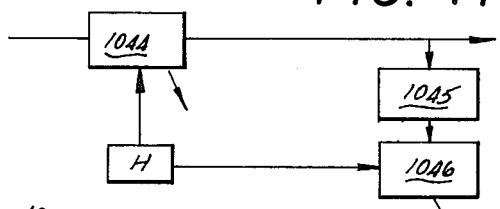
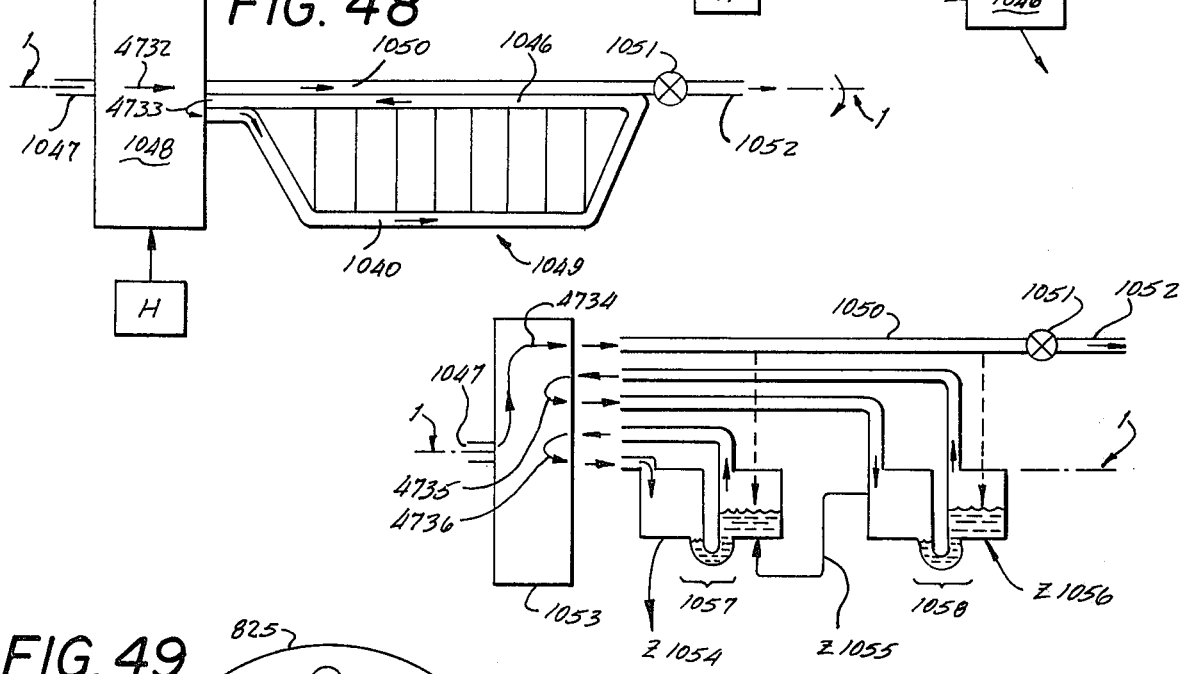
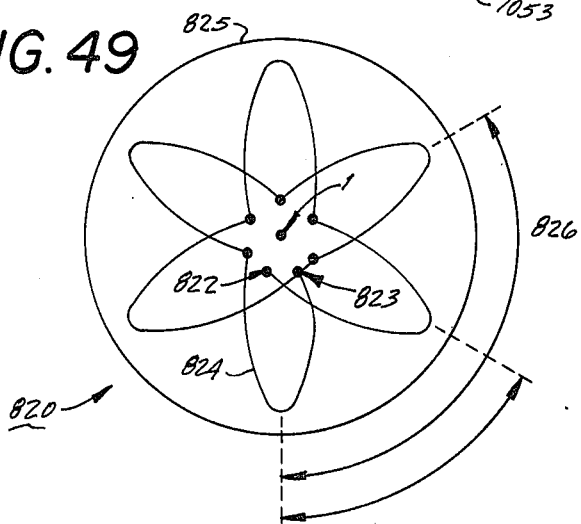

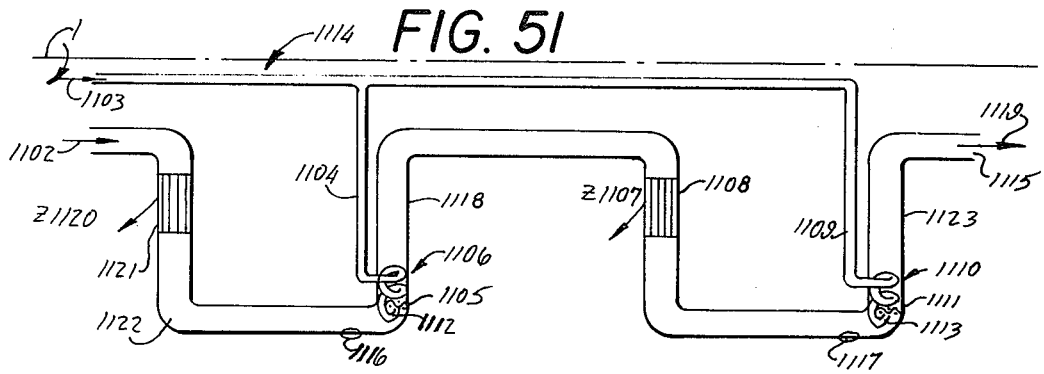
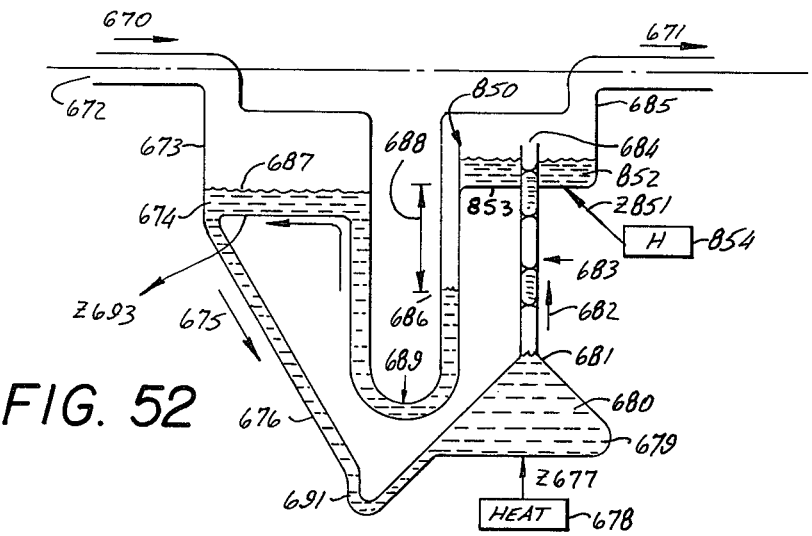
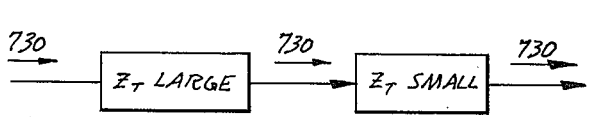
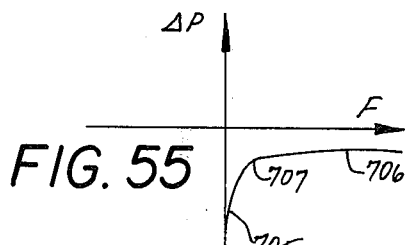
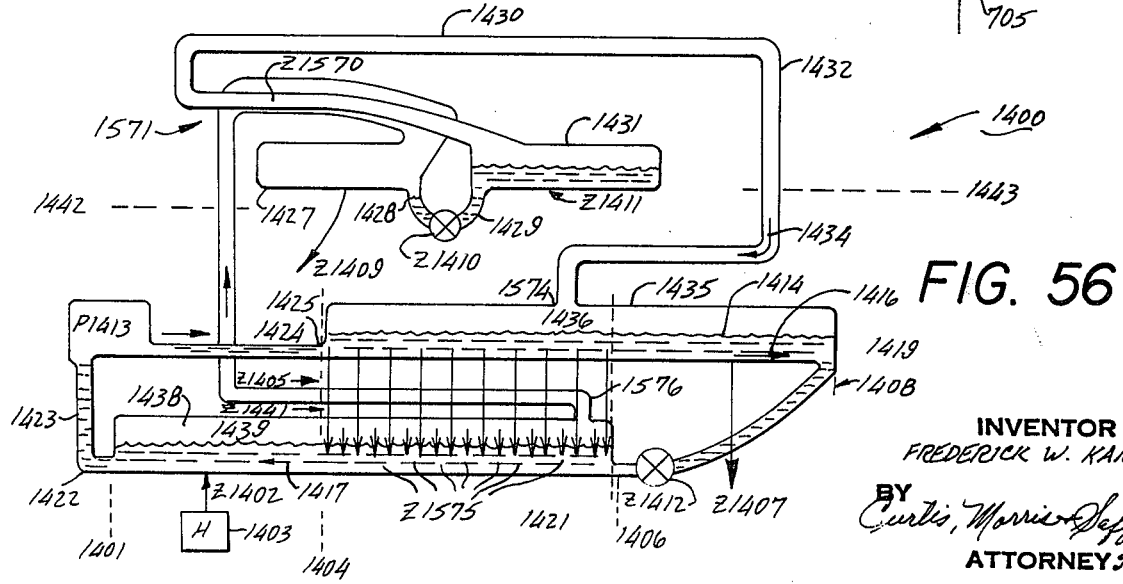

INVENTOR
FREDERICK W. KANTOR
BY
Curtis, Morris & Safford
ATTORNEYS

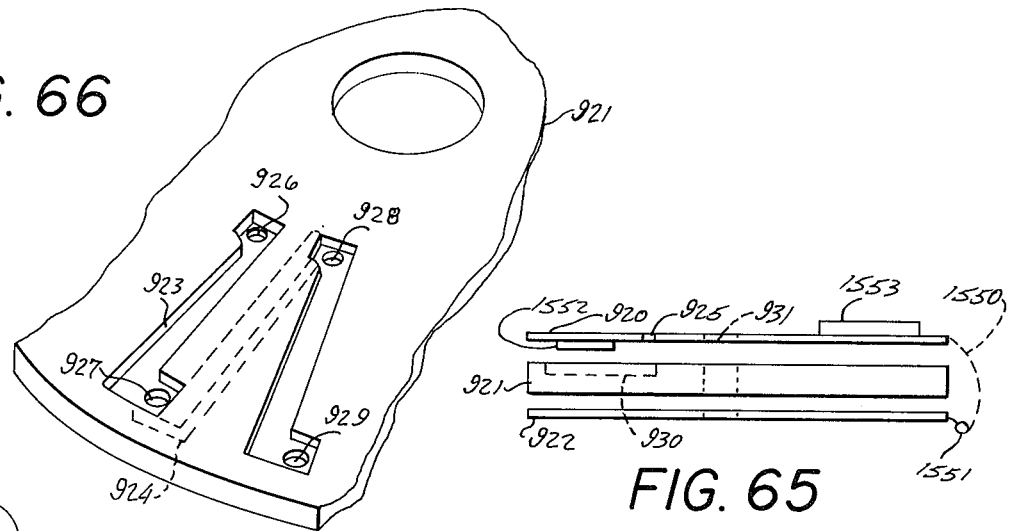
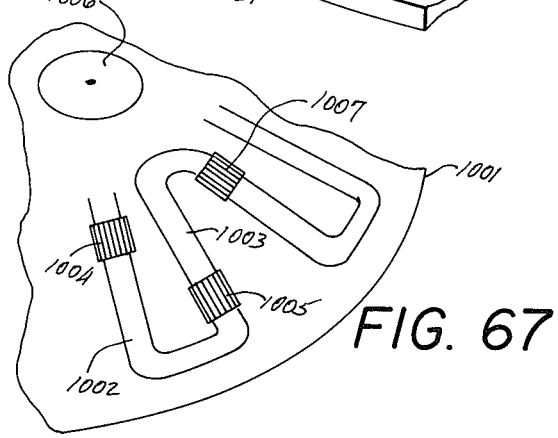
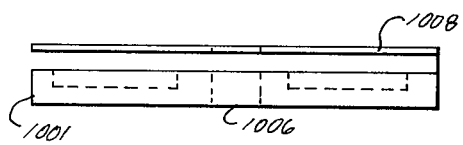
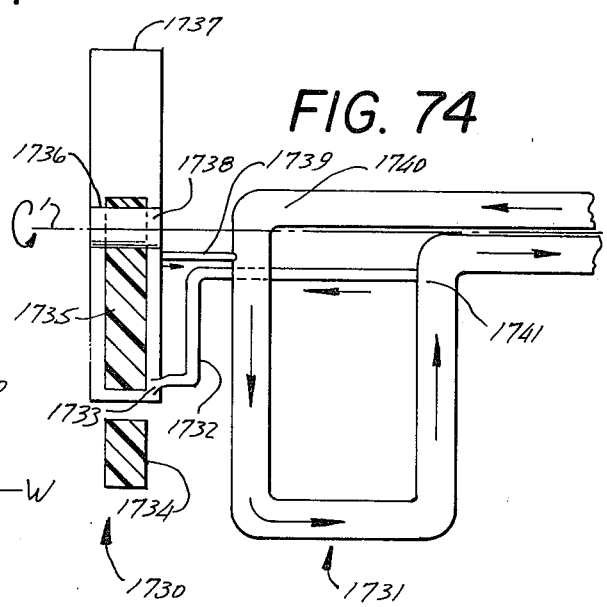
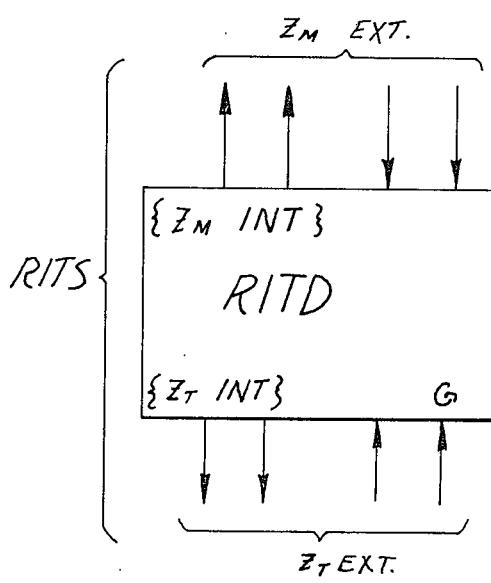

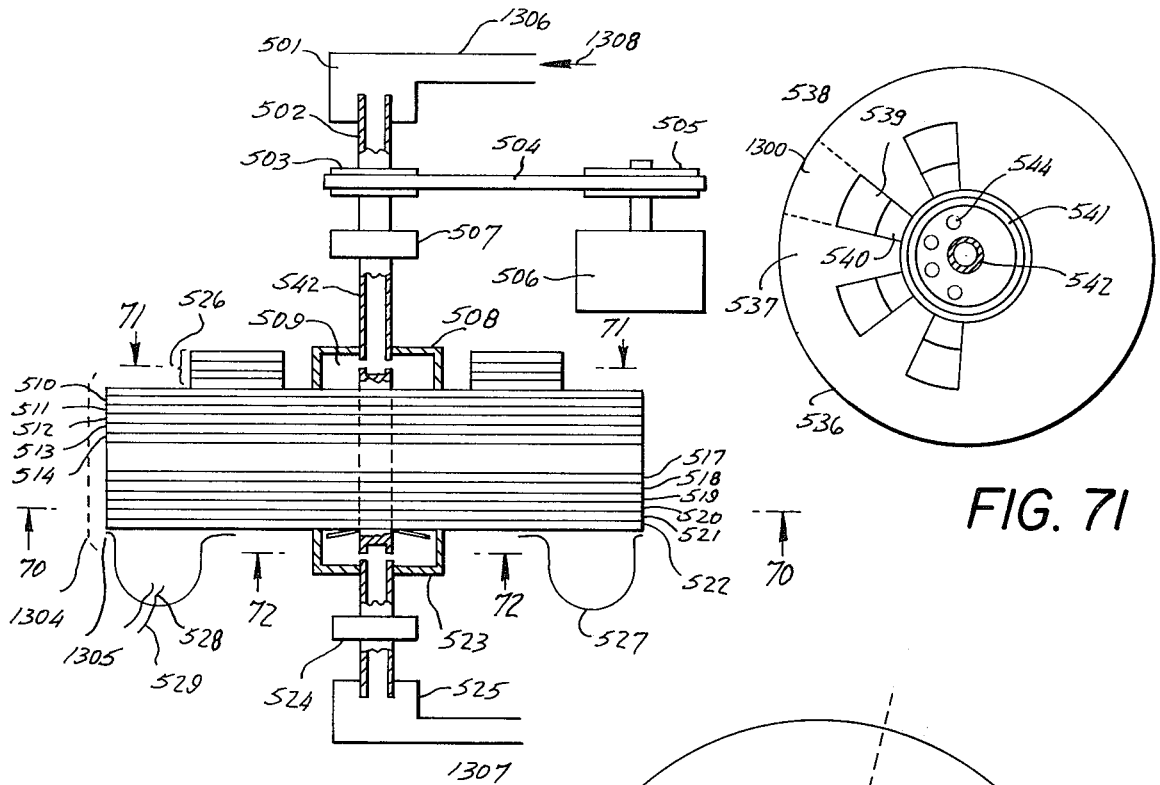
FIG. 69
FIG. 71
FIG. 70
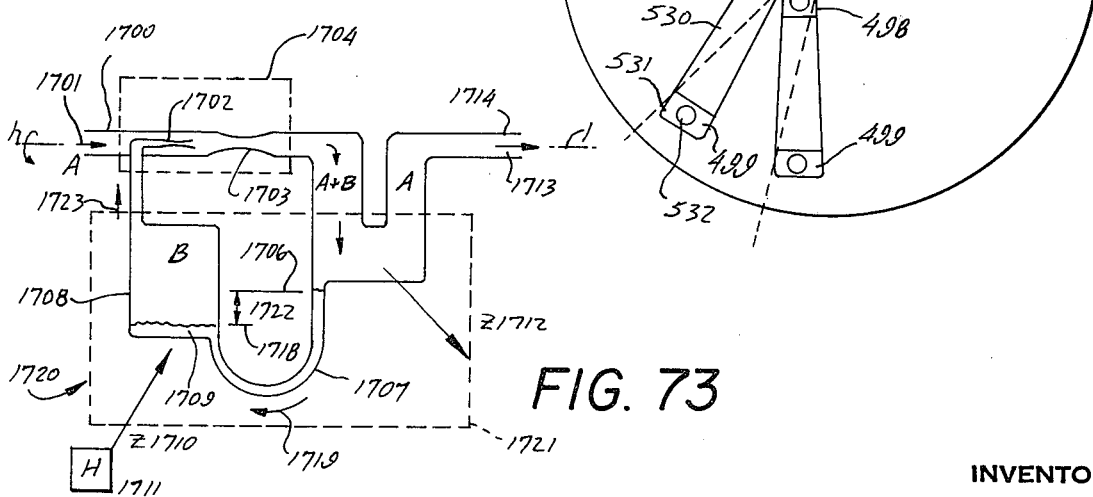
FIG. 73

ROTARY THERMODYNAMIC APPARATUS AND METHOD

CROSS REFERENCE TO RELATED APPLICATIONS

This application is a continuation of application Ser. No. 78,552, filed Oct. 6, 1970, now abandoned, which is a continuation-in-part of application Ser. No. 864,112, filed Oct. 6, 1969, now U.S. Pat. No. 3,808,828, which is a continuation-in-part of application Ser. No. 608,323, filed on Jan. 10, 1967, now U.S. Pat. No. 3,470,704, issued Oct. 7, 1969.

A theoretically higher efficient but impractical refrigerator device has been proposed in U.S. Pat. No. 2,393,338 to J. R. Roebuck, and "A Novel Form of Refrigerator" 16 Journal of Applied Physics 285–295, May, 1945 by J. R. Roebuck. The basic form of the device proposed by Roebuch is shown in FIG. 1 of the drawings. The tube 11, which is supported in bearings 10, is rotated at a very high speed about central axis 1 in the direction indicated by the arrow 12 by means of a drive motor (not shown).

Compressed air is introduced into tube 11 at its inlet 13. It travels through section 2, parallel to the axis, through section 4 towards the axis, through section 5 parallel to the axis, and exits at outlet 14. As the gas moves radially outward it is subjected to centrifugal compressive forces. While moving in the section 3, the gas is compressed and heated by the centrifugal force created by the rotation of the tube 11. At least part of the heat of compression is removed from the gas in section 3 by heat exchange means (not shown) such as water flowing in cooling coils.

While moving in section 4, the gas expands, due to the reduction of the distance of the gas from the axis 1 and the concomitant reduction of the centrifugal force acting on the remaining mass of gas between it and the axis, and the gas becomes substantially cooler due to its expansion. The cooled gas then flows out of the outlet opening 14 for use in refrigeration.

The system described above is one form of a "rotary inertial thermodynamic system", as the latter expression is used herein. In such a system is performed a "rotary inertial thermodynamic method", as that expression is used herein. Other, greatly improved forms of such a system and method are disclosed in my U.S. Pat. No. 3,470,704, issued Oct. 7, 1969, and my copending U.S. patent application Ser. No. 864,112, filed Oct. 6, 1969, now U.S. Pat. No. 3,808,828. The disclosures of that patent and application hereby are incorporated in this patent application by reference.

It is an object of the present invention to provide a rotary inertial thermodynamic system and method in which the fluid flow is stable. It is another object of the present invention to provide such a system which is relatively compact, lightweight, uncomplicated and inexpensive, and which is capable of operating under a wide variety of conditions and in a wide variety of environments.

In accordance with the present invention, the foregoing objects are met by the provision of rotary inertial thermodynamic apparatus and methods in which the flow is stabilized by controlling the impedances to fluid flow in the system so that the overall pressure drop of the fluid flow in the system is made to increase with an increasing fluid flow rate.

The foregoing and other objects and advantages will be set forth in or apparent from the following description and drawings.

In the drawings are included several graphs. It should be understood that the graphs illustrate the relationships between the variables qualitatively, and not quantitatively. In the drawings:

FIG. 1 is a schematic drawing of a prior art device;

FIGS. 2 and 3 are graphs used in explaining some of the principles of the present invention;

Figure 10:
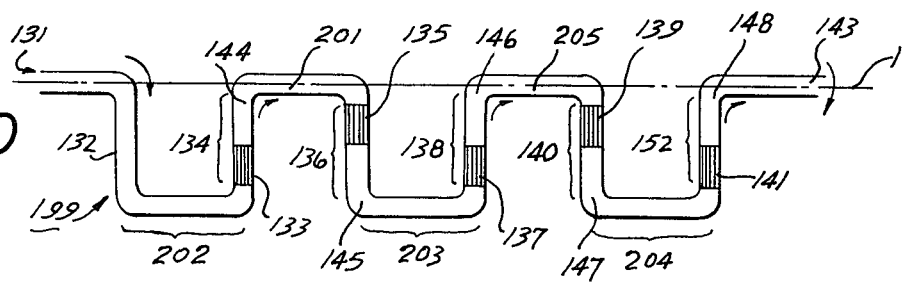
Figure 11:
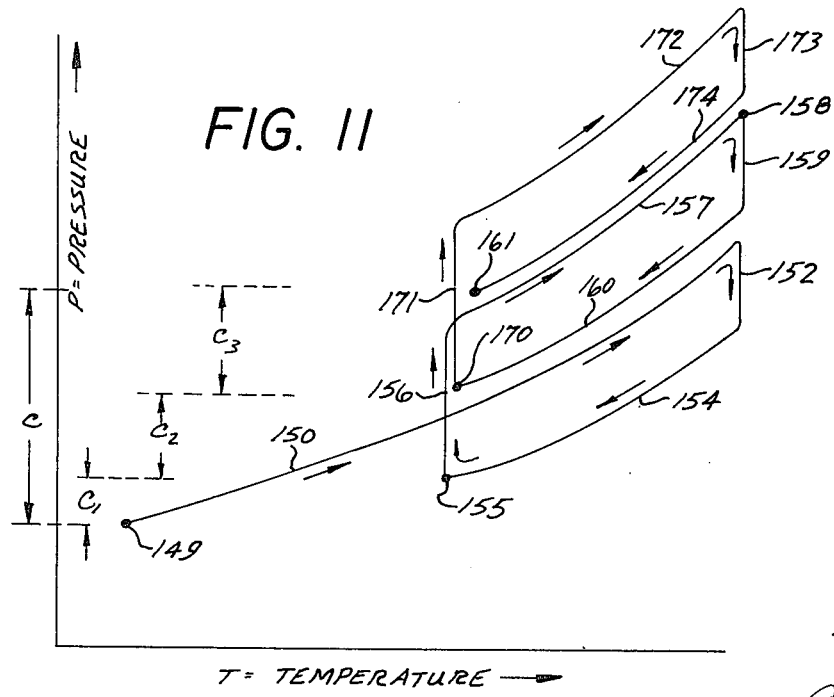
Figure 57:
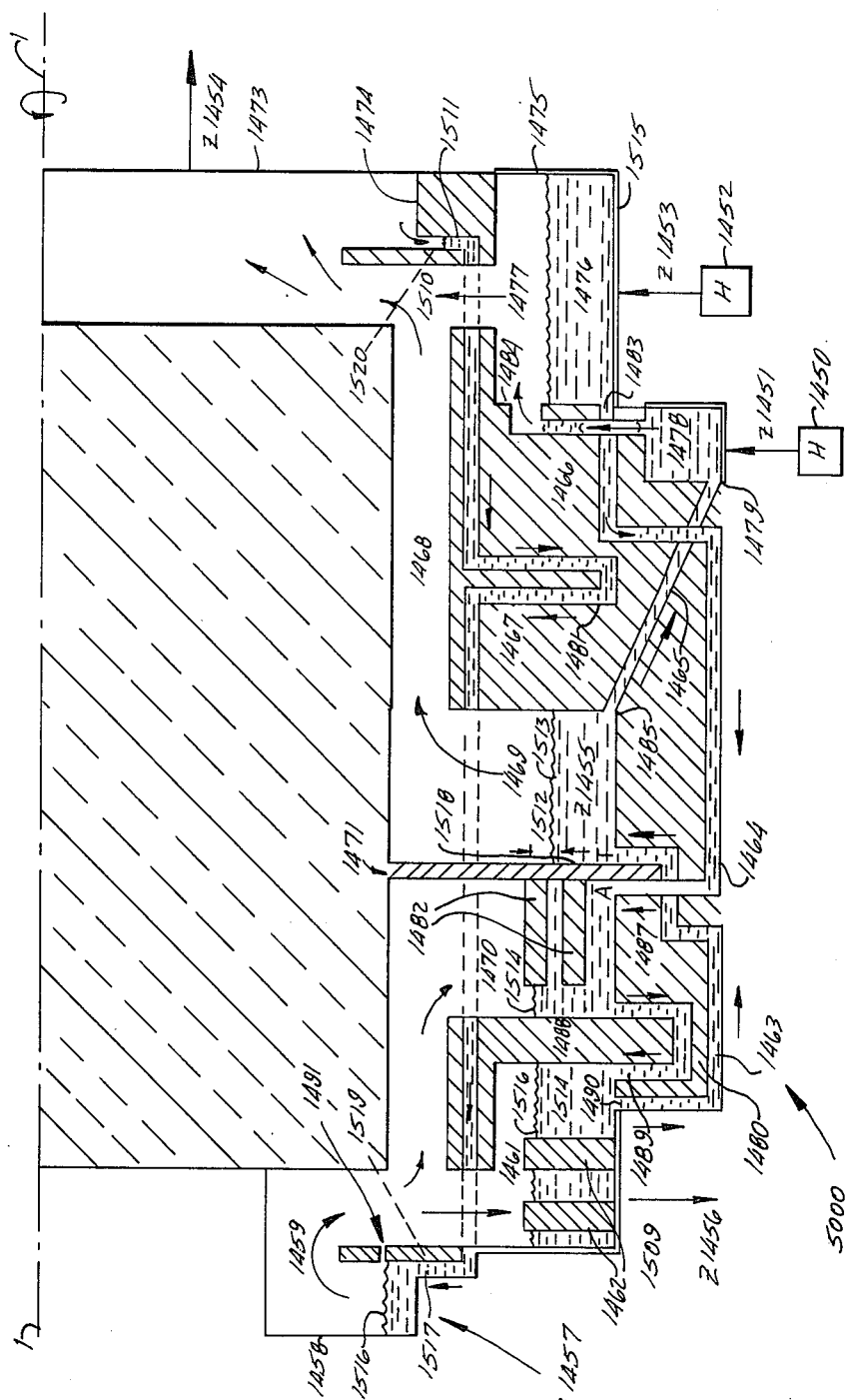
Figure 58:
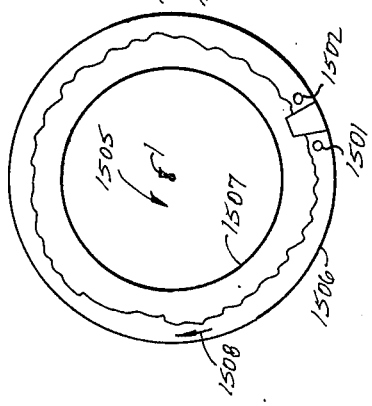
Figure 72:
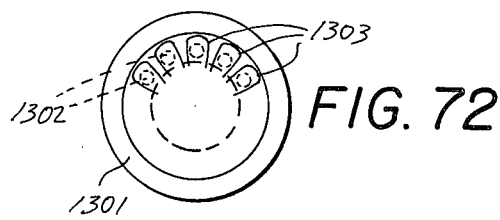

FIGS. 4 and 5 each show separate embodiments of the invention;

FIGS. 6 through 9 are graphs illustrating certain operational features of the invention;

FIG. 10 shows, schematically, another embodiment of the invention;

FIG. 11 is a graph illustrating operational principles of the embodiment shown in FIG. 10;

FIG. 12 is a schematic perspective view of a preferred form of the device shown in FIG. 10;

FIG. 13 is a cross-sectional view of the device shown in FIG. 12;

FIG. 14 is a schematic drawing of another embodiment of the present invention;

FIGS. 15 and 16 are graphs illustrating the operation of the device shown in FIG. 14;

FIG. 17 is a schematic drawing of another embodiment of the invention;

FIG. 18 through 21 are graphs depicting the operation of various embodiments of the invention;

FIGS. 22, 23 and 24 each show a further embodiment of the invention;

FIG. 25 is a graph depicting the operation of the device shown in FIG. 24;

FIG. 26 is a schematic drawing of another embodiment of the invention;

FIG. 27 is a graph depicting the operation of the device shown in FIG. 26;

FIGS. 28 through 36 each show a separate embodiment of the invention;

FIGS. 37 through 40 show various impedance control devices for the invention;

FIGS. 41 through 52 and 54 each show another embodiment of the invention;

FIGS. 53 and 55 are graphs illustrating operational features of the devices shown in FIGS. 52 and 54, respectively;

FIGS. 56 through 58 show another embodiment of the invention;

FIGS. 59 through 64 each show another embodiment of the invention;

FIGS. 65 and 66 shown another embodiment;

FIGS. 67 and 68 show another embodiment;

FIG. 69 is an elevation, partly schematic view of another embodiment of the invention;

FIG. 70 is a cross-sectional view taken along line 70—70 of FIG. 69;

FIG. 71 is a cross-sectional view taken along line 71—71 of FIG. 69;

FIG. 72 is a cross-sectional view taken along line 72—72 of FIG. 69;

FIGS. 73 and 74 each show another embodiment of the invention; and

FIG. 75 is a schematic drawing illustrating certain operational features of the invention.

General Principals of the Invention

It will aid in the understanding of this invention to divide the pressure drop in the fluid, as it flows through the rotating conduit of a rotary inertial thermodynamic system, into a "thermodynamic" component and "mechanical" component.

The "mechanical" pressure drop is caused by friction between the fluid and the walls of the conduit it flows in. The mechanical pressure drop increases with F, the fluid flow rate in the system. FIG. 2 shows a curve $\Delta P_M$ which describes the typical variation of mechanical pressure drop with flow rate in the device of FIG. 1.

The mechanical pressure drop can be thought of as the pressure drop due to the "mechanical impedance" to flow through the system.

The second component of total pressure drop is the "thermodynamic pressure drop", $\Delta P_T$. This component of the total pressure drop is that caused by thermodynamic conditions of the flow. One example of such a pressure drop is that caused by the difference in the temperatures of the gas in the tube sections 3 and 4 in the device shown in FIG. 1. The gas in section 4 is cooler and, therefore, denser than the gas in section 3. Therefore, the back pressure created by centrifugal action on the gas in section 4 is greater than the forward pressure (i.e., pressure tending to encourage flow in the direction indicated by the arrows in FIG. 1) created by the same centrifugal action on the gas in section 3, with the result that there is a net pressure drop due to this temperature difference. Other examples of thermodynamic pressure drops will be given below.

In FIG. 2, curve $\Delta P_T$ describes the typical variation of the above-described type of thermodynamic pressure drop with F, flow rate, for the device of FIG. 1. It can be seen that $\Delta P_T$ decreases with increasing flow rate, and the curve $\Delta P_T$ thus has a negative slope. The reason for this is that as the flow rate increases, the amount of heat removed from the gas flowing in tube section 3 decreases due to the fact that there is a decreasing amount of time for the heat exchange means to extract heat from each portion of gas passing through it. Thus, the temperature difference between the gas in sections 3 and 4 decreases and the thermodynamic pressure drop decreases.

The thermodynamic pressure drop can be thought of as the pressure drop caused by the "thermodynamic impedance" to fluid flow through the system.

In order to calculate the mechanical and thermodynamic impedances of the system, an operating point such as point 21 in FIG. 2 is selected. Then tangents 22 and 23 to the curves are drawn. For small fluctuations of flow rate or pressure drop near the operating point 21, the thermodynamic flow impedance is proportional to the slope of line 22, and the mechanical impedance is proportional to the slope of line 23.

In accordance with one basic principle of the present invention, it has been found that stability of the overall rotary inertial thermodynamic system can be maintained if the total mechanical and thermodynamic impedance of the system is positive (for small fluctuations about an operating point); that is, if the total pressure drop in the system increases with increasing flow rate. This relationship is illustrated in FIG. 3. Curve 24 represents a typical system with a total impedance characteristic which is positive; i.e. the pressure drop across the system increases with increasing flow. Curve 25 represents a system having a total pressure drop which is independent of flow rate. Curve 26 represents a system having a total pressure drop which decreases with increasing flow. For a given flow rate, e.g., the rate at line 27, the following conditions exist.

MECHANICAL IMPEDANCE CONTROL

The system represented by curve 24 can operate stably. Any disturbance which tends to increase the flow gives rise to an increasing pressure drop through the system, which tends to reduce the flow. However, a system of the type described by curve 25 is not stable. A small purturbation of its operation, which would tend to increase the flow, does not give rise to a corresponding increase in pressure drop to restore the system to its initial condition. All decreasing curves, of which 26 is representative, describe systems whose operation is unstable, i.e. any purturbation of the system which tends to increase the flow gives rise to a reduced pressure drop which, in turn, allows the flow to increase further. There is no restorative mechanism to preserve the operation of the system at a stable level of flow.

There are several ways in which the operation of a rotary inertial thermodynamic system can be stabilized in accordance with the above-stated principles. One of these is to increase the mechanical impedance to flow, so that there is a composite impedance which has a rising characteristic at the operating point, 27. Another alternative, and one which can be more desirable from the standpoint of efficiency and flexibility of operation, is to reduce the thermodynamic impedance and its associated characteristic time lag for the exchange of heat so that, again, the system has a composite impedance displaying a rising characteristic curve, but achieves this condition without sacrifice of flow capability or mechanical efficiency.

FIG. 4 illustrates two different mechanisms by means of which stability of the system illustrated in FIG. 1 can be assured. Both use the principle of increasing the relative mechanical impedance so that it dominates the thermodynamic impedance, thus assuring a positive total impedance.

The first way in which a high mechanical impedance might be obtained is by using a stationary positive displacement pump 28 as the gas compressor. Such a pump is, for example, a reciprocating piston pump, a sliding vane pump, or any other pump offering high impedance to the flow of gas to the system from the pump. Cold air from the rotary portion of the system flows through refrigeration apparatus (not shown) including heat exchange means using the cold gas for cooling. Appropriate rotary seals are used to provide a gastight coupling between the rotary and stationary portions of the system. Relatively dense gases, such as "Freon 12" can be used to reduce the required rotational speed of the device. The very high impedance of the pump provides the positive impedance which stabilizes the system. It should be pointed out that this means of stabilization is not the preferred means, as will be more fully explained below.

Another stabilizing means shown in FIG. 4 is the use of a heat exchanger 29 of a form which restricts the gas flow in conduit 11 and thus adds a considerable amount of mechanical impedance to the system, and, therefore, reduces the thermodynamic impedance relative to the mechanical impedance, and gives a positive total impedance characteristic to the system. For example, the heat exchanger 29 can be a porous, thermally conductive plug such as a sintered metal plug; or one with a multiplicity of fine conduits. Metal bodies with many tiny conduits can be formed by use of the technology utilized in the production of grids for vacuum tubes by extrusion of a composite body and subsequent etching of material from this body to leave fine passages. Other exchanger structures include very finely-formed fin structures produced by extrusion, hobbing, or any of a wide variety of other techniques well known in the art of constructing heat exchange devices, and in the art of constructing mechanical damping devices to provide impedance to the flow of a gas. Of course, the device 29 should function well as a heat exchanger in order to efficiently remove the heat of compression from the gas in section 3 of the tube 11.

A useful modification of the latter embodiment also is shown in FIG. 4. In this modification, one or more additional conduit sections 33 is connected in parallel with the first such section. The sections preferably are added in opposed pairs in order to maintain rotational balance of the rotary portion of the system. A porous plug 29 or similar restrictor is located in the outwardly-extending section of each such parallel section. Thus, each separate section contains its own stabilizing means. This has the advantage of preventing unequal sharing of the fluid flow or even reversal of flow in some sections, which well might occur if the only stabilizing means were a single high-impedance external pump 28. Additional plugs 30 can be inserted in the inwardly-extending portions of the conduits to add further stabilization.

SINGLE-STATE IMPEDANCE-CONTROLLED THERMODYNAMIC COMPRESSOR

FIG. 5 illustrates the basic features of a compressor constructed in accordance with the present invention. Thermodynamic compressors of this type are described in my U.S. Pat. No. 3,470,704 and in my copending application Ser. No. 864,112, now U.S. Pat. No. 3,808,828, as utilized in a sealed, closed-circuit rotating thermodynamic system to provide the actuating pressure to operate refrigeration apparatus.

Figure 6:
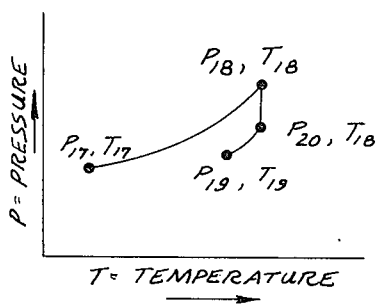

FIG. 6 is a graph showing the qualitative relationships between the pressure P and temperature T of the gas in the compressor of FIG. 5. Referring to both FIGS. 5 and 6, a tube 52 like the tube 11 in FIG. 1 is provided, and is rotated as is the FIG. 1 device. Gas enters tube 52 at an inlet 53 at a pressure $P_{17}$ and a temperature $T_{17}$. During the motion of this gas radially outwardly through tube section 50, the pressure and temperature increase essentially adiabatically to a new pressure and temperature, $P_{18}$, $T_{18}$, corresponding to the pressure and temperature at location 48 in FIG. 5. Then, the working fluid returns towards the axis through tube section 51. In tube section 51 is located heat exchange means 46, such as a porous plug, which is provided to conduct heat from a source (not shown) in the direction of arrow 61 into the working fluid to maintain the working fluid at the temperature which it had reached during the adiabatic compression and which it possessed at location 48. Due to the heat exchanger 46, the expansion of the working fluid in part of tube section 51 is essentially isothermal and is represented by the isothermal decrease in pressure to $P_{20}$, $T_{18}$, shown in FIG. 6. In the remainder of section 51, the pressure and temperature drop to $P_{19}$, $T_{19}$. At each radial distance from the axis of rotation 1 in FIG. 5, a volume element in tube section 51 is at a higher temperature than a corresponding volume element at a corresponding radial distance from axis 1 in tube section 50. Therefore, the density in such a volume element in tube 51 is lower than that of its corresponding element in tube 50. Centrifugal forces acting upon the column of gas extending radially in tube section 51 exert a smaller total backward pressure than the forward pressure exerted by centrifugal forces acting on the denser column of gas in tube section 50. This gives rise to a net forward driving pressure which drives gas through the system in the direction indicated by arrow 54, i.e. $P_{19}$ is greater than $P_{17}$. Also, $T_{18}$ is greater than $T_{17}$. Thus, this device acts as a thermodynamic compressor which can be expected to have high thermodynamic efficiency.

Figure 7:
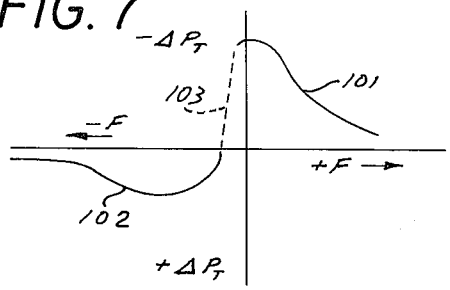

The same physical effects that give rise to a relationship between thermodynamic pressure drop and flow rate for working fluid in a refrigeration system of the type shown in FIG. 1, also give rise to a pressure and flow relationship in the case of a compressor of the type shown in FIG. 5. The compression arises from a difference in temperature between gases in tube section 51 and tube section 50 in FIG. 5. This temperature difference is maintained by a flow of heat into the working fluid as indicated at 61. This flow of heat is not instantaneous, that is, there is a characteristic time lag associated with the process of heating the fluid. The faster the flow of working fluid through the system, the less exposure time the working fluid through the system, the less exposure time the working fluid has in heat exchange means 46. This results in less effective heat exchange and a smaller temperature difference between the working fluid in tube section 51 and that in tube section 50. Because of this, the thermodynamic pumping action of this pump decreases with increasing flow rate. FIG. 7 shows the relationship between the flow rate F and the pumping pressure $\Delta P_T$ produced by the compressor shown in FIG. 5. The above-described behavior is indicated generally in FIG. 7 by curve portion 101, which represents a decrease in thermodynamic pumping pressure with increase in flow.

For the purpose of explanation, suppose that we were to force working fluid backwards through this pump against the pressure gradiant maintained by the thermodynamic pumping action. In that case, the working fluid would be flowing in the direction opposite to that indicated by arrow 54 in FIG. 5. The first consequence of this reversal in direction of flow is that the portion of tube section 51 which is located between heat exchanger 46 and the axis 1 no longer contains heated working fluid. The working fluid heated by heat exchanger 46 is carried radially outwardly and returns towards the axis 1 in tube section 50. Tube section 50 thus contains heated working fluid. The region 48 of the tube 52, which is located further from the axis 1 than the radius 63 of the radially outermost point of heat exchanger 46, can be regarded as an adiabatic region containing heated working fluid whose temperature and pressure depend only upon the radial distance of the point at which temperature and pressure are measured from the axis of rotation 1. The working fluid returns to axis 1 in tube section 50, and its expansion therein can be regarded as essentially adiabatic. In the tube section 65, between radial distace 63 and the axis 1, the temperature of the working fluid in tube section 50 is greater than the temperature of the working fluid in tube section 51 at corresponding radial location. For this reason, the working fluid in tube section 65, when acted upon by centrifugal forces, exerts a smaller pressure in the direction indicated by arrow 54 than does the corresponding body of working fluid in tube section 51, in the direction opposite to the arrow 54. For this reason, there is a net pumping action in the reverse direction. This is depicted graphically in FIG. 7 by curve segment 102. As the flow rate in the reverse direction is increased, the working fluid passing through heat exchanger 46 interacts less efficiently with it. One consequence of this is that the working fluid reaches its maximum temperature just at the point where it leaves the heat exchanger. For this reason, the working fluid in tube section 65, at those radii corresponding to locations within tube section 51 occupied by heat exchanger 46, has a higher temperature than does the working fluid within the heat exchanger itself. For this reason, it is possible for the pumping action to increase for working fluid flowing more quickly in the reverse direction. If the flow of the working fluid backwards is made very great, the effect of heat exchanger 46, in changing the temperature of the working fluid passing through the system, becomes essentially negligible. In that case, there is no physical effect of temperature difference, and the thermodynamic pumping pressure differential goes asymptotically to zero for large flows.

The most pronounced feature illustrated by FIG. 7 is that the thermodynamic pumping mechanism can work to pump working fluid in either the positive flow direction or the negative flow direction. There is a narrow region within which the pressure of the thermodynamic pumping action in the two different directions is joined, here designated by dashed curve segment 103. The details of the form of curve segment 103 depend upon the details of heat exchange and convection and are profoundly affected by the geometry of the device. However, essentially none of the possible variations of the geometry can stabilize the system at the zero flow point. Note that the pumping effect is an increase in pressure at the output compared to the pressure at the intake for the pumping system. For this reason, it has a negative sign, compared to a mechanical resistance to flow, and is designated in FIG. 7 by $-\Delta P_T$.

Figure 8:
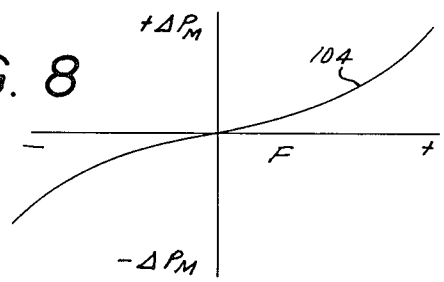

FIG. 8 illustrates the relationship between the flow rate F and the mechanical pressure drop $\Delta P_M$ in the device of FIG. 5. Mechanical resistance to flow always opposes the flow, i.e. for a positive flow there is a positive drop in pressure, taking the inlet pressure minus the outlet pressure. Using that convention, for a positive flow there is a positive $\Delta P_M$, and for a negative flow a negative $\Delta P_M$. This is indicated schematically by curve 104 in FIG. 8. Note that in the region near zero flow rate where there is the greatest problem in stabilizing the thermodynamic compression mechanism, the effect of the mechanical impedance to flow is the least.

Figure 9:
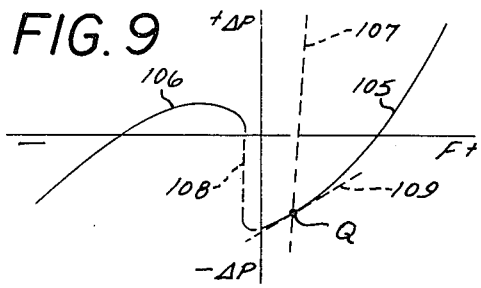

The overall performance of a single pumping loop of the type illustrated in FIG. 5 is represented graphically in FIG. 9. $\Delta P$ in FIG. 9 is the total pressure difference, defined as pressure at inlet 53 minus pressure at outlet 49, for compressor 52 in FIG. 5. $\Delta P$ is defined as the algebraic sum of the mechanical pressure and the thermodynamic pressure differences, observing the sign convention defined above. Curve portion 105 in FIG. 9 represents flow in the forward direction, and portion 106 represents flow in the reverse direction. The curve portion in the fourth quadrant represents operation of the system as a compressor, driving its own flow in the forward direction. The region in the second quadrant represents the compressor driving its own flow in the reverse direction. $\Delta P$, for small reverse flow, is represented very approximately by dashed curve portion 108. The intersection of a line 107 and line 105 is a selected operating point Q, with flow $F_Q$ and compression $C_Q$. The following equation expresses the relationship between C and F: $C = -\Delta P(F)$, when $\Delta P(F)$ is a function of the flow F. Line 109 is tangent to curve 105 at the operating point Q, and the slope of line 109, for small fluctuations of flow near point Q, gives a measure of the rate of change of $\Delta P$ with F. It can be seen that the tangent line 109 is positive. Thus, the compression C which serves to drive the flow F in the forward direction decreases with increasing flow. For this reason, operation of the system at the selected operating point Q, is stable with respect to small fluctuations in flow. A fluctuation tending to increase the flow decreases the driving compression available to continue the flow. This allows the flow to return to its original value. Similarly, a fluctuation which tends to decrease the flow increases the amount of compression available to drive the flow, which in turn restores the flow to its original value. It is important to select the operating point Q far enough from the zero flow point so that fluctuations in the temperatures and pressures of operation of the system will not produce an excursion in the flow rate sufficient to take the flow from its selected operating point through the zero value and force the system into operation in a reverse flow mode.

One of the most important single aspects of the operation of a rotary inertial thermodynamic compressor of the kind shown in FIG. 5 is that stable operation requires that the forward flow be substantially different from zero. Thus, stable operation of the compressor requires that the external impedance not be so large in relation to the internal impedances of the compressor as to reduce the flow to such a small level that the fluctuations in the pressure generated by the compressor or in the pressure reflected by the external load would force the flow of working fluid to reverse, even briefly.

CASCADED IMPEDANCE-CONTROLLED THERMODYNAMIC COMPRESSOR

FIG. 10 shows, schematically, a compressor 199 in which several single-loop compressors of the type shown in FIG. 5 are connected together in series ("cascaded") in order to provide an increase in compression over that available from a single loop. Such a cascaded compressor is particularly desirable in uses in which it is not possible, because of limitations on input and output temperature, rotational speed, size of the device, or because of the nature of the working fluid, to achieve the desired compression with stable operation in a single loop. The compressor 199 includes a conduit 200 which has three U shaped loops. At appropriate places within the conduit 200 are located heat exchangers, e.g., porous plugs, 133, 135, 137, 139, and 141. Working fluid (gas) enters the system at inlet 131 and travels radially outward through conduit section 132, experiencing essentially adiabatic compression. It returns towards axis 1 in conduit section 134, passing first through heat exchanger 133 within which it experiences expansion, which can be regarded as essentially isothermal. The working fluid then continues towards axis 1 through region 144 of conduit section 134, within which its continued expansion as it approaches axis 1 is essentially adiabatic. In moving from inlet 131 to station 201, located on the rotational axis 1, the working fluid has passed through a rotary thermodynamic compressor stage essentially like that described in FIG. 5. In FIG. 10 this first stage of compression is given reference numeral 202. Second and third stages 203 and 204 follow stage 202.

The second stage 203 includes conduit sections 136 and 138, and heat exchange means 135 and 137. Working fluid continues from station 201 through heat exchange means 135, moving radially outwardly. Within heat exchange means 135 the compression of the working fluid can be regarded as essentially isothermal, i.e. the heat exchanger 135 allows heat to compression to leave the working fluid during compression. After passing through heat exchange means 135, the working fluid continues through the region 145 beyond heat exchanger 135, within which its compression, as it moves radially outward, is essentially adiabatic. The working fluid then returns to axis 1 through heat exchanger 137, within which its expansion on returning towards the axis is essentially isothermal, and then through conduit region 146, within which its further expansion is essentially adiabatic.

The working fluid next flows through the third stage 204, in which it is acted upon in substantially the same manner as in the second stage 203. The compressed gas emerges from an outlet opening 143.

It should be understood that heat is added to the working fluid from one or more heat sources through each of the heat exchangers 133, 137 and 141 so as to maintain the flow through those exchangers essentially isothermal.

Fig. 11 shows the relationships which are believed to exist between the pressure and temperature of the working fluid as it passes through compressor 199 shown in FIG. 10. Point 149 represents the pressure and temperature of the working fluid at the inlet 131. Line segment 150 describes the adiabatic compression of the working fluid in conduit section 132. Line segment 152 describes the isothermal expansion of working fluid returning towards axis 1 in heat exchanger 133. Line segment 154 describes the adiabatic expansion of working fluid within region 144 of conduit section 134. The point 155 gives the pressure and temperature of the working fluid at station 201 in FIG. 19. This is its temperature and pressure after having completed passage through the first compressor stage 202. The arrows next to the various portions of the curve in FIG. 11 indicate the progress of a volume element of working fluid through the compressor 199.

The difference in pressure between points 155 and 149, designated $C_1$, represents the compression provided by the first stage 202 of compression.

In the second stage of compression, line segment 156 designates the isothermal compression of working fluid within heat exchanger 135. Line segment 157 represents the adiabatic compression or working fluid within region 145 of conduit segment 136. Line segment 159 represents the isothermal expansion of working fluid within heat exchange means 137 in conduit segment 138. Line segment 160 represents the essentially adiabatic further expansion of working fluid in region 146 of conduit section 138. Point 170 represents the pressure and temperature at station 205. This completes the second stage of compression 203, and the compression provided by this second stage is designated $C_2$ in FIG. 11.

Compression stage 204 is represented by line segments 171, 172, 173 and 174, corresponding respectively to isothermal compression within heat exchange means 139 of conduit segment 140, adiabatic compression within region 147 of conduit 140, isothermal expansion within heat exchange means 141 of conduit segment 152 and adiabatic expansion in region 148 of conduit segment 152. Point 161 in FIG. 11 represents the pressure and temperature of the working fluid at outlet 143 of the compressor 199. The difference in pressure between point 161 and point 170, designated $C_3$ in FIG. 11, is the compression occurring within the third stage 204 of the compressor. The total compression provided by the entire compressor is represented by the difference in pressure between point 161 and point 149 (the sum of $C_1$, $C_2$ and $C_3$), and is designated in FIG. 11 by C.

The provision of adiabatic compression in the first section 132 of the compressor 199 is optional. If desired or necessary, a heat exchanger positioned like heat exchangers 135 and 139 can be used to make the compression isothermal. Ordinarily, however, the gas entering the compressor will be cool and isothermal compression in the first stage will be unnecessary.

Except for the above-described optional feature of the first stage of the compressor 199, all of the stages preferably are essentially identical to one another.

There is another, perhaps simpler, way to analyze the behavior of the cascaded compressor 199. The compression produced by a rotary thermodynamic compressor of the form illustrated in FIG. 5, depends upon the input pressure for the device, assuming that all other operating parameters are held constant. This approximation applies to the case where the flow of working fluid through system is not so great as to render heat exchange within the heat exchange means relatively ineffective. This proportionality between the compression in a single stage and the input pressure to that stage is a consequence of the production of pressure by the action of centrifugal forces on the columns of gas within tube sections 65 and 62 in FIG. 5. The total pressure in the forward direction, as designated by arrow 54, produced by the column of gas in tube section 65 depends upon the centrifugal force acting upon the mass of gas in that tube section. The reverse pressure produced by working fluid in tube section 62, trying to force working fluid against the direction indicated by arrow 54, also depends upon the action of centrifugal forces on the mass of the working fluid present within column 62. The difference in density between the working fluid in the two columns, 65 and 62, is a consequence of a difference in temperature within those two columns. For an ideal gas the ratio of the density in one column 65 to the density in the other column 62 depends upon the ratio of the temperatures. For a fixed relationship in temperatures the absolute difference in density between the working fluid in the two columns is proportional the absolute density of the working fluid. This density, in turn, depends upon the overall pressure of the working fluid within the system, and, for relatively small flow rates, is explicity a single-valued function of the pressure at the inlet to the compression stage. Thus, for an ideal gas, the absolute difference in pressure produced by the operation of a single-stage of a rotary thermodynamic compressor is proportional to the pressure at its inlet. This behavior for a cascaded compressor is illustrated in FIG. 11. The pressure difference $C_2$ produced in the second stage of compression, is not as large at the pressure difference $C_3$ produced in the third stage. This is because the inlet pressure at the intake to the second stage of compression is not as high as the inlet pressure at the third state. In FIG. 11, operation is assumed to be with a working fluid which is an ideal gas, and the pressure increment for each stage of compression after the first stage is roughly proportional to the inlet pressure for that stage. One consequence of this physical effect is that operation of a rotary thermodynamic compressor with many stages can be characterized as a multiplication of the inlet pressure by a ratio, which, for flows not so large as to render the operation of the heat exchange means within the system relatively ineffective, nor so large as to cause appreciable friction, is independent of both inlet pressure and flow. This leads to an exponential dependence of the form shown in the following equation:

$$P_{out} \cong P_{in} R_p^N$$

in which $P_{out}$ is the outlet pressure, $P_{in}$ is the inlet pressure, $R_p$ is the compression ratio for each stage and N is the number of stages in cascade.

Cascading rotary thermodynamic compressors of this form is a way to achieve capability of delivering working fluid at a higher pressure than would otherwise be possible. This increases the resistance to reverse flow through the compressor, and thus increases the impedance of a load to which such a compressor system can stably deliver working fluid. Moreover, because the output pressure increases exponentially with the number of cascaded stages, cascading the stages results in a greater total impedance than the sum of the individual impedances of each stage operating along, and thus stabilizes the compressor substantially more effectively than might be considered to be possible.

One modification of the compressor 199 can be formed by using several parallel branches, each of which contains several stages in cascade, in order to deliver a larger volume of working fluid, and in order to provide flexibility in the geometric arrangement of the various pumping stages within the device. For instance, such parallel branches can be used to provide for dynamic balance of the system when it is working into various gas pressure loads.

HELICAL-TOROIDAL THERMODYNAMIC COMPRESSOR

FIGS. 12 and 13 show a cascaded multi-stage thermodynamic compressor 500 with stages like those shown in FIG. 10, but arranged in a particularly advantageous formation.

As is shown schematically in FIG. 12, the compressor 500 includes two groups of loops 510 and 512 of tubing. Each group of loops is formed by winding a single length of tubing in a pattern tending to form a toroid. Each loop 510 is opposite to a loop 512 in the opposite group, and the loops are arranged symmetrically with respect to the central axis 517 of the toroid.

The starting end of the upper group of loops 510 is connected to the starting end of the opposite group 512. This connection is indicated by reference numeral 516. Similarly, the trailing ends of the groups are connected together as indicated at 518. Thus, the two groups are connected together in parallel. A refrigeration unit or other load 519 is connected to the conduits 516 and 518. The refrigeration unit 519 contains, for example, means of the type described above for centrifugally compressing, expanding and returning a working fluid to the compressor 500 through the conduit 516. The compressor 500 and the refrigeration unit 519 are connected together to be rotated as a rotary heat pump unit by a motor 504.

As is shown in FIG. 13, the loops 510 and 512 are secured between a pair of heat-conducting metal plates 506 and 508 by means of welding or soldering. The plates 506 and 508 are secured to a hollow shaft 502 through the center of which pass tubes 516 and 518. Insulation 514 fills the toroidal hole formed by the loops 510 and 512. The plates 506 and 508 may have suitable heat transfer fins on their outer surfaces.

The various compression stages are arranged so that all of the heat exchangers 135, 139, etc., through which heat is rejected contact the plate 508. Heat is conducted into plate 506 from the working fluid, and is dissipated from plate 508 into the environment. Similarly, heat exchange means 133, 137 and 141, through which heat is absorbed into the working fluid during expansion, make thermal contact with the plate 506 through which heat flows into the working fluid.

The compressor 500 operates as follows: Heat is added to the portions of the loops in which the working fluid flows toward the axis 517 by heating the plate 506, and the portions of the loops in which the fluid flows away from the axis 517 are cooled by cooling the plate 508. Rotation of the loops augments the pressure difference between the outwardly and inwardly flowing fluid columns in each loop in the manner discussed above. Since the loops in each group are connected together in series, the compression produced by each loop multiplies that produced by the preceeding loops in the group, with the result that relatively high total fluid pressures can be produced with working fluids of relatively low density, or with the use of relatively low rotational speeds, or with rotary devices having relatively small diameters. Alternatively, rather than using this embodiment of the invention to reduce the foregoing parameters, it can be used simply to produce very high total fluid pressures.

The arrangement of the loops into two parallel-connected groups is made in order to ensure that opposite portions of the rotary structure will have the same amounts of fluid in them at the same time and the rotational balance of the structure will be maintained. Additional parallel-connected groups can be added as desired.

EXTERNAL IMPEDANCE

All of the rotary thermodynamic devices discussed so far have in common the same physical principle of operation. This is true independent of whether the system is used for cooling or for compression, whether the system has a single branch through which fluid can pass or multiple branches in parallel, whether the system has a single stage or a series of cascaded stages, whether the system is part of a closed rotating loop, or is open in the sense that working fluid enters and leaves the rotating assembly. The principle of operation which all of these devices have in common is the interaction within a rotating system of inertial forces which arise within the rotating system and the thermodynamic properties of a working fluid. These inertial forces are known as centrifugal forces and coriolis forces. The centrifugal forces are the familiar forces which tend to throw material out toward the rim of a spinning chamber. The coriolis forces are those which act upon material moving outwardly in a duct to bring it up to speed so that its tangential velocity about the axis matches that of the channel within which it is moving. Similarly, when material is moving from near the periphery to near the axis, coriolis forces act to slow down the material so that when it reaches the axis its tangential velocity has been reduced from that which it had near the periphery. It is the interaction of these rotary inertial forces with differences in density of the working fluid, associated with differences in temperature, which link thermodynamic work in the form of the flow of heat to thermodynamic work in the form of flow of a pressurized working fluid within these systems. It is this relationship between thermodynamic flows of heat and mechanical flows of working fluid which gives rise to the characteristic dynamic properties discussed above. The dynamic instabilities which have been discussed are, therefore, a characteristic property of rotary inertial thermodynamic devices. These instabilities arise when there is an improper relationship between the thermodynamic impedances and mechanical impedances for the various parts of the thermodynamic device and the other parts of the system, of which it is a component. The mechanical impedance to the flow of working fluid within a rotary inertial thermodynamic device may be regarded as a property of the device itself and the external flow impedance to which it is coupled. The thermodynamic impedances presented to working fluid within the system include both the thermodynamic impedances for exchange of heat within the device itself and also the thermodynamic impedances external to the flow of the working fluid proper. All of these thermodynamic impedances should be considered in determining the stability of flow of working fluid within the rotary inertial thermodynamic device.

For example, suppose that the cooling device diagrammed in FIG. 4 had in tube section 3 a very efficient heat exchange means for allowing heat to flow from the working fluid during its compression into the heat exchange means itself. Suppose, however, that this heat exchange means was only relatively ineffectually linked to an external sink to which this heat could be dissipated. The ability of the heat exchange means to remove heat from the working fluid during compression would then depend, not only upon the effectiveness with which the heat in the working fluid could be exchanged with the heat exchange means itself, but also upon the effectiveness with which this heat exchange means could dissipate the heat to some other part of the system. This total thermodynamic impedance is what characterizes the thermodynamic impedance presented to the working fluid. If this total thermodynamic impedance is very high, even if there is only a relatively small flow, the system will not be capable of dissipating the heat of compression from the working fluid and will have a rapid drop in the back-pressure by which it acts to use the pressure of the working fluid entering the system to produce cooling. If, on the other hand, the total thermodynamic impedance with respect to the working fluid in tube section 3 is very small, even when there is a relatively large flow of working fluid a cooling effect can be expected.

HEAT SOURCE IMPEDANCES

The characteristic thermodynamic impedance of the heat source is another impedance of the system which should be taken into consideration in stabilizing a rotary inertial thermodynamic system. The impedance of a heat source is analogous, in some respects, to the internal impedance of a source of electrical energy.

In this analogy, heat flow corresponds to electrical current, and temperature corresponds to voltage. Thus, a high-impedance heat source is one in which the heat flow is relatively constant regardless of the temperature of the medium into which it delivers heat. Conversely, a low-impedance heat source is one in which the temperature is relatively constant regardless of the amount of heat flow in to the medium. Hence, a high-impedance heat source is analogous to a constant-current electrical source, and a low-impedance heat source is analogous to a constant-voltage electrical source.

Examples of high-impedance heat source are flames and hot air. An example of a low-impedance heat source is a relatively large body of hot water. Other examples of both types of heat sources will be given below.

As an example of the influence of the impedance of the heat source on the stability of a rotary inertial thermodynamic device, consider the device shown in FIG. 5. The heat exchange means 46 in the tube section 62 is coupled to an external source of heat which has, of course, a characteristic thermodynamic impedance. If the impedance of the heat source is very high, as the flow rate of working fluid through the compressor 52 decreases because of an increasing back-pressure against which the system must deliver working fluid, the amount of flow of working fluid past heat exchange means 46 available to take heat away from it decreases, and, therefore, the temperature of heat exchange means 46 increases. The result of this increase in temperature of heat exchange means 46 is that the density of working fluid in tube section 62 decreases, increasing the effective compression available from the rotary inertial thermodynamic system. Thus, the use of a heat source with high thermodynamic impedance tends to stabilize the operation of the compressor in the presence of large back pressures from external loads in that the higher compression enables the device to better resist reversal of flow from the load back through the compressor.

IMPEDANCE-STABILIZED CLOSED-LOOP ROTARY INERTIAL HEAT PUMP

The principles discussed in the preceeding section can be utilized to ensure the stable operation of a wide variety of rotary inertial thermodynamic systems, including a closed-loop rotary inertial thermodynamic system 300 of the form described in my U.S. Pat. No. 3,470,704 and shown schematically in FIG. 14. The device 300 has a compressor section 311, and a cooling section 312. The compressor section includes conduit sections 301 and 302, heat exchange means 303, and an expansion region 304 within conduit section 302. Compressor 311 is a rotary inertial thermodynamic compressor. The cooler section 312 includes conduit segments 305 and 308, and heat exchangers 306 and 309. Heat exchangers 306 and 309 extend for a substantially the full lengths of conduit sections 305 and 308. Cooler 312 is a rotary inertial thermodynamic cooler. Conduit section 310 completes the closed loop conduit.

The operation of rotary inertial thermodynamic compressor 311 is characterized by FIG. 15 which is a graph relating the change in pressure in the compressor and the cooler to the rate of flow of working fluid through the system. Note the sign convention for pressure change, which leads to a representation of P of the compressor being negative, i.e., the drop in pressure of working fluid flowing through it is negative; the pressure produced is positive.

The properties of the cooler 312 are represented by curve 313 in FIG. 15. It can be seen that P for the cooler decreases at first with increasing flow, as the thermodynamic back-pressure decreases. At relatively high flow rates, mechanical impedances dominate and the pressure drop through the system again rises. Note that the rate of drop of curve 313 in FIG. 15, representing the back-pressure generated in the cooler, is a consequence of a loss of heat from the working fluid during compression in tube section 305 by means of heat exchange means 306, and the gaining of heat from the environment during expansion of the working fluid in tube section 308 by means of heat exchange means 309.

If the thermodynamic coupling of heat exchange means 306 and 309 to their environments is very poor, then the rate of drop of the back-pressure generated in cooler 312 would be much steeper than that shown in curve 313. The relationship of back-pressure flow for this condition to is represented by dashed curve 315 in FIG. 15.

FIG. 16 shows a curve 317 relating the total pressure drop through both the compressor 311 and the cooler 312, acting in series, to flow rate F. Stable operation of the system as a closed loop occurs when the total pressure drop in going aroung the loop is zero, and the slope dP/dF is positive. Curve 317 passes through zero total pressure drop at an operating point 316. Flow in the system at point 316 is stable and efficient. Limitations on the flow of the working fluid arise primarily from thermodynamic effects, rather than from mechanical, frictional constraints.

Curve 318 in FIG. 16 represents the total pressure drop in compressor 311 and cooler 312 in the case in which cooler 312 has only very little thermodynamic coupling to its environment. That is, curve 318 represents total pressure drop for the same conditions represented by curve 315 of FIG. 15. Curve 318 represents the algebraic sum of curves 315 and 314. Curve 318 crosses the zero axis at an operating point 319. This point represents a condition in which the working fluid is circulating very rapidly through the system and the amount of work done by the working fluid against the thermodynamic pressure drop within cooler 312 is very small. The principal limitations on the flow are caused by friction.

The efficient operation of the rotary inertial thermodynamic device 300 as a heat-actuated cooling system requires that the flow of working fluid within the device be limited principally by thermodynamic effects rather than by mechanical friction of the working fluid within the conduits and heat exchangers through which is passes. The reason for this is that the mechanical friction on the working fluid is an irreversible thermodynamic loss. Thus, to achieve stable, efficient operation of the device 300, it is desirable that the cooler 312, regarded as a total system (including those parts of its environment with which it exchanges heat) present a lower thermodynamic impedance than is presented by the compressor 311, regarded as a total system (including those parts of its environment with which it exchanges heat). If the foregoing constraints on thermodynamic impedance cannot readily be met, the operation of the system can be stabilized by inclusion, anywhere within the conduit, of a flow restricting means 320 (FIG. 14), for instance a constriction or a porous plug in the conduit. This flow restrictor can advantageously be combined with one of the various heat exchange means present within the conduit, although it is not necessary to make such a combination.

IMPEDANCE-STABILIZED OPEN-LOOP ROTARY INERTIAL HEAT PUMP

As a second example, consider the problem of the stability of an "open loop" rotary inertial thermodynamic system; e.g., a system of the type shown in FIG. 4 in which a stationary source of working fluid is used. A parallel-branch embodiment 349 of such a system is shown schematically in FIG. 17, in which 360 is the inlet, and 361 is the outlet. The device has four branches 350, 351, 352 and 353, containing, respectively, compression sections 348, 357, 358 and 359, which contain, respectively, heat exchangers 347, 354, 355 and 356. These heat exchange means are coupled to an external environment, into which they can reject the heat of compression which they receive from the working fluid as it is compressed.

FIG. 18 shows a curve 362 relating the frictional (mechanical) pressure drop of working fluid in passing through one of the branches (which are assumed to be identical) to the flow F of working fluid through that branch, and a curve 363 relating the thermodynamic pressure drop to the same flow. In FIG. 19 the curve 364 relates the total pressure drop within each branch to flow. Curve 364 is the algebraic sum of curves 362 and 363 in FIG. 18. An operating point 365 is selected at the point of tangency of a tangent line 366 which has a positive slope.

By making the mechanical impedance in each one of the branches sufficiently large, the pressure drop within that branch can be dominated by the mechanical impedance, rather than by the thermodynamic impedance. In this way, it is possible to select an operating point where the curve 364 has a positive slope, i.e., a small increase in the flow through that branch would be accompanied by an increase in the pressure drop within the branch. This means that the flow through the branch would decrease. Similarly, any decrease in the flow through that branch would lead to a decrease in the pressure drop, thus allowing the flow to increase. Therefore, the flow at the operating point 365 is stable.

The mechanical impedance can be simply the impedance of the heat exchanger in that branch. Separate flow restrictors also can be used. The high mechanical impedance necessary for stability causes irreversible thermodynamic losses. For this reason, although the multiple-branch cooler 349 shown in FIG. 17 might appear attractive, a detailed analysis, including an analysis of possible dynamic instabilities, shows that its thermodynamic efficiency is not nearly as high as in alternative embodiments disclosed herein.

The length and positions of the heat exchangers in the conduits is a factor to be considered in the construction of rotary inertial thermodynamic devices. Consider the case where the rotary inertial thermodynamic device in FIG. 4 is operated as a single-branch compressor of the type in FIG. 5 with heat supplied to heat exchange means 30. Consider first the case where heat exchangers 29 and 30 are relatively short, and exchanger 29 is placed near the axis 1, and exchanger 30 is remote from the axis. For this discussion, it is assumed that fluid in the rest of the system is relatively cool. Assume also that flow is opposite to the arrow 31. This causes region 4 to be filled with cool working fluid, and region 32 to be filled with the working fluid which has been heated by its passage through heat exchanger 30. The result is that, even for small reverse flows (in a direction opposite to arrow 31), the system ceases to operate as a compressor driving working fluid in the forward direction and begins to drive working fluid in the reverse direction.

FIG. 20 is a graph illustrating the operation as a compressor of the device shown in FIG. 4 with varying lengths of the heat exchangers 29 and 30. Frictional effects are included. Curve 409 represents flow in the forward direction indicated by arrow 31. Curve 412 represents reverse flow with short heat exchangers positioned as described above. Curve 411 represents conditions identical to those of curve 412, except that the heat exchangers are longer, and curve 410 represents the case in which the exchangers are so long that they substantially fill the tube sections in which they are located.

The change from forward to reverse flow results in a sudden change $G_1$ or $G_2$ in the compression available. As the heat exchangers are elongated to fill progressively larger portions of the conduit segments, the effect produced by changing the temperature of the working fluid in sections 32 and 4 becomes smaller. For small flows, it is assumed that the working fluid within heat exchangers is essentially the temperature of the heat exchanger. Therefore, the change in pressure appearing for small flows in the reverse direction is reduced by extending the length of these heat exchangers. Thus, with the longest heat exchangers, the change in pressure appearing upon reversal of flow through the system is essentially zero. However, extending the length of the heat exchangers beyond the length required to produce the isothermal compression and expansion required for operation in the Carnot cycle reduces the efficiency of the system. This is because the region 32 for adiabatic compression and the region 4 for adiabatic expansion become very small. This does not allow adequate compression to occur in section 32 to allow the working fluid to achieve at station 15 a temperature equal to that of heat exchanger 30. In the case of reduction of length of adiabatic region 4, the result is that working fluid leaving the system through outlet 34 is at a higher temperature because it has had less adiabatic expansion to reduce its temperature from that which it possessed upon leaving heat exchanger 30. The result is that the thermodynamic efficiency of the system is decreased at the same time that the gap in pressure upon small reversal of flow of working fluid through the system is decreased.

Dashed curve 417 in FIG. 20 represents pressure variations with small flows in the forward direction in a device as shown in FIG. 4 used as a compressor in which the heat exchange means has a relatively high thermodynamic impedance to the flow of heat from the external heat source into the working fluid. This high thermodynamic impedance can be caused either by the high internal impedance of the source itself, or a high thermodynamic impedance to the flow of heat into the working fluid, or by both. The result of this high impedance is that, for small flows of working fluid forward through the compressing system, the temperature of heat exchanger 30 increases so that the amount of compression available, due to the difference in density of the fluid in the outwardly and inwardly directed segments of the conduit 11, increases.

Systems represented by the graph 409 in FIG. 20 can be said to be conditionally stable, i.e., if they are operated at an operating point 420 for which the flow in the forward direction is sufficiently different from zero so that fluctuations in flow are very unlikely to drive the flow into the reverse mode, then the system will operate properly as a compressor, driving working fluid in the forward direction. Such compression systems can be made unconditionally stable, i.e., stable independent of whether they are forced in a reverse mode or not, by coupling them with mechanical impedance means (e.g., fluid traps disclosed in my above-identified pending patent application and herein below) providing a relationship between flow and pressure as indicated graphically in FIG. 21. In FIG. 21, curve 415 represents flow in the forward direction through this impedance, curve 416 represents flow in the reverse direction through the impedance, and the gap $G_3$ in the pressure in the region of zero flow represents the change in pressure required to force this impedance into the reverse flow mode. As long as gap $G_3$ is larger than the gap, $G_1$ or $G_2$ (FIG. 20), appearing when the compressor is forced into reverse flow at small flow levels, the system will be unconditionally stable in the vicinity of zero flow. Operation in this mode is illustrated graphically in FIG. 21 by curve 413 (forward mode) and curve 414 (reverse mode). Gap $G_4$ represents Gap $G_3$ algebraically summed with gap $G_2$, and is the amount of pressure required, beyond the back-pressure at which the compressor has zero flow, to force flow backwards through the compressor. Note that at no point does curve 414 enter the second quadrant of the graph, which would represent pumping of working fluid in the reverse direction.

Also, there is a gap $G_5$ between the greatest forward compression and the least reverse flow pressure. This ensures that a set of parallel branches of a compressor can operate together without some branches forcing working fluid back through others.

PARALLEL-BRANCH INSTABILITIES AND STABILIZATION

Although the basic physical nature is the same, there is a useful difference between the form of instability which occurs in a gaseous rotary inertial thermodynamic cooler containing a set of branches connected in parallel and that which can occur in a rotary inertial thermodynamic compressor containing a set of parallel branches. In the case of the cooler, the instability is believed to consist of an excessively rapid flow of working fluid through one of the branches of the system. In this type of instability, working fluid flows through the branch in the desired direction. In the case of the compressor, the form of the instability is believed to be that the flow through one branch of the compressor is reversed. Therefore, there are a number of techniques which can be used in the compressor to avoid this reversal of flow and thereby make the system unconditionally stable which are not available for use in stabilizing the cooler. This is made especially clear by FIG. 21.

One of the simplest devices which will produce the assymmetric behavior with respect to flow, represented by FIG. 21, is a check valve. For example, this could be a flap valve or ball valve which opens to allow flow in the forward direction and closes to prevent flow in the reverse direction. Alternatively, it could be a liquid trap as disclosed and as is shown in FIG. 22 of the drawings herein.

FIG. 22 shows an impedance control means 420 with an outwardly-extending conduit section 421, an inwardly-extending section 424, and a broad chamber 422 between sections 421 and 424. The chamber 422 has an inlet port 427. The liquid 423 is held against the outer wall 425 of the chamber 422 by centrifugal force caused by rotation of the device about the axis 1. For a gaseous working fluid to flow in the direction indicated by arrow 428, it need have only enough pressure to bubble up through the shallow liquid 423 in chamber 422 and then out through exit conduit section 424. For the gas to pass through the trap in the opposite (reverse) direction, the gas must push liquid 423 back up into conduit section 421 a substantially greater radial distance than it must push the liquid in order to flow in the forward direction. This introduces a pressure gap corresponding to $G_3$ in FIG. 21, and, in effect, forms a type of check valve. Branches identical to the one shown in FIG. 22 can be connected in parallel if desired.

FIG. 23 shows a compressor 430 like that shown in FIG. 5, except that it has plural parallel branches instead of one, a plenum 431, and a flap valve 432 near the outlet of each branch. This compression system is unconditionally stable against excessive back-pressure at outlet 49. Additional branches, each with its own check valve 432, can be added as desired.

It is possible to use several forms of stabilization simultaneously in the same device. For instance, the heat exchangers might be coupled to high-impedance heat sources so as to enhance the protection against reversal of flow. Examples of high-impedance heat sources which might be utilized in this way are, in addition to a flame burning a fixed amount of fuel per unit time, the decay of a radioistope heat. source, radiant heating, electromagnetic inductive heating, etc. In another embodiment, the same electromagnetic induction field which transfers thermal energy to the heat exchangers might also provide a rotating electromagnetic field which, by its electromagnetic drag on the rotating system, rotates the device about the axis 1. For practical reasons, generally it is preferable that this high impedance be achieved by having a high thermodynamic impedance between the environment and the heat exchange means, rather than by a high impedance between the heat exchange means and the working fluid itself. This insures that the heat exchange means within the compressor will not have a temperature very much higher than that of the working fluid and tends to protect the working fluid from thermal degradation.

Use of an unconditionally stabilized rotary inertial thermodynamic compressor with multiple branches facilitates the construction of a system in which the same compressor is capable of providing a small amount of flow into a very high back pressure and/or a large amount of flow into a low back pressure. For instance, one of the branches in a multiple branch system can have a large number of rotary inertial thermodynamic compression stages cascaded. This allows it to produce a very high pressure at its delivery outlet. This would be delivered through an appropriate check valve into the output plenum. In the face of such back pressure, the other branches in the system would have zero flow. Flow would not go backwards through them because of their check valves. The other branches would not cause an appreciable thermodynamic loss, because with essentially negligible flow within them, the fluid in them would absorb essentially negligible amounts of heat from their heat exchangers. The thermodynamic and/or mechanical impedance of the cascaded branch of the compression system can be chosen high enough so that when there is a large flow at low pressure, the fraction of the working fluid passing through the cascaded assembly is small compared to the fraction of working fluid passing through the other parallel branches. In that case, the amount of heat absorbed from the heat exchangers in the high compression cascaded branch can also be made small, so that heat absorbed by this branch causes only a small thermodynamic loss.

THERMODYNAMIC COMPRESSOR WITH IMPEDANCE-INDUCED COMPRESSION

For a number of applications it is possible to construct a rotary inertial thermodynamic compressor in which the conduits extending away from the axis of rotation and those returning towards the axis of rotation operate at essentially the same temperature. During operation, differences in temperature in the working fluid necessary to provide differences in density, which, in turn, cause compression, arise from the differences in the thermodynamic impedances through which heat is coupled into and out of the working fluid in the various conduit segments.

In FIG. 24 is shown a compressor 549 of the type described in the preceeding paragraph. Flow in the forward direction is represented by the arrow 550. A system of this type is capable of pumping a working fluid in either direction. For purposes of discussion, it will be assumed that working fluid entering the system for either direction of flow is at a temperature substantially below that of a heat source 557. Cool working fluid enters device 549 at inlet 551, proceeds radially outward through conduit segment 552, radially inwardly through conduit segment 553, which is in thermal contact with conduit segment 552, and leaves the system through outlet 556. Conduit segment 553 includes heat exchange means 554 and adiabatic expansion region 555. In conduit segment 552 and adiabatic expansion region 555 there is a relatively high thermodynamic impedance for transfer of thermal energy from the working fluid to the walls of the system, or from the walls of the system to the working fluid. When the working fluid is moving with very low flow velocity, this heat transfer is adequate to insure that the working fluid be essentially in thermal equilibrium with its environment. This provides for an isothermal compression and expansion. In that case, the compressor 549 gives very little compression. This is represented graphically in FIG. 25 by curve portion 559. In the region near zero flow, the compression available from this system, in either the forward or reverse direction, is very small. As the rate of flow increases in the forward direction, the effectiveness of heat transfer in conduit segment 552 and adiabatic expansion region 555 is sufficiently small so that the compression of working fluid in conduit segment 552 and its expansion in region 555 become essentially adiabatic. Under such circumstances, the behavior of the compressor 549 becomes essentially that of the compressor shown in FIG. 5. Working fluid at a relatively low temperature enters through inlet 551, experiences adiabatic compression on progressing radially outwardly in conduit segment 552, expands relatively isothermally in heat exchange means 554 within conduit segment 553, absorbing heat from heat source 557, expands essentially adiabatically in expansion region 555, and leaves the system at outlet 556. In the absence of other mechanisms for stabilizing the flow of working fluid within rotary inertial thermodynamic compressor 558, it is necessary to operate on a portion of the curve 559 in FIG. 25 for which the slope of the tangent line 561 is positive. Recalling the sign convention of P as being the pressure at the inlet minus the pressure at the outlet, quadrants 2 and 4 in FIG. 25 represent compression, respectively, in the reverse and forward flow directions. For forward flows greater than the value represented by dotted line 560, a small increase in the amount of flow results in a decrease in the driving compression produced by the compressor. This, in turn, allows the amount of flow to return to its initial value. Similarly, a decrease in flow below the chosen operating line, but not less than line 560, results in an increase in the driving pressure, restoring the flow to its original rate. In this way the operation of the system is stabilized. Similarly, flow in the reverse direction at magnitude greater than represented by dotted line 562 leads to an impedance, for small fluctuations, which also has positive slope. Operating points further to the left of dotted line 562 and lying in the second quadrant represent stable compression for reverse flow.

One advantageous feature of the compressor 549 is that its operation is dependent upon the differences in thermodynamic impedance in conduit sections 552 and 553, which, for purposes of discussion, can be regarded as arising from heat-exchange means 554 located within conduit segment 553 and the properties of heat source 557 to which it is thermodynamically coupled.

GASEOUS-LIQUID THERMODYNAMIC DEVICES

All of the rotary inertial thermodynamic devices discussed thus far utilize working fluids whose state does not change within the device. For a number of applications it is desirable to use devices within which the working fluid changes from a gas to a liquid or a liquid to a gas; see, for example, my U.S. Pat. No. 3,470,704, FIGS. 4 and 8, and my above-identified U.S. Pat. No. 3,808,828. In general, operation of the systems to be discussed below will depend upon changes of a gaseous working fluid into liquid working fluid, as by evaporation and condensation, and/or the absorption and evolution of a gaseous working fluid by a liquid working fluid.

FIG. 26 shows one form of condensation and evaporation rotary inertial thermodynamic cooling device. The forward direction of flow is indicated by arrow 579. Pressurized gas is introduced into the system through an inlet 580 and flows into a condensation chamber 581. Condensation chamber 581 is equipped with heat exchange means (not shown) having a thermodynamic impedance Z44 for coupling heat from working fluid within chamber 581 to the external environment. The gas condenses in chamber 581 and loses its heat of condensation through the impedance Z44. The condensed liquid 586 accumulates against outer wall 583 of chamber 581 under the influence of rotary inertial forces, and drains into a rotary inertial trap 585 having a mechanical impedance Z45. The liquid proceeds through the trap 585 into evaporation chamber 591 where it evaporates at a reduced pressure, extracting from its environment the heat of vaporization necessary for this evaporation through an impedance Z46. This impedance Z46 includes the impedance of the source from which heat is extracted and all intermediate heat exchange means. Gaseous-form working fluid proceeds radially inwardly through region 589 of evaporation chamber 591 and leaves the system through an outlet 590.

For operation as a refrigerator, the gas at inlet 580 has a higher pressure than at the outlet 590. The difference in gas pressure between chambers 581 and 591 is counterbalanced by a difference R in the radial location of surfaces 592 and 593 of the liquid 586. This difference, acted upon by the rotary inertial forces, is utilized to give rise to quite a substantial back-pressure, to provide for the condensation at relatively high pressure of gas in the chamber 581.

One advantageous feature of the mechanical impedance Z45 of the trap 585 is that its value is adjusted automatically to provide exactly the amount of back-pressure necessary to counterbalance the gas pressures acting upon it, regardless of the variation of flow rate over a wide range, and regardless of the variation of impedances Z44 and Z46 over a wide range. It is this self-adjusting feature that makes operation of the trap thermodynamically reversible, i.e., at no point is a working fluid delivered through a mechanical constraint at an appreciable difference in pressure. The stabilizing effect of this self-adjusting form of mechanical impedance can be seen readily by considering the case in which impedance Z44, through which heat is rejected from condensing gas in chamber 581, and impedance Z46, through which heat of evaporation is supplied to the evaporating liquid in chamber 591, both are made relatively large. As these impedances are made larger, for a given flow, the pressure drop across the whole cooler 594 becomes larger. The result of this increased pressure drop is that the difference R between radial locations of surfaces 592 and 593 becomes larger. However, the gas is not allowed to move freely (bubble) from chamber 581 to chamber 591 until a very large gas pressure (e.g., several hundred p.s.i.) is developed. Thus, the trap operates efffectively over a wide range of operational parameters.

The use of traps such as the trap 585 in rotary inertial thermodynamic systems is shown in FIGS. 1, 2, 3, 5, 6, 8, 9, 10 and 15 of my above-identified co-pending patent application. A rotary inertial thermodynamic cooling system has been constructed and successfully tested. It uses a refrigeration section of the type shown in FIG. 26 and a cascaded gaseous rotary inertial thermodynamic compressor of the general form shown in FIGS. 12 and 13.

The rotary inertial thermodynamic device 594 is thermodynamically reversible, and therefore can be operated as a compressor. In this modification of the operation of the FIG. 26 device, working fluid enters the rotary inertial thermodynamic compressor device at inlet 580, as before. The fluid proceeds in the direction indicated by arrows 579 into chamber 581. The working fluid entering the system may be in the form of either a liquid or a gas. If it is in the form of a liquid, then impedance Z44 is not important to the operation of the device. Heat is added from a heat source (not shown) to the liquid at surface 587 of chamber 591 to evaporate the liquid in chamber 591. The inner surface 604 of the liquid, in the case where the chamber 581 is not entirely filled with liquid, is indicated in dashed outline. For operation as a compressor, this inner surface 604 is radially inward from the surface 605 of the liquid in chamber 591. The difference in the radial distances of these two surfaces from axis 1 is designated $R_1$. From chamber 581 liquid flows through the trap 585 and thence to chamber 591, wherein it evaporates at a pressure greater than that in chamber 581. Vapor form working fluid proceeds radially inward within chamber 591, and leaves the system at outlet port 590. The inlet 580 and outlet 590 do not have to be on the axis 1.

Careful examination of the operation of device 594 shows that impedance Z45 is distributed throughout the system, in the sense that it depends upon the levels 604 and 605 to which the liquid working fluid approaches axis 1 in chambers 581 and 591.

Operation of the device 594 as a compressor is illustrated in FIG. 27. Using the previous convention that ΔP represents pressure at inlet minus pressure at outlet, two different conditions have been shown. Curve 612 describes the case in which impedance Z46, the impedance of the heat transfer into chamber 591, is relatively large. Curve 613 describes the case in which Z46 is relatively small. Curve 614, representing reverse flow, applies to both cases.

In the case in which the impedance Z46 is relatively small, the temperature of working fluid evaporating in chamber 591 is essentially the temperature of the heat source, and the temperature does not decrease appreciably as the amount of heat flowing increases. The vapor pressure of the liquid working fluid depends upon its temperature. Holding the temperature relatively constant ensures that the vapor pressure will be relatively constant. This gives rise to the relatively flat relationship between pressure and flow, shown graphically by line segment 613. Therefore, if the outlet of device 594 is blocked, the pressure in chamber 591 does not increase to a high value; it increases only until the delivery pressure reaches the vapor pressure of the liquid at the temperature of the heat source, or, until evaporation of working fluid within chamber 591 completely empties chamber 591, so that liquid is no longer exposed to the heat source through the impedance Z46. In FIG. 27 line segment 613 represents an operating point at which the temperature of the heat source is not high enough to cause a vapor pressure in the chamber 591 sufficient to empty chamber 591.

In the case where Z46 is relatively large, as represented graphically in FIG. 27 by line segment 612, as the flow rate increases, the temperature of the working fluid during evaporation in chamber 591 decreases. This is because the more rapidly the working fluid flows, the more heat flow is required from the heat source in order to evaporate working fluid in chamber 591. Therefore, the temperature drop across Z46 is larger. As the temperature of the evaporating working fluid drops with increasing flow, so also does vapor pressure available to provide compression. It is for this reason that there is a relatively sharp drop in compression with increasing flow of working fluid. As the flow rate decreases, the temperature of the evaporating working fluid increases. This increased temperature gives rise to an increased vapor pressure with a corresponding increase of delivery pressure available at the outlet. This process continues until the pressure becomes so great that working fluid in liquid form is completely cleared from chamber 591, back into trap 585. At that point, liquid working fluid only enters chamber 591 as rapidly as gaseous form working fluid is allowed to be delivered through outlet 590. In the latter mode of operation, the pressure delivered by the compressor 594 becomes essentially independent of the rate of flow of working fluid therein. This is shown graphically in FIG. 27 by line segment 615. From line segments 613, and 612 with 615, we see that the device is not capable of producing sufficient forward compression to empty its trap 585 and thereby render itself relatively susceptible to reverse flow.

Were we to connect a device of the type shown in FIG. 26 to a mechanism which pushes gas through it in the reverse direction, it would be necessary for that mechanism to produce a back-pressure sufficient to overcome the pressure created by the difference in radial surface positions between the outermost point of the inner wall 582 of trap 585 and the innermost point to which working fluid would reach in chamber 581, equal to the maximum forward compression plus a pressure gap marked G in FIG. 27. With such a back-pressure, the gas would bubble back through trap 585 and chamber 581. This is illustrated by line segment 614 in FIG. 27, which shows that, with reverse flow of this form, the reverse pressure does not depend strongly on the amount of flow. This is because the mechanical impedance due to friction is presumed to be relatively small.

The pressure gap G can be relatively large. This serves effectively to stabilize operation of the device. A device of this type is unconditionally stable in the sense previously defined. From the foregoing discussion of the stability of rotary inertial thermodynamic compressors containing multiple branches operating in parallel, it is clear that a flow-pressure relationship of the type shown in FIG. 27 makes the device 594 especially suitable for use in parallel configuration.

The device 594 offers a particularly clear example of a relationship between internal flow of a working fluid within a rotary inertial thermodynamic device, and external and internal thermodynamic impedances through which heat is transferred to or from the working fluid. The differences between line segment 613, and line segment 612 and 615 taken together, arise without need for changes in the internal structure of the device, but rather just by changing the thermodynamic impedances with which it is coupled to a heat source. Clearly, a rotary inertial thermodynamic system including a device of this form should be analyzed by treating the device as part of a larger system, including its internal impedances and also the external impedances of the environment with which it interacts. This is true, whether the device is a part of a sealed-conduit device, all of which rotates as a single unit, or is part of a hybrid system--hybrid in the sense that part of it rotates and part of it is stationary, with couplings through rotating seals between the rotating part and the stationary part wherever needed, or in the sense that parts rotating with different velocities are co-joined for fluid flow.

From the previous discussions of stability of rotary inertial thermodynamic compressors containing multiple branches connected in parallel, it can be seen that the use of a device as shown in FIG. 26 in each branch, possibly in combination with other compression means in the branch, can serve to stabilize the composite compressor. If desired, it is possible to utilize various impedance means in combination to render each of the branches unconditionally stable; device 594 is effective as such a means. It also is possible to utilize various different types of compression devices in the various branches, i.e., it is not necessary for all of them to utilize the same internal geometry or construction techniques.

The angular velocity with which the device shown in FIG. 26 is rotated affects the maximum back pressure into which the device can deliver working fluid. For rotary inertial thermodynamic devices of the type shown in FIG. 26, the angular velocity at which the device is rotated usually strongly affects the thermodynamic and mechanical impedances.

FOREPUMP FOR STABILIZATION

Rotary inertial thermodynamic compressors of the type shown in FIG. 26 require a certain minimum input gas pressure for proper operation, because liquid must be present within the trap 585. If the available gas source cannot meet the requirements, a device 723 of the type shown in FIG. 28 may be utilized. This is one example of a general class of systems utilizing part of the compressed gaseous working fluid delivered by the rotary inertial thermodynamic compressor to actuate a forepump or other secondary pump, in this case, raising the pressure of the gas available at the intake to a high enough value to allow proper or efficient operation of a compressor.

The device 723 has an inlet 707 which receives gas flowing in the direction designated by arrow 706. 708 generally designates a forepump, in this case containing an expansion nozzle 709 and a diffuser 710, which together serve as a jet pump to drive gaseous working fluid into a condensation chamber 711 at a higher pressure than is available at inlet 707. Chamber 711 contains intermediate pressure gas 713, which condenses, delivering its heat of condensation to an external environment through thermodynamic impedance Z719. The condensed liquid 716 collects at the outermost portion of chamber 711 and drains into a rotary inertial trap 715, and flows in the direction of arrow 725 into an evaporation chamber 718. The difference in liquid levels 712 and 717 in conduit segment 715 and chamber 718, respectively, acted upon by centrifugal forces, provides the necessary driving pressure utilized in producing high-pressure gas for delivery at the outlet 726 of the device 723. The heat of vaporization required to evaporate the liquid in chamber 718 is supplied by a heat source 724 through a thermodynamic impedance Z720. The high-pressure vapor, designated 714, flows radially inwardly through conduit segment 727 and divides into two streams, one leaving at the outlet in the direction designated by arrow 712, and the other returning through a high-pressure conduit 722 to actuate the forepump 708. Further details of such a forepump are given in my above-identified U.S. Pat. No. 3,808,828.

The forepump, shown in the form of a jet pump, supplies sufficient working fluid so that the system never turns off at its intake or outlet. Even if the amount of working fluid entering the system is essentially zero, if it is operating into a back pressure at outlet 726, and if there is a pressure difference sufficient to maintain adequate flow in jet nozzle 709, the input to the liquid and gas rotary inertial thermodynamic compressor will be sufficient to produce the necessary condensation in chamber 711 and keep that portion of the system operating. For this reason, a device of this type is not susceptible to flow reversal merely be reduction of intake pressure. The forepump means renders the device stable over a wider range of flow input impedance. At the same time, it raises the working fluid pressure in condensor chamber 711, allowing condensation to occur at a higher temperature. This allows the heat of condensation to be rejected through a higher thermodynamic impedance, without interfering with stable operation of the device, than might otherwise be the case.

All of the rotary inertial thermodynamic gaseous compressors previously discussed operate on a ratio; that is, the input pressure was assumed fixed, and the difference in pressure between output and input was then evaluated.

In place of the rotary inertial compressor in FIG. 28 of the type appearing in FIG. 26, one can use a gaseous compressor such as in FIGS. 5 or 10. Forepump means 708 then serves to increase the input pressure to the inlet of the gaseous compressor which, by the nature of its operation, multiplies its input pressure. Use of the forepump means reduces the input impedance of the composite device. Also, flow through the forepump jet can prevent flow through the compressor from entering the unstable region near zero flow. In both these ways, the forepump can serve to stabilize operation of a rotary inertial thermodynamic compressor. it also serves to reduce the number of stages required for a given compression ratio and/or to increase the maximum compression ratio available from the composite system. A composite device of this tupe can be made which will not be forced into reverse flow by an arbitrarily large source or impedance.

As was discussed in greater detail earlier, the operation of the systems described herein, utilizing a flow of gas in a rotor and depending upon temperature-dependent differences in density in that gas for their thermodynamic effects, depends upon the ratio of inlet and outlet pressures. For simplicity in discussing these effects, the ratio is discussed in terms of the pressure difference across the device, assuming that either the inlet or the outlet pressure is held constant. The physical reasons for the dependence upon ratio of pressure rather than pressure differences, and the way in which this can be taken into account, was, discussed in detail. This should be borne in mind with respect to the graphs herein showing pressure difference versus flow in gaseous working fluid devices. In addition, in general, the effects of changing the angular velocity of rotation have not been discussed in explaining the stability and instability of flows within the rotary inertial thermodynamic devices. The reason for this is that the stability or instability of the flows has essentially the same dependence on pressures and thermodynamic impedances at various angular velocities, except for scale factors which are dependent upon the angular velocity. The essential features required to understand the principles for stabilizing these systems can be set forth and understood by considering systems rotating with constant angular velocity. Ways in which variations in angular velocity can be utilized to alter impedances have as their physical basis the dependence of centrifugal and coriolis forces on angular velocity.

Basic to the operation of rotary inertial thermodynamic compressors is the availability of thermal energy within the rotating system. Associated with the ways in which this thermal energy can be made available are characteristic thermodynamic impedances which, in turn, influence the behavior of the system, of which this rotary inertial thermodynamic device is a component. The mechanisms by which thermal energy are made available within the rotating device can be combined with the mechanisms which serve to provide the necessary rotation. In the calculation of Carnot efficiency for a compressor viewed as a heat engine, the overall performance is more sensitive to fluctuations in the heat rejection temperature than in the heat absorption temperature. This is because the same change in temperature represents a larger fraction of the overall temperature, because the temperature at which the heat is rejected is smaller than the temperature at which the heat is absorbed. Therefore, it is desirable to keep the impedance for the rejection of heat as small as feasible. For most of the operating points which would occur in systems of this type, the temperature for heat rejection is sufficiently low so that radiant heat transport is not an adequate means for removing the heat present. Also, typically, thermal conduction is not an efficient means for transferring heat out of a rotating device. For these reasons, the mechanism of heat transport used for removing heat from the rotating device is typically convective, that is, the heat is transported by the transport of some fluid. In a single-stage rotary inertial thermodynamic gaseous compressor, this transport of heat occurs by the transfer of working fluid from the device performing the compression. If this transfer is to a stationary component in a hybrid system, the transfer of heat from the rotating device has occurred by the transfer of this working fluid. In the event that the compressor is part of a larger rotary inertial thermodynamic device, all of which rotates together, the heat rejection occurs by heat exchange through some surfaces to some moving medium. In the location in which the heat rejection is required, a gaseous compressor is different from a gaseous cooling system. In a gaseous compressor, the heat exchange for rejection occurs relatively near the axis, allowing a larger coolant flow with relatively small momentum transfer. In comparison, a cooling device requires heat transfer at points relatively far from the axis of rotation, having associated therewith higher tangential velocities and larger momentum transfer per unit of heat transfer to a coolant. In the following sections, I will discuss ways in which heat can be transferred into and out of a rotary inertial thermodynamic device and discuss the characteristics of the thermodynamic impedances associated with the various means of heat transfer. This is not a complete enumeration of means of transfer, but rather a representative list serving to characterize the impedance and the dependence of the impedance on the physical form of heat transfer.

HEAT SOURCES

It is to be understood that, where required by the processes occurring therein, rotary inertial devices are provided with heating and heat rejection means. These means can be used in many combinations. For simplicity, heating and heat rejection means are discussed separately. In the figures, one or more means may appear in the same diagram, and, for simplicity, occasionally heating or heat rejection means may be omitted from a diagram intended to illustrate another means, without any implication about the necessity of omitted means.

RADIANT HEAT SOURCES

In FIG. 29, 1 is the axis of rotation, 761 generally designates the radiant energy source, e.g., a lamp 750 with reflector 760. 764 is the rotary inertial thermodynamic device to be heated, and 762 is the surface of device 764 upon which radiant energy impinges to produce heating. 763 is an optically transparent, or nearly transparent, body of insulating material which allows radiant transfer of heat to surface 762 while reducing heat loss by convection and conduction to the surrounding medium. The radiant energy source 761 can either be an artificial source of radiant energy or a natural source, such as the sun. With suitable use of an optical system, not shown, solar energy can be caused to impinge upon and heat the surface 762. This heat transfer technique can also work in a vacuum. Portions of the device can be heated differently by presenting a surface with different absorbtivity to the radiant flux.

INTERNAL HEAT SOURCES

Another form of heating is provided by a heat source which generates the heat within the rotating device itself without external coupling to the environment. Among such sources are radioisotope sources which release thermal energy by their decay; nuclear fission fuel elements, which can be utilized in part of a reactor to provide heat to the medium surrounding them without appreciable transfer of momentum; fully contained chemical reactions proceeding within the rotating device; and, potentially, fusion to release energy from nuclei. With these forms of heat production within the rotating device itself, heat can be delivered wherever it is needed for maximum thermodynamic efficiency. In particular, heat exchangers buried deep within a thermally insulating structure can be heated in this way so as to insure that essentially all of the heat introduced is utilized in the thermodynamic processes in the rotating device.

INDUCTIVE HEAT SOURCES

Electrically conductive components of a rotary inertial thermodynamic device with suitable electrical resistance can be heated by electromagnetic induction. As in the case of heat generation from energy sources within the rotary device, this also allows selective heating of components of the device buried deep within insulating members.

The necessary time dependent magnetic field required for electromagnetic induction can be produced in several ways. One way is to rotate the components of the rotary system through a stationary magnetic field with spatial dependence of the field. The induced by the passage of the components through the magnetic field is then a mechanism by which mechanical shaft work is converted to heating of the buried components. Alternatively, the electromagnetic field can be generated by varying a magnetic field with a characteristic direction of rotation, as is conventionally done in a polyphase motor. This rotating magnetic field can serve two purposes. It can heat the heat transfer means within the rotary inertial thermodynamic device, while the drag between the components so heated and the rotating magnetic field rotates the device.

The foregoing arrangement is illustrated in FIG. 30, in which 765 is the rotary inertial thermodynamic device, in which are buried heat exchange means 766 which have the appropriate electrical conductive impedance and heat transfer properties. For example, exchangers 766 might be simple strips of conducting material, or sintered porous metal plugs with many fine passageways. 767 is an electromagnet assembly having a suitable core 771, and a winding 772 connected to a suitable alternating current power source 773. A multiplicity of such magnetic elements can be utilized. 768 denotes generally a permanent magnet 769 and pole pieces 770. A shaft 771 is mounted on bearings (not shown) and is used to support the device 765 for rotation about an axis of rotation 1. In this arrangement, the rotor serves as the rotor of an alternating current motor. Additional heating can be produced within this rotor by the utilization of the stationary magnetic drag field produced by one or more optional stationary magnet assemblies 768. The amount of torque produced by the electromagnet assembly or assemblies 767, and the amount of heating produced thereby, can be separately controlled by controlling the frequency of the power source 773, or by the use of drag fields, or by controlling the phase of power to several electromagnetic assemblies 767. These electromagnetic heating techniques offer a way of simplifying the drive means for rotary inertial thermodynamic devices. These means for heating and rotating operate in many kinds of environments, including a vacuum.

DIELECTRIC HEAT SOURCES

Dielectric heating also can be used to create heating within the rotating device. High-frequency magnetic hysteresis heating also can be used. A dielectric heating arrangement is shown schematically in dotted lines in FIG. 30. Plates 775 are positioned on opposite sides of the rotary device 765. The plates are connected to a source 776 which supplies an appropriate high-frequency alternating voltage across the plates. The plates are positioned so as to provide a rapidly alternating electric field which heats a dielectric material in the device 765. The plates are positioned, of course, so that only the desired portions of the rotary device 765 are heated. Portions to be heated are preferably made of a material with a large loss tangent the field frequency, while other parts are made of a relatively low-loss dielectric material. For example, ferroelectric ceramics, such as barium titanates, are available which can be made to have an adequately large loss-tangent. "Mylar", polystyrene, and many other plastics, and many other ceramics have low loss-tangents. Some low loss-tangent materials, for example, beryllium oxide, also posses high thermal conductivity, and are suitable for conductive heat transfer. Both dielectric and induction heating are shown in the same figure for simplicity. Typically, they would be used separately. Means for heat rejection (not shown) such as, for ewample, those shown in FIGS. 34 and 35, can be utilized if required by the thermodynamic process occurring within the rotor. Some devices, such as single-stage gaseous compressors, can reject heat with working fluid leaving the device, without special provision for separate rejection of heat.

INTERNAL FUEL BURNING

Another method for heating is to burn fuel within the rotating device. FIG. 31 shows an arrangement for this purpose. 777 designates generally a rotary inertial thermodynamic device to be heated. An intake for air is at 778, and a fuel inlet is at 799. The fuel-air mixture passes outwardly through conduit means 783 past combustion stabilizing means 780 (e.g., screens) into combustion region 782, and thence out of the rotating device through nozzles 781. Alternatively, the combustion products can be returned nearer to the axis of rotation and discharged from the rotating device through appropriate conduit means, not shown. Suitable ignition means, not shown, can consist of a small spark plug or glow plug, with, for example, piezoelectric actuators for a spark plug. The jet nozzles 781 are oriented so that their exhausts are in the same direction, and contribute reaction torque to produce or augment rotation in the device 777, as is explained more fully in my above-identified co-pending application.

ELECTRON BEAM HEATING

Yet another technique for transferring heat into a rotary inertial thermodynamic device is bombardment with an electron beam. In FIG. 32 is illustrated a vacuum device utilizing electron bombardment for heating a rotary inertial thermodynamic device 805 secured to a shaft 802. 804 is a stationary vacuum chamber surrounding the device 805, and 803 are suisable rotary seals. The shaft 802 and the device 805 rotate about the axis of rotation 1, and the seals 803 maintain the vacuum in the chamber 804. A suitable electron gun 806 is utilized for the bombardment of the device 805 in order to produce heating at selected locations therein. Electron gun means 806 operates from power supply 807. The details of the electron bombardment device are not shown explicitly. Many devices are known, especially in the art of thin film evaporation and deposition in vacuum, where they are utilized extensively for heating evaporation sources. Many types of seals are known which can be utilized for seal 803. Especially useful seals are those using ferro-magnetic fluid suspensions. The evacuation means for vacuum chamber 804 is not shown.

VAPOR (STEAM) HEATING

Steam, or other actuating vapor, often is available as a source of thermal energy. It is feasible to both heat and spin a rotary inertial thermodynamic device utilizing a vapor as an actuating fluid. For specificity, consider water vapor (steam). In FIG. 45 is shown another embodiment in which the rotary inertial thermodynamic device 811 is shown with vanes 814, and a shroud 812. Vapor is directed obliquely against the vanes 814 through a nozzle 813. The vanes 814 serve both to augment the reaction of the vapor against the rotating member and to transfer heat therefrom into the rotating device 811. Condensate is collected in the shroud 812 and leaves through a drain 815. By controlling the angle with which the vapor jet causes vapor to impinge on blades 814, it is possible to control independently the amount of rotational torque produced and the amount of heating produced. The device heated can be part of a larger rotating assembly containing other rotary thermodynamic devices lying outside of the shroud 804.

Radiant heat transfer, electromagnetic induction and hysteresis, dielectric heating, and electron bombardment readily can be used for selective heating of portions of a rotary inertial thermodynamic device, so that the heat can be applied to selected regions in order to independently control processes occurring within the device. Such regions can be located across an entire surface of the device, including both radial and angular variations in position. Variations in heating of locations about the axis of rotation can be accomplished by modulation of the intensity of the heat source. For example, the electron beam intensity can be modulated. A light source can be modulated in intensity, or operated as a succession of bright flashes using the same technique as is used with stroboscopic lamps. Electromagnetic induction and hysteresis, and dielectric heating can be modulated both as to frequency and amplitude. In this way, it is possible to control separately the temperatures of various parts.

THERMODYNAMIC VALVES

It also is possible to use gaseous compressors as valves, by adjusting the pressure differences which can appear across them, or to fill and empty traps so as to control flow. Localized heating can be used to control the impedances of such traps.

In FIG. 33 is illustrated schematically a simple valve mechanism, utilizing a chamber 817 containing a liquid 818. The chamber has an outlet to a bellows 820. The chamber 817 is in thermal contact with the surface 819 to which heat can be transferred selectively. Localized heat energy is supplied to surface 819 from outside in a suitably modulated fashion. The bellows receives vapor from the chamber 820 and operates a valve 821. All of the elements 817, 818, 820 and 821 are inside of and rotate with the device 816, which can be of any of a wide variety of forms. Device 816 rotates about axis of rotation 1. For example, a multibranch and/or multistage compressor can have branches and/or cascaded stages selectively valved in this way to allow efficient operation at reduced capacity, e.g., in a large industrial power plant.

In general, many of the forms of rotary inertial thermodynamic devices which can produce or sustain a pressure difference abross their intakes and outlets can be utilized in conjunction with such selective application of heat to provide means for controlling flow or flows within a rotary inertial thermodynamic system.

In many cases it is possible to have a working fluid transport the heat to be rejected by a rotary inertial thermodynamic compressor from the rotating device. In those cases, no special provision need be made for rejecting heat. However, in cascaded gaseous compressors, in absorption cycle devices with closed cycles for the absorbent fluid, and in many other forms of rotary inertial thermodynamic device, it is necessary to reject heat from a rotating member into its environment. Often, it is desirable that the amount of mechanical energy lost from the system in performing such heat transfer be minimized. In some cases it is possible to use that energy which is consumed from the mechanical rotation of the shaft to do some form of useful work in an external system. For instance, the coolant can be circulated by means of an impeller system rotating with the rotary inertial thermodynamic device. Quite generally, there are many system configurations in which the rotating member of the system can be caused to rotate by its environment, and/or can be used to move parts of its environment. For instance, as has been described above, a rotary inertial thermodynamic device might be spun by steam and heated by it at the same time. In turn, the device might be cooled by a flow of fluid, e.g. water, which the device creates by its rotary motion.

INTERNAL LIQUID COOLING

The most efficient location for conveyance of heat from a rotating device by means of heat exchange with an external fluid is at the hub. At the hub, the tangential velocities of the rotating members are the smallest. Within the rotating device, heat can readily be transported from a region internal to the device, from which it is being rejected by a thermodynamic process occurring therein, to the hub. In many cases, an efficient way to do this is to utilize evaporative transfer. In FIG. 34 is shown schematically a device utilizing such transfer to cool an internal surface 837 which is in a region in which a thermodynamic process occurring within a rotary device is required to reject heat.

In FIG. 34, 1 is the axis of rotation, 830 designates a rotary inertial thermodynamic device within which is shown schematically a heat transport mechanism comprising surface 837, volatile liquid 836, conduit means 838, chambers 841 and 839, and heat rejection surface 835. Operation of this heat transport means is by absorption of heat at 837, rejected by some process (through an impedance) into the fluid 836, as indicated by the arrow 843. The fluid 836, absorbing this heat, is caused to volatilize. The vapor thus formed proceeds into and through conduit segment 838. Upon reaching chamber 839 it contacts surface 835, condensing thereon, to deliver its heat of vaporization to the surface 835. Liquid formed by this condensation flows back through conduit 838 to return to the pool of liquid 836 to complete the cycle and be ready to absorb heat again from surface 837.

Although it is not necessary to combine the foregoing and the following steps in the same device, at the hub 846 in FIG. 34 is shown a means for rejecting the heat at surface 835 into a coolant liquid circulating within the hub. This coolant enters at inlet 831 and leaves at outlet 832 in the direction shown by arrows 840. Liquid flows to near the end of the hollow interior of the hub through tube 834, flows outwardly, and returns through a rotary seal 833 to outlet manifold 845 and outlet 832. In doing so the liquid passes along the inner surface of hub 846, which is thereby efficiently cooled and is available as a surface to which more heat may be rejected.

The direction designated by arrows 840 in FIG. 34 is appropriate for liquid flow. In the event that the coolant is operative in a liquid-to-vapor conversion, whereby it absorbs heat by vaporization, the proper direction for most efficient operation is counter to that designated by arrows 840. In the latter case, there is evaporative cooling within chamber 846. A liquid film standing against the outer wall, of which 835 is a segment, is used to absorb heat, and its vapor is transported from the system to leave at port 831.

OPERATION IN A VACUUM

For some applications, it may be desirable to operate a very high speed rotary inertial thermodynamic device in vacuum. Within such an environment one can use radiative heat transport. In FIG. 35 is shown an illustration of such a system. The axis of rotation is 1. 861 is a shaft. 860 are seals. 864 is some mechanism for radiant heating of rotary inertial thermodynamic device 863 rotating within vacuum chamber 862. (in space, no vacuum chamber is required) Evacuation means for vacuum chamber 862 is not shown. Rotary inertial thermodynamic device 863 includes internal heat transport means 872 and 873. 873 is utilized to transport heat from a region where it is absorbed from radiant source 864. 872 is used to transport heat to a heat rejection mechanism 866 from somewhere internal to the rotary inertial device 863 where such heat is rejected from some thermodynamic process. On heat rejection device 866 are located a plurality of thin fins 867, interleaved with stationary fins 868 affixed to a heat rejection means 865. Fins 867 are in thermal contact with, and rotate with, the heat rejection device 866. The rate at which energy is radiated from a black surface at 300° kelvin is approximately 0.046 watts / square cm. or approximately 0.01 calories / square cm. second. By interleaving very thin, closely spaced vanes it is possible to achieve a sufficiently large area of radiating surface in the vanes 867 from which radiant energy can be transferred to the cooler vanes 868. The rate at which energy is radiated from a black surface is proportional to the fourth power of temperature of the surface. By utilizing cooling mechanism 865 to cool the fins 868 interleaved with rotating fins 867, the amount of energy radiated by fins 868 is substantially reduced so that an appreciable radiative tansport of heat from rotating vanes 867 to stationary vanes 868 can be achieved.

Cooling means 865 in FIG. 35 includes a conduit 869 for conducting a coolant fluid (e.g., water) into a cavity 879, and manifold means 870 for collecting fluid returning from the cavity, the direction of flow being represented by arrows 871.

For some special-purpose applications the advantages of rotation at very high speeds in a vacuum are greater than the disadvantages of the structures required for radiative rejection of heat. The rate at which heat is transported increases so rapidly with increasing temperature that, for many applications in which a higher rejection temperature can be tolerated, such a transport mechanism becomes an acceptable means for rejecting heat from the rotating device 863. Such means for rejecting heat are characterized by a thermodynamic impedance, as are other means based on motion or evaporation of a coolant.

HEAT PIPES FOR HEAT TRANSFER

Still referring to FIG. 35, embedded in the rotary inertial thermodynamic device 863 is a heat pipe heat transport means 882, consisting of a chamber 880 with a capillary material 881 within it, and an appropriate amount of a suitable volatile working fluid. The heat pipe 882 is operative to transport heat by evaporation of some working fluid in contact with surface 883, which is heated by radiant heat transfer means 864, and to transport vapor therefrom to condense and deliver heat through impedance Z884 to some thermodynamic process, with the condensate returned to the surface 883 by capillary action in the material 881.

In utilizing heat pipes for such heat transport within a rotary inertial thermodynamic device, the augmented acceleration field associated with the rotation of such a device, and its effect upon the motion of the liquid working fluid utilized within the heat pipe, should be taken into account. The magnitude of the acceleration fields found in rapidly rotating devices of this type makes it quite difficult for a capillary system to transport a liquid form of working fluid radially inwardly by any great distance. However, in devices rotating with relatively low angular velocities, such capillary and vapor type transport systems generally known as heat pipes are suitable for transporting heat from one portion of the rotary device to another.

INTERNAL ELECTRICAL HEATING

An additional way for conveying thermal energy into a rotary inertial thermodynamic device is to use a slipring assembly to transfer electrical energy which is then utilized in some appropriate form for producing heat within the device. In FIG. 36 is shown such a heating system. 1 is the axis of rotation and, 908 is a shaft carrying a rotary inertial thermodynamic device 909. A pair of sliprings 911 on shaft 908 make electrical contact with a pair of brushes 912, which are connected to a suitable power supply 913. Inside of the rotary device 909 is a suitable electrical energy-to-heat conversion means, such as a resistance heating element 910. This conversion means is connected electrically to the sliprings 911. The thermodynamic impedance of this heat transfer mechanism depends upon the detailed mechanism by which electrical energy is converted to thermal energy, (e.g., positive and negative coefficient thermistor heating elements, metals, etc.) and the properties of the power supply used to deliver electrical energy to the system. The effective thermodynamic impedance of such a heat transfer mechanism can be adjusted over a very wide range. The means utilized for conversion of electrical energy to thermal energy can also participate in the operation of the rotary inertial thermodynamic device in other ways. For instance, it can be incorporated as part of a mechanical flow impedance and thus can have intimate contact with the working fluid.

IMPEDANCES OF FOREGOING HEAT SOURCES AND DRAINS

Heating by means of radiant energy transfer, isotopes, magnetic induction, combustion in a rotating system, electron bombardment and combinations of these means are characterized typically by a high thermodynamic impedance; that is, the amount of energy delivered to the rotating device being heated varies only slightly with the temperature of the portion of the rotating device receiving the heat. In the case of steam or other vapor heating, the effective thermodynamic impedance of the source is much smaller. In this case, the temperature of the portion of the rotating device receiving heat is very nearly that of the condensation of the vapor at the pressure involved. A decrease in the temperature of the region at which condensation is occurring results in a substantial increase in the amount of condensation there. For this reason, the thermodynamic impedance of such a vapor heat transfer process depends upon the mechanical impedance by which the vapor is supplied to, and by which spent vapor and condensate are removed from, the surfaces receiving heat.

Cooling of a rotating device by convection and evaporation are also characterized by thermodynamic impedances, typically substantially lower than those associated with the high-impedance heating techniques mentioned above. Of these, typically evaporation techniques have characteristically the lowest impedance, again because of the dependence of the evaporation temperature upon ambient pressure. In the case of evaporative cooling, as in heating, the detailed thermodynamic impedances associated therewith depend upon the mechanical impedances by which liquid is fed to and vapor removed from the region where evaporation occurs.

Heat rejection through a radiative heat transport mechanism of the type discussed in connection with FIG. 35 has a characteristic thermodynamic impedance intermediate between those impedances associated with mechanical fluid flows and vapor condensation and evaporation, and those associated with radiant heating and isotope heating. Isotope heating provides the highest impedance of all of the types discussed above.

IMPEDANCE CONTROL FOR HEAT SOURCES AND DRAINS

It is possible to use a temperature-sensing process with feedback to control the effective thermodynamic impedance by varying the properties of the heat source in order to render either the rate of flow of heat or the temperature of the receiving surface nearly constant. If the rate of flow of heat is held essentially constant, then the heat source has been stabilized in a very high thermodynamic impedance mode. If the temperature of the receiving surface or of any point selected within the thermodynamic system is held constant, then the total thermodynamic impedance from the heat source to that point becomes effectively very small.

In a similar fashion, feedback can be used to change the effective impedance of the heat rejection means. For instance, the amount of flow of coolant past a heat rejection surface can be controlled so as to maintain the temperature of that surface essentially constant, or so as to maintain the rate at which heat is removed by the coolant essentially constant. These two cases correspond, respectively, to an extremely low effective thermodynamic impedance and an extremely high effective impedance. Of course, feedback can be used to obtain impedances intermediate in value between these extremes.

The transfer of heat into or out of a rotating device can be made to depend upon some property of the materials used. For example, in the case where heat transfer elements deep within an insulating rotary inertial thermodynamic device are heated by electromagnetic induction, the temperature of such elements can be maintained essentially constant by utilizing the property of ferromagnetic materials that above their curie temperatures they cease to be ferromagnetic. In this way, the amount of electromagnetic induction power drawn from an oscillating electromagnetic field can be regulated by the element which is drawing that power itself. As its temperature passes above the curie temperature, the amount of power which it draws from the oscillating electromagnetic field decreases substantially. Similarly, when its temperature drops below the curie temperature, the amount of power drawn from the field increases substantially. In this way, it serves as its own temperature regulator. A corresponding effect is seen in some dielectric materials, (e.g., ferroelectric ceramics) and might be utilized to regulate their temperature in an oscillating electric field.

Another way in which internal regulation can be achieved is by means of a device of the type discussed in connection with FIG. 34, in which a vapor transport system is utilized to transfer heat. The properties of such a transport system depend strongly upon the temperature. As the temperature of surface 837 in FIG. 34 increases, the vapor pressure available to drive vapor form working fluid through conduit 838 increases, and, therefore, the capacity of this mechanism to transport heat to surface 835, at which it is rejected, increases. By choosing the liquid 836 appropriately, it is possible to make this dependence of vapor pressure upon temperature of surface 837 effective to limit the temperature of a process rejecting heat into surface 837.

INTERNAL CHEMICAL REACTION: COMBUSTION

Thermal energy also can be introduced into a working fluid within a rotary inertial thermodynamic device by having the energy appear directly within the working fluid itself, rather than by using some external means to couple heat energy into the fluid. For example, a radiation absorbtive, or partially absorbtive, fluid, can be exposed to radiation (electromagnetic, particulate, etc.) which it absorbs, thereby transferring the radiation energy directly into the fluid. Or, the working fluid can be of such a nature as can support an internal energy-releasing reaction, for instance, a mixture of fuel and oxidizer.

FIG. 41 shows a rotary inertial thermodynamic gaseous compressor utilizing such a working fluid which can support combustion. Working fluid is introduced in the direction designated by arrow 1010 at an inlet 1011. It proceeds radially outwardly through conduit segment 1012, within which is experiences essentially adiabatic compression. Reaction stabilizing means 1013, e.g., a screen, or catalyst, stabilizes a heat-producing chemical reaction occurring in reaction zone 1014, within conduit segment 1016. After this reaction zone the working fluid proceeds radially inward through adiabatic expansion region 1015, to leave the device at outlet 1017. Optionally, a portion of the high-pressure working fluid can be bled from the system to operate some tangential jet, designated 1018, or all of the working fluid can be returned to the axis of rotation within conduit segment 1016. It is to be understood that inlet 1011 and outlet 1017 do not have to be on the axis of rotation, and that this rotary inertial thermodynamic device can be part of a system including other portions which rotate or are stationary.

INTERNAL NUCLEAR REACTION

FIG. 42 shows a system utilizing a nuclear reaction to produce heat within a gaseous working fluid. Flow of working fluid is in the direction designated by arrow 1019, entering at inlet 1024, progressing radially outwardly through section 1020, within which the working fluid experiences essentially adiabatic compression, proceeding to a reaction chamber 1ozl, within which the nuclear reaction occurs, progressing radially inwardly through adiabatic expansion region 1022, and leaving through outlet 1023. Again, it is to be understood that inlet 1024 and outlet 1023 do not have to be located on the axis, and that this device can be used in simple or hybrid rotary inertial thermodynamic systems.

An example of a suitable nuclear reaction in reactor 1021 would be one using uranium hexafluoride as a working fluid. In the reactor 1021 is a known moderating structure 1025 for facilitating the reaction. The reaction would occur within the reactor and not occur elsewhere within the system. With certain types of nuclear fuel, a moderator is not needed because the geometric configuration of the reactor 1021 will ensure a satisfactory sustained reaction. The geometry of the chamber can be utilized to localize the reaction.

By utilizing the dependence of density of working fluid near the periphery of the rotating device upon the speed of rotation, and the fact that the reaction depends on the density of the fluid, a system of this type could be made in which a reaction occurs only when the device is rotating above a selected angular velocity. This feature, together with the extreme simplicity of rotary inertial thermodynamic systems, can give rise to a highly reliable device. The angular velocity effect on density and distribution of working fluid can be used to control the internal reaction rate in a sealed system. In the case of a device which is not sealed, control can also readily be effected by varying the gas pressure within the device. Of course, the structure which is used to promote the reaction within the working fluid does not all have to lie within the rotating system itself; external nuclear reactor components, including moderators, fuel, control rods, shields, etc. can be used.

Rotary inertial thermodynamic compression devices which utilize a chemical, nuclear or other reaction in the working fluid for heating are specially suitable for the very high energy transfer rates desirable in an engine application. Materials are available for building compressors of this general form with thermodynamic Carnot efficiencies in excess of 50%.

RADIATION-ABSORPTIVE WORKING FLUID

In any of the embodiments, a radiation absorbtive working fluid can be used. The radiation field impinges upon the device in the region of working fluid to be heated. For example, in FIG. 5, a radiation field would impinge on conduit segment 62 in the region shown occupied by heat exchange means 46, without means 46 present. Similarly, regions occupied in FIG. 10 by means 133, 137 and 141 would be exposed to radiation. In FIG. 26, for operation as compressor, chamber 591 would be exposed to radiation, especially that part of it filled with liquid during operation.

In many applications, rotary inertial compressors are suitable as a replacement for other forms of compressor. These can be used in systems requiring distribution of compressed gas to operate other equipment, such as pneumatic hammers, turbines, and the like; or as part of a power plant, where the primary application is the local conversion of the energy represented by the compressed gas into mechanical work, electrical energy, or some other suitable form of energy.

Combustion of fuel within the gaseous working fluid of a gaseous compressor can be used either as a high-impedance source of thermal energy, by holding the flow of fuel constant, or as a low-impedance source, by utilizing control of the rate of flow of fuel to control the rate of delivery of heat and thus maintain the temperature of some point in the system essentially constant.

In the case of a nuclear reaction releasing energy within a reaction zone in the working fluid, although the intrinsic heat source impedance of a nuclear reaction is extremely high, the physics associated with the way in which the reaction occurs, and the way in which it feeds-back to sustain itself, can give rise to a low impedance for the heat source. For instance, in a reaction in which a moderator is used, an increase in temperature of the moderator can reduce the reaction rate. In a reaction utilizing just the gaseous component itself, an increase in reaction rate can lead to an increase in temperature, expansion of the gaseous working fluid, decrease in the total mass present within the reaction zone, [nd decrease in the reaction rate. In these and other ways, the temperature in the reaction zone can be held relatively constant. This characteristic behavior is what one would ordinarily associate with a low thermodynamic impedance heat source. The flowing gases interact with mechanical and thermodynamic impedances, both within the device and external to it. This, again, illustrates the requirement that all of the impedances in the entire system be taken into consideration in the stabilization of a rotary inertial thermodynamic device.

LIQUEFACTION OF COMBUSTIBLE GASES

In devices using internal chemical reactions for heating, it is not necessary that the gaseous fuel be completely burned. Thus, the working fluid could be gaseous fuel with only a small amount of oxidizer. Only a small portion of the fuel is oxidized, and the remainder is used as the working fluid in the thermodynamic process. FIG. 43 shows a compression device for liquifaction of a combustible gas. The combustible gas (e.g., a mixture of gases such as natural gas) is introduced at 1060, and a suitable oxidizer for reaction with the gas (e.g., air) is introduced at 1061. The device 1062 is a rotary inertial thermodynamic gaseous compressor to be operated on heat supplied by the reaction between the combustible gas and the oxidizer. The device 1062 rotates on bearings (not shown), and rotary seals 1064 form gas-tight seals between the inlet and outlet conduits and the rotary conduit. Reaction stabilization means 1063 is provided. The reaction (e.g., oxidation of a portion of the gas) occurs in region 1075. Alternatively the reaction stabilization means can use a catalyst, especially when only a very small part of the gas is oxidized. Also, the oxidizer can be guided separately to the reaction region, and reacted in a suitable reaction chamber. This is directly analogous to the introduction of fuel into an oxidizer stream, as shown in FIG. 51, by means of conduits 1103 and 1104. This is helpful in that compressor 1062 can be used with an adiabatic compression resulting in a high working fluid temperature, without pre-ignition. Also, introducing the oxidizer into a suitable combustion chamber can facilitate more complete combustion, and a more nearly stoichiometric reaction can be maintained. This can reduce unwanted by-products otherwise often associated with combustion in the presence of an excess of fuel compared to oxidizer.

Gaseous working fluid leaves the rotating device in the direction designated by arrow 1070. A first portion of the gas, under the high pressure produced by the rotary device 1062, condenses in a chamber 1076, giving up its heat of condensation to some external heat sink through a thermodynamic impedance. This condensed working fluid leaves the system through an exit port designated 1067, in the direction of arrow 1072, through a suitable control means 9371. In this way, many of the reaction products can be removed from the combustible working fluid before it is further processed. An uncondensed portion continues in the direction designated by arrow 1071 to a second chamber 1078, within which it condenses, giving up its heat of condensation to some external heat sink through another thermodynamic impedance. This condensed material then leaves the system through outlet 1068, in the direction designated by arrow 1073, through an appropriate flow control means (valve) 1079. That portion which is uncondensed leaves in the direction designated by arrow 1074 through outlet 1069, fitted with appropriate control means (e.g., a valve) 1080.

Consider, for example, the liquifaction of propane gas. This can be accomplished by the introduction of a relatively small amount of air through inlet 1061. The reaction between the propane and the air would provide the heat necessary to operate the compression cycle. Water from the reaction would condense in one chamber. The propane would condense in the other chamber. The gaseous reaction products from the combustion process would leave the system at outlet 1069.

In this way, relatively low contamination of the processed gas could be achieved, while providing a relatively economical way to accomplish the liquifaction desired.

In FIG. 44 is diagrammed a system for the fractional liquifaction of combustible gases. Devices 1090 and 1095 are similar to device 1062 in FIG. 43. Following compressor 1090 are fractional condensation chambers 1091 an 1093, similar to chambers 1076 and 1078 in FIG. 43. As many chambers as are needed may be used. These operate at successively lower temperatures, separately condensing progressively lower boiling fractions of the combined stream of input gases and reaction products. After the lowest boiling fraction which can be condensed at the temperatures and pressures available has been extracted, the remaining stream enters a second compressor 1095, and subsequent condensing chambers 1096 and 1098. In compressor 1095, a small additional amount of oxidizer is reacted with the combustible working fluid. Compressor 1095 multiplies the previous working fluid pressure by its compression ratio. At the higher pressure resulting, lower boiling fractions can condense in chambers 1096, 1098, etc.

Compression and fractional condensation means can be cascaded in this way, to fractionate a large number of input gases, in a relatively thermodynamically efficient manner. From the fractional condensation means come streams 1092, 1094, 1097, 1099, etc. Some of these may be reaction products, separated from the condensing input gases, to be used or discarded. A final uncondensed portion leaves as stream 1089, similar to that leaving through outlet 1069 in FIG. 43.

Systems of the foregoing type can utilize cascaded compression stages in which partial combustion occurs in each stage, with oxidizer and/or fuel being introduced in each successive stage. In a device of the type shown in FIG. 43, stable operation requires that the rotary inertial compressor be capable of supporting the back pressure associated with the condensation processes and with mechanical flow impedances in various conduits of the system. As long as the amount of oxidizer is small compared to the amount of combustible gaseous working fluid, the rate of introduction of the oxidizer into the system determines the rate at which heat will be released by combustion, almost independently of the rate of flow of the combustible material itself, for a wide range of flow rates. By utilizing this effect, the gaseous compressor can be made to have wide range of effective delivery impedances for delivering working fluid to subsequent portions of the system. Note that in gaseous compressor 1062, the utilization of a single stage eliminates the requirement for having a means for heat rejection from the rotating device additional to the heat rejection provided by the exit from the rotating device of warmed working fluid. If desired, alternatively, each compressor could be a cascaded compressor of the general type diagrammed in FIG. 51, with oxidizer being distributed from inlet 1103, and combustible gaseous working fluid entering at 1102 and leaving at 1115.

HEAT EXCHANGERS

The simplest heat exchange impedance and mechanical impedance control means is a conduit. Such a conduit 891 is shown in FIG. 37. Fluid flows through the conduit 891 in the direction 890. If the conduit 891 has a large cross-sectional aperture 892 and short length 893, the conduit has a low mechanical impedance to the flow of working fluid and a relatively high thermodynamic impedance for the transfer of heat to or from the fluid. A conduit with a relatively small cross-section 892, or a relatively long length 893, presents a substantially higher mechanical impedance to the flow of working fluid, and a substantially lower thermodynamic impedance to the flow of heat into and out of the working fluid.

FIG. 38 shows an assembly 898 of parallel conduits 896 formed from plates 894 separated by spacers 895. A device of this type can make more effective contact, and, therefor, more effective heat exchange with a fluid passing through it. The assembly 893 is a simple extension of the form of conduit 891 of FIG. 37 and has essentially the same properties as an assembly of such conduits in parallel. In many instances such a conduit is a practical form of impedance control means. An example of this will be given in greater detail later.

In FIG. 39 is shown a heat exchanger and impedance control means 896 consisting of a parallel assembly of slender metal tubes 897 which are in contact with each other in a larger metal tube 899. Heat is transferred to or from a fluid passing through the tubes 897 (in the direction 904) to the walls of the tubes and thence through the wall of the outer tube 899 to its outside surface 903, through which heat is exchanged with some other portion of a system. Each conduit has a relatively very small inside diameter.

The device 896 is of a type which has been used as an intermediate structure in the production of grids for klystron vacuum tubes. For its use in impedance control, it should be noted that there is a relationship between the optimum wall thickness of the tubes 897, and the distance each tube 897 from outer tube 899. Those conduits located near outer tube 899 conduct a larger amount of heat because they conduct heat to or from conduits located deeper within the impedance control device 897. For this reason, it is sometimes preferred that the thickness of the walls of the conduits be graded, increasing in thickness from within the device as the outer wall 899 is approached.

Devices of the type shown in FIG. 39 are particularly advantageous for providing impedances in an intermediate range, with a lower thermodynamic impedance than typically is obtainable with a simple construction using a few conduits of the type shown in FIG. 37, but with a substantially higher mechanical flow impedance than is obtained with such conduits. In a device of the type shown in FIG. 39, an appreciable portion of the total thermodynamic impedance of the device can arise from the impedance to flow of heat caused by the finite conductivity of the material of which the walls of the conduit segments are made. The heat exchanger 896 can have a cross-sectional shape other than cylindrical, if necessary. The device 896 produces intimate contact over a relatively large surface area between the metal of the tubes and the fluid flowing through the tubes. The metal has a relatively high thermal conductivity.

FIG. 40 shows another form of impedance control means, consisting of a sintered metal porous plug or body 905, or other porous, high thermal conductivity material, such as beryllia. Working fluid flows through the pores of this material and exchanges heat with it and with its outside surface 906. In such an impedance control means, the bulk of the thermodynamic impedance for transfer of heat between a flowing working fluid and the surface 906 arises from the thermal conductivity of the porous material, rather than from the exchange of heat between the working fluid and the porous material. The working fluid is in intimate contact with the porous material. For this reason, heat exchange between fluid and exchange means can be effectively accomplished with a relatively short length 907.

An alternative way to use an impedance control means of this type for exchanging heat with the working fluid is to utilize some form of energy transport means which results in heating of the porous material. For example, this type of impedance control means is particularly advantageous when heat is to be transferred by electromagnetic induction, in which the heat can be caused to develop within the material itself, without requiring that heat be exchanged with the external surface 906. In that case, there is no appreciable thermal impedance arising from the thermal conductivity of the material of which the plug is made.

In FIG. 40 are also shown two optional electrodes 916 and 917 connected to opposite faces 914 and 915 of the body 905. By utilizing an appropriate electrically conductive material as the porous material, the thermal energy can be released with the body 905 directly by passing an electric current therethrough. This form of heating is particularly advantageous when the impedance control means has a short length 907 in the direction 918 of flow of the working fluid. The advantage arises from the elimination of any effect due to the thermal impedance associated with the finite conductivity of the porous material of which the device 905 is made. This allows the use of quite short impedance control means while still retaining effective exchange of thermal energy to feed heat into the working fluid passing therethrough. Thus, the device 905 with its electrodes can be used as the means 910 for converting electrical energy into heat energy in the rotary device shown in FIG. 36.

Several peculiarites in the operation of rotary inertial thermodynamic gaseous compressors are worth noting. First, gaseous working fluid near the axis is often at a much lower pressure and much lower density than working fluid near the periphery of the rotating device. The mass flow passing any point in a single conduit is constant after the initial fluctuations of start-up decay to the steady state operating value. For this reason, the velocity of working fluid for the same cross-sectional area of duct increases with decreasing radius, corresponding to the decrease in density of the working fluid as it approaches the axis. For this reason, impedance control means used near the axis should be designed for a relatively larger volume of flow than impedance control means used far from the axis of rotation, although in both cases the mass flow is the same.

Another effect of the smooth change in pressure with radius is that if an acoustic wave occurs in the gas, and if that wave represents a certain fraction of the total pressure near the axis, it represents a steadily decreasing fraction of the total pressure of the gaseous working fluid as the distance from the axis is increased. Conversely, an acoustic wave near the periphery in the working fluid represents a progressively larger fraction of the total pressure of the working fluid at it approaches the axis. This can lead to a small acoustic wave near the periphery giving rise to a shock wave near the axis.

Acoustic waves can be produced within the conduits of a gaseous system by many well known effects, such as vortex shedding, oscillation over an aperture, and oscillations resonant with some structure in the device. In addition to these gas dynamic effects, there are also effects which arise from the interaction of these gas dynamic properties with the thermodynamic impedance within the system. For instance, the effectiveness of a heat exchange means may be influenced by the onset of vortex shedding within it. This can cause the temperature of the heat exchange means to change, which in turn affects the presence or absence of the vortex shedding phenomenon within it, and its effectiveness in producing heat exchange with the working fluid, which, in turn, affects the temperature, the density, and the effect of centrifugal forces upon the working fluid. Variation in the effects of density and centrifugal forces, in turn, can give rise to variations in the effective compression or expansion in the working fluid produced by the rotary inertial thermodynamic effects, thus giving rise to changes in the flow velocity, which in turn feed back to affect the vortex phenomenon. All of the foregoing phenomena have associated with them various time delays, depending upon the nature of the materials, the geometry of the device, flow velocities, angular velocity of rotation, and other variables of the system. For this reason, the detailed analysis of the behavior of a pulse of pressure or temperature introduced within a rotary inertial thermodynamic system can be quite intricate. However, many of the important stability properties of rotary inertial thermodynamic systems can be understood in terms of relatively slow effects, which occur at a rate which is slow compared to the time required for the adjustment of internal temperatures and the propagation of internal pressure waves. These steady-state analyses lead to a fairly detailed and consistent set of conditions under which rotary inertial thermodynamic systems can operate stably. The relations required for these analyses are subject to experimental measurement. Typically, the relations involve the pressure drop as a working fluid passes through a rotary inertial thermodynamic device, and the rate of flow of the working fluid through it. This relationship, in turn, is affected by thermodynamic and mechanical impedances of the entire system, of which the device is a part. These relations give rise to criteria for stability for systems operating in an essentially steady state condition, that is, operating with flow rates which are essentially independent of time over periods of time comparable to the time required for an acoustic impulse to propagate through the working fluid through the length of a typical conduit within the system.

Another effect is that, in the evolution of a gas from a liquid, within a rotary inertial thermodynamic system, the strong dependence of local pressure within the fluid upon distance from the axis of rotation gives rise to fairly well defined radii at which gas evolution begins to occur, depending upon the temperature and nature of the working fluids involved.

The availability of working fluids at various pressures within the rotating devices makes it possible to utilize fluidic control and amplification systems formed within the rotating member itself. In this way, the response of such systems to temperature and pressure differences and flow rates can be made almost arbitrarily intricate to suit specific applications. However, control means of this type ultimately have the effect of controlling the effective impedance presented by the rotating device, and/or by other parts of the system of which it is a portion. The overall performance and stability of such systems can be understood in terms of the requirements on the impedance for small fluctuations about a selected operating light. If this impedance is positive then operation at that point can be stable. If it is negative, then, in general, operation at that point will not be stable. That is, elaboration of the control means beyond those arising simply from the thermodynamic impedances and mechanical impedances within the devices themselves, does not change the basic nature of the stability requirements.

NON-COMBUSTIBLE GAS LIQUEFACTION

FIG. 46 shows a rotary inertial thermodynamic cooling device 1029 which is capable of cooling substances to extreme low temperatures, and is particularly useful in liquefying air, hydrogen, etc. The device 1029 has a single closed loop conduit of the type shown in my U.S. Pat. No. 3,470,704. In this device section 1036 acts as a gaseous compressor of a type discussed previously. In region 1037 heat is rejected through impedance Z1032 to an external environment. Region 1038 is a countercurrent heat exchanger of the type illustrated in FIG. 9 of my above-identified patent which conducts heat from conduit segment 1040 to conduit segment 1041 through impedance Z1033. Region 1039 represents a cooling section in which working fluid progresses radially inwardly through conduit segment 1034. In doing so it expands, achieving a lower temperature than that which it had in conduit segment 1040. This low-temperature working fluid then progresses through conduit segment 1041 in the direction designated by arrow 1043. As it moves within conduit segment 1041, it absorbs heat through thermodynamic impedance Z1033 from working fluid in conduit segment 1040. In this way, a regenerative cooling effect is produced, so that the temperature achieved near the axis of rotation in conduit segment 1034 can be quite low. This can then absorb heat from some external source (e.g., a gas to be liquified) through an impedance Z1035, producing cooling. Because working fluid in conduit segment 1034 during normal operation is quite cold, it has a substantially higher density than would be achieved if it were simply utilized in a device without the regenerative heat exchange means Z1033. This results in a substantially greater back-pressure associated with the action of rotational inertial forces upon the mass within conduit segment 1034. This allows the portions 1037, 1038 and 1039 of the device to sustain a relatively large forward pressure driving working fluid through it.

The flow of working fluid within this device 1029 depends upon impedances for heat transfer, as well as internal mechanical impedances. Not only the internal impedance Z1033 by which the countercurrent heat exchange is accomplished, but also external impedances Z1035, Z1032 and Z1031 participate in determining the stability of operation. In particular, if Z1031 is large, then the heat source has a high characteristic impedance, and, therefore, the flow output impedance of compressor 1036 is relatively high, thereby satisfying the requirements for stable operation of a device of this type, as discussed in greater detail previously. Although for specificity 1036 is shown as being a single-stage rotary inertial thermodynamic gaseous compressor, it is to be understood that as many stages as needed can be used to provide the relatively high drive pressures required.

Suitable impedance control means within the various segments of conduit participate in forming the overall impedances, and participate in providing for stable flow of working fluid.

One way to achieve the thermodymanic coupling represented by impedance means Z1033 is to utilize a gas freely moving between the tube sections 1040 and 1041 and carrying heat by convection as indicated by the arrows 1081. The gas chosen should have relatively low molecular weight so that the effects of compression upon it are not as great at the effects of compression on the working fluid which is producing the primary cooling effect. For this reason, hydrogen and helium would be suitable gases for use as the heat transfer gas. Other possible heat transfer means, in addition to conduction and convection, include evaporative heat transfer.

FIG. 47 is a schematic diagram of a system for the liquefication of gases, comprising a compressor 1044, a cooler 1046, and heat exchange means 1045. All of these can be combined in a single rotating device as shown in FIG. 48. The device shown in FIG. 48 includes a multiple-branch cascaded gaseous compressor 1048, bearing in a single cascaded compression rotor at least two entirely separate branches. One branch serves as a compressor for the gas to be liquefied (taken in at an inlet 1047), and another branch serves as a compressor to actuate a regenerative counter-current cooling device 1049 of the type shown in FIG. 46. The gas to be liquefied flows into the inlet 1047, is compressed in the compressor 1048, and flows through a conduit 1050 along the axis 1. The gas in conduit 1050 gives up its heat by counter-current heat exchange to the very cold gas in conduit 1046 of the cooler, and exits through an expansion valve 1051 and an outlet 1052. In this way an appreciable fraction of the gas is liquefied. This device illustrates the use of several disjoint branches of a thermodynamic system which are physically part of the same device. Arrows 4732 and 4733 indicate which inlets of the compressor are connected to which outlets.

One of the reasons for wanting to operate several branches of a rotary inertial thermodynamic gaseous compressor in parallel is to allow symmetrization of the device with respect to the axis of rotation. A second purpose is to allow cascaded compressor stages to be utilized in a symmetric fashion so that as working fluid pressure builds up towards the latter stages of the device, a rotational imbalance will not be caused by the additional mass of working fluid accumulated in the latter stages of the device. Many different branches can be interleaved with each other.

STAGGER-WOUND HELICAL COMPRESSOR

FIG. 49 shows a single-branch ,cascaded gaseous compressor 820 whose stages are made symmetrical nearly about the axis of rotation by using a larger angular increment between successive stages than the number of stages would require to fit in a single turn about the axis of rotation. In this way the stages loop about the axis of rotation many times. In FIG. 49, 1 is the axis of rotation, and 822 and 823 are connections from the rotary inertial thermodynamic cascaded gaseous compressor to other devices within the system. There are six compression stages 824. The stages are interleaved so that in three stages the conduit has gone completely around the axis of rotation. 825 generally designates a rotary structure supporting the stages. FIG. 49 is schematic, intended solely to represent the angular increments between the stages and the way in which they overlap. The angle between two successive stages is designated 826. The angular increment necessary to make the stages fit in a single pass around the axis of rotation is designated 827. Here there is a twofold interleaving represented by angle 826 being approximately twice angle 827.

PARALLEL-CASCADED HEAT-PUMPS

FIG. 50 shows a rotary inertial thermodynamic device 1050 utilizing a gaseous compressor 1053 comprising several separate branches, each containing several stages of compression in cascade. These are utilized to operate separate cooling devices 1057 and 1058. Device 1057 rejects heat through impedance Z1054 to some external environment. Device 1058 rejects heat through impedance Z1055 back to device 1057. Device 1058 absorbs heat from some external source through an impedance Z1056, thereby producing a cooling effect. By utilizing a series of two or more cooling devices in this way, with thermodynamic impedances internal to the rotating device coupling the cooling devices to each other, the whole device 1060 will be capable of producing an extremely large temperature differential. Various different working fluids can be used in the separate cooling devices, with the working fluids being appropriate to the various temperatures at which heat is absorbed and rejected by each of the cooling devices. Arrows 4734, 4735, and 4736 indicate which inlets of the compressor are connected to which outlets.

The device 1060 has the capability of extracting heat from a load to be cooled which has, in effect, a relatively high thermodynamic impedance to heat flow; that is, from a load which makes it necessary to extract heat at a very low temperature. Also, heat can be extracted from low impedance sources which have a characteristic temperature which is intrinsically quite low, for example, in the liquefaction of gases.

In order to liquefy gases (e.g., air); an inlet 1047, tube 1050, and a valve 1051 carry the gas to be liquefied, in the same manner as in FIG. 48. The gas in tube 1050 gives up its heat to the liquids in the evaporators of the coolers (as is indicated by the dashed arrows) to cool the gas to extremely low temperatures. Heating for the coolers 1057 and 1058 can be by any of the means disclosed herein. For example, such a device could be heated by combustion. A system utilizing a heat source based on combustion and a liquefaction scheme of this type could be especially useful for the liquefaction of combustible gases, such as natural gas, and of air.

Although it is generally desirable that the temperature of operation of a rotary inertial gaseous compressor using combustion within its working fluid be high enough so as to insure that the combustion products remain in gaseous form, and not accumulate within the device, it is possible to provide discharge means such as a trap 1083 (FIG. 43), for the elimination of such combustion products in the event that they do tend to accumulate. Utilization of such a mechanism is optional. For example, where powdered coal is used as the fuel, molten slag will be removed through the trap 1083. For some applications, it may be desirable to operate device 1062 in a vacuum chamber (not shown) for greater efficiency.

CASCADED COMPRESSOR WITH INTERNAL FUEL OXIDATION

FIG. 51 shows a cascaded gaseous compressor utilizing combustion within the successive stages to provide the heat necessary for their operation. Axis of rotation is designated 1. Through inlet 1101 is taken in a working fluid 1102 which can support combustion. It is assumed for specificity that this working fluid is an oxidizer, and that the reactant with it will be a fuel. This fuel enters at inlet 1103 to distribution system 1114. Fuel flows radially outwardly through conduit means 1104, a preheater 1106, and then through outlet 1112, to mix with oxidizer and enter the combustion area through stabilizing means 1105. Reactants from this combustion and unburned oxidizer progress radially inward through conduit segment 1118, then proceed radially outward through heat exchange means 1108, which couples heat from the heated working fluid to some external heat sink, with a total effective thermodynamic impedance Z1107. Fuel conduit segment 1109, preheater 1110, orifice 1113 and combustion stabilizer 1111, operate in the same way as their corresponding components in the first stage. Optional drains 1116 and 1117 are provided, if desired, for removing reactants which tend to accumulate in the system. Working fluid leaves the system through outlet 1115 in the direction designated by arrow 1119.

Except for the means by which heat is introduced into the working fluid, the cascaded gaseous compressor in FIG. 51 is essentially similar in operation to that in FIG. 10, with the exception that the introduction of heat into the working fluid is not necessarily isothermal, because of the nature of combustion. The impedance Z1120 and associated heat exchanger 1121 can be provided in conduit segment 1122 in the event that the inlet working fluid is already at a temperature roughly near that at which heat is to be rejected. (In FIG. 10 it is assumed that the working fluid enters the system at a relatively low temperature.) There are several reasons for utilizing partial combustion in each stage of compression. In a practical system, the maximum temperature which can be achieved in the rotating device is limited by the properties of materials and by the angular velocities available. For this reason, it may not be feasible to operate a full combustion Carnot cycle in a single stage. However, several cascaded stages of compression can each, separately, approximate fairly closely a Carnot cycle by utilizing heat rejection through impedances Z1120 and Z1107, such that the combustion, when it occurs, leads to a rise in temperature of a magnitude which, after adiabatic expansion in conduit segments radially inward from the combustion zone, has reduced the temperature of working gases, and allows essentially isothermal heat rejection to occur. It is within present materials technology to achieve, in this way, a Carnot cycle efficiency in excess of 50 percent. The maximum temperatures occurring in a Carnot cycle with an efficiency of 50 percent and heat rejection temperature of 400° Kelvin are substantially lower than the maximum temperatures which would be produced by total reaction of, for example, air with a typical hydrocarbon fuel, such as gasoline or propane. This use of successive stages with combustion allows the maximum temperature to be held to a low enough value to be feasible with currently available materials, and also helps to insure complete combustion of the smaller amount of fuel used in each stage, thereby reducing the production of undesirable byproducts.

Means for providing rotation, bearings for support, and rotary seals for feeding in working fluid and fuel, and for receiving working fluid from the outlet of the device, have, for simplicity, not been shown. A gaseous compressor utilizing combustion or other reaction within its working fluid can be used, not only to provide its own operating heat, but also to provide operating heat for other rotating devices through appropriate thermodynamic impedances. In FIG. 51, as well as other systems disclosed herein utilizing combustion for heating, appropriate means for initiating such combustion are included if necessary in the combustion area (inwardly from the combustion stabilizer). However, in most of the drawings herein, these ignition mechanisms have not been shown for the sake of simplicity. In some cases, heat of compression can provide ignition, as in a diesel engine.

ABSORPTIVE ROTARY THERMODYNAMIC COMPRESSOR

FIG. 52 is a diagram of an absorption cycle rotary inertial thermodynamic compressor in which an absorbent fluid component circulates entirely within the rotary inertial thermodynamic device, and a gaseous component is absorbed from outside the device and delivered to outside the device, either to other components of a system which rotate with it, or are stationary. Working fluids for use in this embodiment include the following well known pairs: (a) water and ammonia, with ammonia vapor as the gas; (b) a water solution of lithium bromide, with water vapor as the gas; and (c) a water solution of lithium iodide, with water vapor as the gas. Of course, other known pairs also can be used.

Gaseous working fluid flows into the system at inlet 672 in a direction designated by arrow 670. It enters chamber 673, where it contacts absorbing fluid 674 at surface 687, and is absorbed thereby. This combination of absorbing fluid and the absorbed gaseous component which had entered the system moves radially outward through conduit section 676 in the direction designated by arrow 675, passing through a rotary inertial trap 691, into a chamber 679. Chamber 679 is supplied with heat from a heat source 678 through impedance Z677. Impedance Z677 represents the total impedance for heat flow into working fluid within chamber 679, including that part of the impedance which is external, and that part which is internal, to the chamber. Gaseous form working fluid is evolved from working fluid solution 680 in chamber 679, and proceeds as a set of alternating slugs of liquid and gas, radially inward in a direction designated by arrow 682 through a lift tube 683, exiting from the lift tube 683 at outlet 684 in chamber 685. In chamber 685, the liquid and gaseous components exiting at exit 684 are separated, with liquid components leaving chamber 685 and flowing radially outward and into conduit segment 689. Gaseous working fluid leaves chamber 685 through the outlet of the rotary inertial thermodynamic compression device 690, in the direction designated by arrow 671. Gaseous form working fluid in chamber 685 is at a higher pressure than in chamber 673. For this reason, liquid working fluid, exiting chamber 685, flows radially outward to a surface 686 in conduit segment 689 which is radially further outward than surface 687 in chamber 673. This difference in radial position is designated by numeral 688.

Conduit segment 689 forms a rotary intertial trap, within which liquid working fluid flows in the direction designated by arrow 692. Liquid working fluid exits from conduit segment 689 into chamber 673, and flows therein, absorbing gaseous working fluid and leaving therefrom through conduit 676, continuing the cycle. In this way, liquid working fluid, acting as an absorber, flows in a closed cycle within the rotary inertial thermodynamic device shown in FIG. 52, and gaseous working fluid flows through it in a single pass, entering at 672 and leaving at 690. Conduit segment 676, trap 691, chamber 679 and lift tube 683 together comprise a "lift tube" type of compressor which is disclosed in my co-pending U.S. patent application Ser. No. 843,167, filed July 18, 1968, now U.S. Pat. No. 3,559,419, issued Feb. 2, 1971. This subsystem has a maximum pressure into which it can deliver liquid and gaseous working fluid at the exit of lift tube 684 in diagram 52. Also, there is a maximum pressure which can be supported across rotary inertial trap means 689, considered together with liquid form working fluid level 687 in chamber 673. Whichever of these pressure differences is smaller determines the maximum pressure at which gaseous form working fluid can be delivered at exit 690.

Depending on the nature of the combinations of working fluids used within this sytem, chamber 673 may or may not be required to dissipate heat. In the event that it is required to dissipate heat it is coupled to the external environment through a thermodynamic impedance designated Z693. Z693 is used here to designate both internal and external thermodynamic impedances associated with the flow of heat working fluids in chamber 673.

FIG. 53 shows two types of relationship between pressure and flow, for a device of the general form in FIG. 52, depending on whether the limitations on maximum pressure arise from the failure of the trap 689 to support pressure, or failure of the lift tube assembly to deliver working fluid at pressure. Both have in common line segment 695, representing compression under normal operation, with the delivery of gaseous form working fluid in the direction designated by arrow 671 at outlet 690. In the event that the limitation upon the maximum pressure difference which can be delivered between outlet 690 and inlet 672 is determined by failure of trap 689, the forward pressure near zero flow is nearly constant, with output pressure depicted by line segment 4740, and reverse flow is represented by line segment 696. In the event that trap 689 can support a back pressure larger than that into which the lift tube subsystem can deliver liquid and gaseous working fluid, forward compression at nearly zero flow has a form indicated by line segment 4741, and there is a gap, designated 698 in FIG. 52, after forward flow has ceased and before reverse flow begins. In that case, reverse flow follows the line segment 697. The maximum back pressure occurring at the onset of reverse flow designated 699, will depend on which of the two portions of the device fails in the reverse mode at lower pressure. It could be by back-flow through trap 689, or it could be by back flow through trap 691. In the Figure as drawn, the back flow would occur through trap 689. The two different ways in which the maximum pressure can arise give rise to pressure flow relationships which have in common a stable operating forward compression segment 695. However, branch 696 begins at the intercept of branch 4740 with the zero flow axis. For this reason, if several parallel branches were utilized with a system having that type of limitation, small variations in geometry or thermodynamic impedance within each of the branches could give rise to slightly different pressures such that, as the total paralleled flow approached zero, one of the branches could be forced into reverse flow. In the case where the relationship between back pressure which can be supported by trap 689 and the maximum forward working pressure delivered by the lift tube subassembly is such that there is a gap 698, this gap makes a set of parallel branches act in an unconditionally stable manner, i.e., if the system is operated into a closed vessel so that it delivers gaseous working fluid at the maximum pressure which it can produce, there is no tendency for the flow of working fluid to reverse in any one of the branches.

It should be noted with regard to the operation of any of the rotary inertial traps, e.g. 689 or 691, that if the tube, in this case conduit segment 689 or conduit segment 676, has too small a diameter, it is possible for a gaseous form of working fluid to drive ahead of it liquid form working fluid, and empty the trap. That would give rise to a reverse flow characteristic more nearly like that designated by line segment 700 in FIG. 49. The requirement for normal trap operation is that the gaseous form working fluid be able to form bubbles which move relative to the liquid form working fluids, so that the liquid continues to remain in the trap, that is, the minimum tube diameter is appreciably greater than the expected bubble diameter. Because of the centrifugal forces acting on the liquid form working fluid this requirement is relatively easily satisfied.

In an absorptive cycle system it is often desirable to provide for heating a fluid to drive off absorbed working fluid, in addition to that heating which is utilized in evolving gases to operate a lift tube. Provision is made for this in FIG. 52 by the option of adding a small dam 850 extending radially inward from outer surface 853 of chamber 685. This dam, if used, provides space for the accumulation, against outermost wall 853, of absorbent fluid 852, in which location it can readily be heated through impedance source Z851 by a heat source 854. This heat source may be the same as source 678. Use of such an additional space for additional heating is optional. With some working fluids under some operating circumstances it is desirable, with others for specific applications it is not necessary. Heat exchanges among various flows within the device have not been shown, for simplicity.

CASCADED ABSORPTIVE AND GASEOUS COMPRESSORS

It is feasible to connect several different forms of rotary inertial thermodynamic compressor in cascade. For instance, an absorption type compressor of the form shown in FIG. 52 could be used to deliver gaseous working fluid into a cascaded gaseous rotary inertial thermodynamic compressor. The heat flow through the two compression units could also be in series, with heat being delivered initially to the cascaded gaseous compressor and its waste heat being utilized as the actuating heat designated heat source 678 in FIG. 52, for the absorptive type compressor. Such a combination is particularly advantageous where gaseous form working fluid must be taken in at a relatively low pressure. The absorptive type compressor would serve to produce an initial compression, after which the gaseous compressor is fed at a relatively high intake pressure. The gaseous rotary inertial thermodynamic compressor operates to multiply the input pressure by a factor, depending upon its impedance and operating points. By utilizing a precompressor, it is possible to shift the operating points of the cascaded gaseous compressor so as to obtain the overall compression desired with a smaller number of stages. Such a combination offers a higher overall thermodynamic efficiency, where a very large ratio of outlet to intake pressure is required, than might be readily achieved by a gaseous unit alone. Utilization of such a cascaded system allows an extremely low mechanical intake impedance to be realized in a thermodynamically efficient manner. Furthermore, where parallel branches are desired, the utilization of such a cascade allows one of the devices to provide the stabilizing pressure flow relationship for the other device, so as to make the entire branch unconditionally stable. Thus, it is possible to construct multiple branch systems, utilizing several different forms of compressor in each branch, and, if desired, utilizing different forms of compressor in different branches, such as cascaded gaseous compressor in one branch, an absorption type compressor in another branch, a liquid-gas compression cycle in a third branch, etc., or combinations of these or others in any single branch. As long as the impedance requirements and the pressure flow relationships are satisfied, the operation of such a system will be stable. By choosing proper combinations, or by utilizing additional constraints, such as a simple valve assembly, it is possible to make the operation of such systems unconditionally stable over very wide operating ranges.

One of the advantages of the absorptive type system in which the absorbent follows a closed cycle and the gaseous component is part of an open cycle, is that it is possible to achieve a very large volume of intake with a high compression ratio in a compact device. For example, if water vapor is the gaseous component and a salt solution of lithium bromide with water or lithium iodide with water is the absorbent, a device with a diameter of only a few inches spinning at 1000 rpm to 3000 rpm is capable of handling a substantial volume of intake and providing a pressure differential in excess of 300 mm mercury. Potential applications for such a device include freeze-drying of foods, as well as refrigeration and air conditioning. Systems of this type can be scaled down to a quite small diameter or up to relatively large diameters depending on the nature of the working fluids, pressure differentials, and pumping capacities required.

COUNTER-CURRENT HEAT EXCHANGE: ABSORPTIVE HEAT PUMP

In absorption cycle cooling units, the maximum thermodynamic efficiency available is determined partly by the maximum temperature at which heat can be accepted from the actuating heat source. In such devices, the chemistry of the absorption process imposes temperature and efficiency limitations on single stage configurations. For absorbent and gaseous working fluid combinations in which the absorption of the gaseous form of working fluid results in the evolution of heat, this limitation can be substantially ameliorated through the use of a counter-current heat exchange system in which part of the heat evolved during absorption of gaseous working fluid is utilized in providing the heat necessary for the evolution of gaseous working fluid in a different part of the system. In FIG. 56 is shown a system 1400 utilizing this principle.

In the system 1400, the absorption of vapor form working fluid by a relatively concentrated absorber is allowed to occur at a high temperature, so that the heat evolved therefrom can be utilized to heat an absorbent at a somewhat lower temperature and lower concentration to evolve gaseous working fluid therefrom. In FIG. 56, two extended chambers, 1435 and 1438, are utilized in conjunction with extended heat transfer impedance means Z1405 to form a counter-current heat exchanger. Thermodynamic impedance Z1405 convey heat from liquid working fluid absorber, or 'liquor', 1414, progressing in the direction of arrow 1416 within chamber 1435, to liquor 1415 progressing in the direction of arrow 1417 in chamber 1438. In so doing, they allow the liquor to exchange heat in the necessary counter-current fashion. Gaseous working fluid is evolved within chamber 1438 from liquor 1415. This gaseous working fluid 1439 travels in the direction of arrow 1573, giving up heat to liquor 1415 through distributed impedance Z1575 in countercurrent fashion, leaving chamber 1438 at outlet 1576, proceeding through conduit 1426 in the direction of arrow 1433 into counter-current heat exchanger 1571, characterized by distributed thermodynamic impedance Z1570, in which it exchanges heat with cold vapor from chamber 1431 and may partially condense, thence into condensing chamber 1427, wherein condensation is completed, giving up its heat of condensation to an external heat sink through an overall thermodynamic impedance Z1409, representing internal and external heat-exchange impedances. This condensate leaves condenser 1427 through outlet 1428 into conduit 1429, containing, if desired, an appropriate flow control means Z1410. This flow control means has a mechanical impedance and can, for example, be of the form of one of the self-adjusting impedances discussed earlier.

From conduit 1429 condensate 1430 progresses into chamber 1431, wherein it evaporates at reduced pressure, absorbing heat from an external heat source through an overall thermodynamic impedance Z1411. This is the process by which heat is moved from the source supplying heat through Z1411 to the sink absorbing heat rejected through Z1409. Low pressure vapor-form working fluid progresses through conduit 1432 in direction of arrow 1434 into chamber 1435. This vapor form working fluid 1436 is then absorbed by liquor 1414. As the liquor progresses from inlet 1425 through chamber 1435 to outlet 1419, it becomes progressively more dilute. At the same time, its temperature decreases. The relationship between temperature, concentration of absorbent, and vapor pressure is utilized in this way in that the temperature is reduced so that the absorption of vapor-form working fluid 1436 by absorber 1414 proceeds with only small deviations from thermodynamic equilibrium as the absorber progresses through chamber 1435. In the regions between dotted lines 1404 and 1406, the concentration of the absorber is high enough so that the absorption of low pressure vapor occurs at a temperature higher than will be required for evolving higher pressure vapor in chamber 1438 from a more dilute solution of the absorber.

Because the evolution of gaseous working fluid 1439 in chamber 1438 must occur at a higher pressure than that present in chamber 1435, in order to provide the pressure necessary for condensation in chamber 1427 and rejection of heat through impedance Z1409, the relationship between temperature, concentration of absorber, and vapor pressure requires that the temperature of the solution be higher in order to evolve vapor from working fluid, for any given absorber concentration, in chamber 1438 than in chamber 1436. The higher temperature required to evolve vapor in chamber 1438 for a given liquor concentration means that there exists a maximum degree of dilution of absorber 1414 in chamber 1435 above which further dilution by absorption of gaseous working fluid cannot occur in an equilibrium fashion at a temperature high enough to actuate the evolution of vapor from any of the working fluid present in chamber 1438. From this point, designated by dotted line 1406, to the end of chamber 1435, all additional absorption of vapor form working fluid occurs with the rejection of heat of absorption through an impedance Z1407 to some suitable heat sink. The further diluted absorber 1414 then leaves chamber 1435 at outlet 1419, through conduit 1420 containing flow control impedance 1412, and into chamber 1438 at inlet 1421. The dilute absorbent entering chamber 1438 at inlet 1421 progresses in the direction of arrow 1417. This liquor 1415 gradually evolves vapor 1439 as it absorbs heat transferred into it through thermodynamic impedances Z1405 and Z1575. The heat transferred through Z1405 is released in chamber 1435 by the absorption of a lower pressure vapor by a more concentrated absorbent. It is this portion of the process, occurring in chamber 1438 between inlet 1421 and dotted line 1404, that accounts for the increased efficiency of a system of this type.

As liquor 1415 progresses in direction 1417 through chamber 1438, its concentration is gradually increased as it evolves vapor. As this occurs, its temperature also is gradually increased to allow the continued evolution of vapor in a nearly equilibrium manner. However, as the concentration of the absorber increases, it reaches a concentration above which no temperature appearing in chamber 1435 is sufficiently great to allow evolution of vapor 1439 at the higher pressure appearing in chamber 1438. In the region in chamber 1438 between dotted line 1404 and outlet 1422, the absorber is more concentrated than this value. In this region, further evolution of vapor is actuated by heat transferred from heat source 1403 through thermodynamic impedance Z1402 into absorber (liquor) 1415.

This thermodynamic process of counter-current absorption and re-evolution of vapor form working fluid allows the process to be tailored to a wide range of temperature differences between condensor 1427 and evaporator 1431. As the temperature difference between evaporator and condensor is made smaller, the vapor pressure difference is also made smaller, so that the vapor pressures in chambers 1435 and 1438 become more nearly equal. This allows a progressively larger fraction of the total heat exchange process, occurring with absorption of vapor in chamber 1435 and evolution of vapor in chamber 1438, to be accomplished through the exchange of heat between the two chambers, utilizing impedance Z1405. At the same time, a smaller amount of heat input through impedance Z1402 and heat rejection through impedance Z1407 accompanies the total flow of heat between the two chambers. In this way, the overall heat pumping ratio, that is, the heat transferred (taken in through impedance Z1411 and rejected through impedance Z1409), divided by the heat taken in through impedance Z1402 from heat source 1403, becomes larger, the smaller the temperature difference between the evaporator and condensor.

After it has reached the maximum concentration desired in the thermodynamic process, absorber 1415 leaves chamber 1438 through outlet 1422, proceeds, through conduit 1423 through pump means P1413, thence in direction of arrow 1440 through conduit 1424, to reenter chamber 1435 at inlet 1425. Impedance Z1441 of impedance Z1405 represents thermal coupling between fluid flowing in conduit 1424 and liquid 1415 in chamber 1438. This allows for the pre-cooling of high temperature absorbent before it enters chamber 1435. FIG. 56 is intended as a schematic system diagram to facilitate the explanation of the thermodynamic processes occuring therin.

It is to be understood that pump means P1413 and flow control means Z1412, can be located at suitable places within the system. For example, the region of chamber 1438 between dotted line 1404 and outlet 1422, and pump means P1413, can be replaced partially or in their entirety by a lift tube assembly, utilized to provide both the additional heating and the desired pumping. Alternatively, chamber 1438 could be divided at location 1404 to allow a lift tube mechanism to be placed between the two portions resulting of chamber 1438. This would be a particularly advantageous location for a lift tube, because the absorbent 1415 has not yet been concentrated so greatly as to make the amount of vapor form working fluid, yet to be evolved, so small as to render relatively ineffective the operation of a lift tube transport system.

The closed cycle process depicted in FIG. 56 can be opened at locations 1443 and 1442 to provide an open cycle system with respect to the flow of the absorbed vapor, and a closed cycle system with respect to the flow of the absorbent, in much the same way as was done with the device in FIG. 52.

It is to be understood that use of a buffer gas, where appropriate, is compatible with the counter-current heat exchange process set forth in FIG. 56. With some combinations use of a buffer gas is well known, e.g. use of hydrogen as a buffer with water as the absorber and ammonia as the vapor.

FIG. 57 shows the structure of a rotary inertial thermodynamic embodiment utilizing the system shown in FIG. 56. For the sake of simplicity, the various conduits in FIg. 57 have been shown as if they lay essentially in a single plane parallel to the axis of the rotating device. Actually, however, this is not usually true.

Each of the chambers 1458, 1461, 1470, 1469, 1478, 1475 and 1473 extends entirely around the axis of rotation 1 as a figure of revolution, having an cross-section the crosssection shown in FIG. 57. In each chamber except chamber 1473, a dam stretches across each chamber parallel to the axis and extending radially inwardly from the outermost surface of the chamber in to a point closer to the axis 1 than the surface of the liquid contained within that chamber during operation. These dams are not shown in FIG. 57. However, when liquid is fed into one of the chambers, for example, chamber 1469 at inlet 1486, it is to be understood that the entry to the chamber is near the dam on one face thereof, and that the exit 1485 is near the dam on the other face. In this way, liquid working fluid is forced to flow around the circumference of the chamber so as to spend the maximum distance within the chamber. FIG. 58 is a cross-sectional schematic view showing the structure of such a dam.

In FIG. 58, 1 is the axis of rotation. The direction of rotation is designated by arrow 1505. The inlet is at 1501, and the outlet is at 1502. Dam 1503 extends radially inward from outer surface 1506. Centrifugal force hold the liquid against the surface 1506. The surface of the liquid is 1504. The innermost surface of the chamber is 1507. With this configuration, liquid entering the chamber at 1501 is forced to traverse the chamber in the direction designated by arrow 1508.

In chamber 1475, the direction of peripheral flow of the liquid working fluid is not critical. In chamber 1461 this is also the case. In chambers 1470 and 1469 the relative directions of flow of liquid working fluid are important in establishing effective operation as a countercurrent heat exchanger. For this reason, we choose a direction convention. Direction A at an inlet means that working fluid entering a chamber through that inlet flows away from the viewer looking directly at the diagram. This means that it will have gone into the diagram, around and come back to contact the diagram and depart through the outlet. The letter T means that the liquid moves towards the viewer, in the opposite sense to that designated by the letter A. Flow of various working fluids is designated by arrows in FIG. 57. Heat exchanger means 1571 of FIG. 56 has been omitted.

In connection with the system diagrammed in FIG. 56, it was mentioned that instead of utilizing a pump P1413, it is also feasible to break chamber 1438 at location 1404, and introduce into the flow pattern at that location a lift tube compression assembly. This has been done in FIG. 57. Chamber 1478 is the chamber in which gaseous working fluid is driven off from the absorbent by heat from heat source 1450, entering the device through thermodynamic impedance Z1451. The combination of liquid and gas moves radially inward through lift tube 1466, entering chamber 1475 at inlet 1484. The liquid component of this working fluid proceeds peripherally around chamber 1475 in accordance with the technique shown in FIG. 58. This liquid working fluid 1476 receives heat from heat source 1452 through thermodynamic impedance Z1453 driving off vapor 1477. Heat sources 1450 and 1452 can be the same. Vapor-form working fluid 1477 progresses radially inward through duct 1510, into condensing chamber 1473. Within chamber 1473 it condenses, giving up its heat of condensation through thermodynamic impedance Z1454 to some appropriate heat sink. Condensate accumulates against outermost surface 1474 of chamber 1473, and drains therefrom into conduit 1467. The surface of the condensate in conduit 1467 is indicated at 1511. This condensate proceeds in the direction shown by the arrows, through self-adjusting impedance control means 1481, and continues therefrom to chamber 1458, in which it evaporates at reduced pressure. Concentrated absorber leaves chamber 1475 through outlet 1483, proceeding through conduit 1464 to enter chamber 1470. Note the letter A at inlet 1487 to chamber 1470. This denotes that the concentrated absorber, upon entering that chamber, proceeds away from the viewer looking at FIG. 57. On entering chamber 1470, hot concentrated absorber gives up heat through heat exchange means 1471, generally identified by distributed thermodynamic impedance Z1455, which transfers heat from liquid in chamber 1470 to liquid in chamber 1469. As the absorber progresses through chamber 1470, it is exposed to vapor from evaporating liquid in evaporator 1458. It absorbs this vapor, becoming progressively more dilute as it does so, and giving up the heat released in the absorption process through impedance Z1455 to heat the liquid absorber in chamber 1469, and drive therefrom vapor form working fluid through conduit 1468 into condensor 1473.

After it has reached the degree of dilution discussed in connection with location 1406 in chamber 1435 of FIG. 56, the working fluid in chamber 1470 proceeds radially outward through outlet 1488 to enter chamber 1461 at inlet 1489. It then proceeds peripherally around chamber 1461, absorbing vapor form working fluid from evaporating liquid in evaporator 1458, and giving off the heat released in the absorption process through impedance Z1456 to some suitable heat sink. The heat of vaporization of liquid working fluid in evaporator 1458 is supplied from some external source through a total thermodynamic impedance Z1457. It is at this location that useful cooling work is done.

The dilute absorbent from chamber 1461 proceeds through outlet 1490 to conduit 1463, and thence into chamber 1469 at inlet 1486. Note the letter T at inlet 1486, denoting that liquid working fluid flows towards the viewer looking at diagram 91. This is in the opposite sense of motion to that occurring for liquid in chamber 1470. In this way, distributed thermodynamic impedance Z1455 acts to provide the counter-current heat exchange required for operation of the system in accordance with the principles set forth in connection with the diagram 56. After completing its peripheral travel within chamber 1469, the relatively concentrated absorber leaves chamber 1469 through outlet 1485, proceeding through conduit 1465 to re-enter the gas evolution chamber lift tube assembly at inlet 1479. It then proceeds peripherally around the device within chamber 1478 to complete the cycle.

Absorber in chamber 1469 becomes progressively more concentrated as it flows peripherally within the chamber. During this process of concentration, the temperature at which it is in equilibrium with vapor at the pressure in condensor 1473 increases, and its temperature correspondingly increases. In this way, both the absorption process in chamber 1470 and the evolution process in chamber 1469 occur in a nearly reversible fashion.

Liquid in chamber 1469 and chamber 1477 is pressed upon by vapor in equilibrium with the vapor in condensor 1473. This is at a relatively high pressure, associated with the rejection of heat through the impedance Z1454 during condensation of the vapor. In evaporator 1458, vapor is at relatively low pressure. For this reason, the liquid level 1514, in chamber 1470, is radially closer inward to axis 1 than the liquid level 1513 in chamber 1469. The difference between the radial positions of the two liquid surfaces is designated 1512. In a similar fashion, the liquid surface 1516 of condensate evaporating in chamber 1458 is closer to axis 1 than the liquid level 1511 in conduit 1467. The liquid surface in chamber 1461 is at essentially the same radial distance from axis 1 as that in chamber 1470. Similarly, the liquid levels in chambers 1469 and 1475 are at essentially the same distance from axis of rotation 1.

Conduit 1463 and conduit 1464 are also formed into rotary inertial impedance control means to support a pressure difference associated with the difference in the levels of liquids in chambers 1461, 1469, 1470 and 1475. Taken together with the chambers which they interconnect, these conduits form a liquid trap type of impedance control means, which has been discussed above in connection with FIG. 26.

There is a significant difference between the problems of coupling heat into a chamber such as 1475 in order to cause the evolution of gaseous working fluid from liquid 1476, and those associated with coupling heat out of liquid 1514 in chamber 1461 released by the absorption of vapor. Similarly, the problem of transferring the heat of absorption from chamber 1470 into chamber 1469 can be solved by the use of a combination of the solutions to problems used with chambers 1461 and 1475. In chamber 1475, heat from heat source 1452 is coupled to outermost surface 1515 so as to heat the portion of liquid 1476 which is radially furthest from the axis of rotation 1. Thermal convection then causes this heated liquid to progress radially inwardly. In this way, the bulk of the liquid is easily heated by heat coupled to one surface to which it is exposed. Evolution of vapor from the absorbent 1476 typically results in an increase in its density. Thus, the material which has given up heat in the course of the evolution process also is denser, and returns easily to receive additional heat through surface 1515.

The foregoing processes, together, participate in forming thermodynamic impedance Z1453. However, in chamber 1461, the absorption of vapor produces heating in absorbent 1514 at a region near its radially innermost surface 1516. This has two effects: the heated material ordinarily is less dense because of thermal expansion. Simultaneously, the dilution process typically serves to decrease the density of the absorbent. These two effects combine to cause the working fluid which has absorbed vapor to tend to remain near the radially innermost surface 1516. For this reason, it is desirable to provide heat transfer means within chamber 1461 by means of which the thermodynamic impedance within the chamber can be reduced. These are represented schematically by heat transfer devices 1462. In a small rotary inertial device these can be thermal conductors such as thermally conductive posts extending radially outwardly to meet surface 1509 and transfer heat thereto. These, together with the transfer properties within the liquid itself, participate in forming the total thermodynamic impedance Z1456, through which heat of absorption released within chamber 1461 is rejected to an environment.

Distributed thermodynamic impedance Z1455 is implemented by heat exchange device 1471, including heat exchange posts 1482. Removal of heat of absorption in chamber 1470 has essentially the same problems associated with it as does removal of heat of absorption in chamber 1461. For this reason, heat transfer means 1482 are included within chamber 1470. For specificity, these are depicted as being thermally conductive material. In FIG. 57, thermally conductive and insulating materials are appropriately cross-hatched.

The transfer of heat of absorption from chamber 1470 is implemented by the thermally conductive rods 1482. When this heat is delivered to surface 1518 of heat exchange device 1471, it is then available for convective heating of liquid in chamber 1469. This convective heating resembles that in chamber 1475, and for this reason does not require special implementation by means of conductive devices within the liquid itself.

In chamber 1458, provision is made for bleed of fluid through a small port 1491. This port is located on the opposite side of a radial dam near inlet 1517. During start-up, absorber may be located in chamber 1458. The flow pattern established by the dam, inlet 1517 on one side thereof, and outlet 1491 on the other side thereof allows condensate from condenser 1473 entering at outlet 1517 to flush ahead of it the absorbing fluid chamber 1458 through outlet 1491. This clears the chamber. The absorbent moves radially outwardly into chamber 1461, where it mixes with other absorbent fluid, and enters the correct absorbent fluid flow cycle.

The closed cycle device shown in FIG. 57, can be converted to a device with a closed cycle for flow of absorbent fluid and an open cycle for flow of absorbed gaseous working fluid, by breaking the system open at locations 1519 and 1520. This removes from the system chambers 1458 and 1473, and connecting conduit means 1467 therebetween.

Condensing and evaporation chambers 1473 and 1458 are depicted diagramatically. Their configuration can be modified to be appropriate for the heat capacity required and to implement heat exchange, both internally and externally, in order to obtain desired values for thermodynamic impedances Z1454 and Z1457.

A device of the type shown in FIG. 57 can be built fairly simply by dividing the structure axially into laminations, so that conduits either are formed as holes through the laminations, or as slots cut into their surfaces. In the same way, chambers can also be formed. These laminae are then assembled and bonded to form the complete unit. The technique is analagous to the techniques of assembly of conduit and impedance control means from laminations with slots, as is discussed herein below.

When no buffer gas is used in device 5000, the radial difference 1512 and the difference between radii to surfaces 1516 and 1511 support the pressure difference between evaporator 1458 and condensor 1473. This is appropriate with some absorption cycles, such as water and lithium bromide with water vapor, or water and lithium iodide with water vapor. For ammonia and water systems a buffer gas is often convenient, with condensation and evaporation determined by partial pressures of ammonia rather than total pressures. A suitable "rectifier", not shown, as is well known for ammonia and water systems, can be used. However, the countercurrent absorbtion and reevolution process shown in FIGS. 56 and 57 is particularly well suited to absorbtion cycles with a relatively non volatile absorbent, such as a dissolved salt.

IMPEDANCE RELATIONSHIPS IN CASCADED SYSTEMS

Various forms of devices with different flow impedances can be cascaded in series. For instance, if two rotary inertial thermodynamic gaseous compressors with substantially different thermodynamic impedances are cascaded, the result is a device which has the capability of delivering a high forward pressure at low flow and at high flow a relatively lower pressure, without having the rapid dropoff in compression ordinarily associated with a single high thermodynamic impedance device. Such arrangement is shown schematically in FIG. 54. In FIG. 55, line segment 705 corresponds to operation of the high impedance compressor and low impedance compressor in cascade. Line segment 706 corresponds to a flow so large that the heat transfer within the high thermodynamic impedance gaseous compressor is essentially negligible, and essentially all of the compression arises from the performance of the low impedance thermodynamic compressor. Region 707 designates, generally, the changeover between operation of both systems together in cascade and dependence upon the operation of the low thermodynamic impedance compressor for compression. The system referred to is shown schematically in FIG. 54, where $Z_T$ large represents the large thermodynamic impedance gaseous compressor and $Z_T$ small represents the low thermodynamic impedance gaseous compressor. Flow is in the direction represented by arrows 730.

FLOW VELOCITY AND CONTROL

Thus far, in the discussion of gaseous working fluid rotary inertial thermodynamic devices, it has been assumed that the velocity of flow of the working fluid is relatively small compared to the tangential velocity of the rotor at the point at which the flow is measured. When the flow velocity for the working fluid becomes an appreciable fraction, or even larger than, the tangential velocity at any point in the rotor, then additional effects appear which are associated with the coriolis forces. These effects can be utilized to concentrate or distribute the regions in which the gas has a range of temperatures or pressures.

Figure 59:
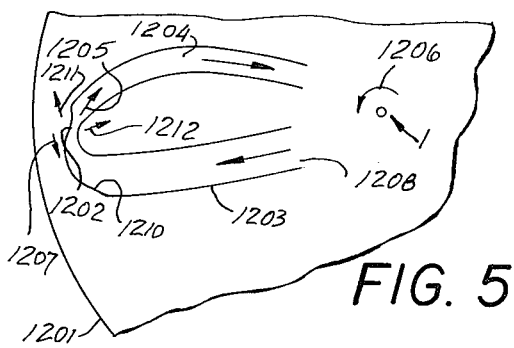

FIG. 59 shows a portion of a rotor 1201 which is part of some rotary inertial thermodynamic device. A conduit 1203–1204 is formed in the rotor 1201. Gaseous working fluid is inlet to conduit portion 1203 at 1208 and outlet from section 1204 at 1209. The rotor 1201 rotates in the direction 1206 about the axis 1. Gaseous working fluid progresses radially outward at a low velocity, through conduit means 1203, passes around a bend 1210 and through a DeLaval nozzle 1202. Upon leaving nozzle 1202 it has a high velocity which is represented by the vector 1205. This velocity vector is directed in such a way that its tangential component 1211 is exactly equal in magnitude and oppositely directed to the tangential velocity 1207 of the rotor at that point. Thus, seen from a non-rotating frame of reference, the gaseous working fluid has left only a radial component 1212. Conduit 1204 is shaped so that as the gas moves radially inward along the direction of its radial component 1212, the conduit moves exactly the amount necessary to make it lie directly in the path of the gas, so that the gas experiences essentially no tangential momentum interaction with the walls of the conduit. Since it experiences no appreciable interaction with the walls, and since it does not experience any change in velocity (except for some frictional effects) in going from the point where it leaves nozzle 1202 to the end 1209 of conduit segment 1204, it must have achieved upon exiting nozzle 1202 the properties which it has upon reaching point 1209. By utilizing this contoured conduit, the properties which the working fluid would ordinarily have only near the center can be extended to a relatively large radial region. This is somewhat more difficult to describe within the rotating frame of reference, but essentially is equivalent to the balancing out of centrifugal and coriolus forces with regard to the flow of gas in the contoured conduit.

If the pressure in the gas at the inlet to nozzle 1202 is high enough, flow through the nozzle will be supersonic and there will be a sharp drop in temperature of the gas at the nozzle exit. Since the shape of the duct 1204 prevents expansion of the gas, it will have the same low temperature all along duct 1204. This is a highly advantageous feature in many applications.

It is not necessary for nozzle 1202 to produce supersonic flow; for many situations it is sufficient that conduit 1204 simply be appreciably smaller in cross-section than conduit 1203, so that the velocity of a subsonic working fluid within it is appreciably higher than it was in section 1203. With such an arrangement, the temperature of the gas in section 1204 also will be relatively low, and will remain substantially constant along the length of section 1204.

Figure 63:
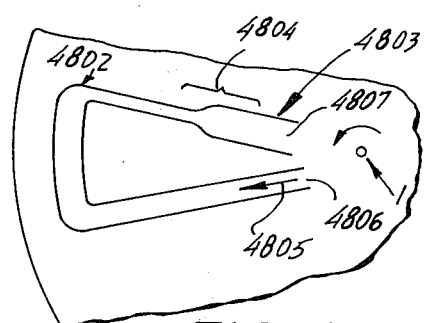

That temperature also can be made uniform along the length of a section by gradually enlarging its cross section so that the Bernouli effect changes the pressure in a way that tends to cancel the centrifugally caused pressure change with radius. In FIG. 63, gas inlet at 4806 progresses radially outward in conduit 4801 in direction 4805, inward in section 4802, 4804 and 4803, leaving at 4807. In region 4804, pressure increase associated with duct cross-section increases balances decrease of pressure with radius, holding the pressure essentially constant.

It is useful to bear in mind, also, in connection with the control of velocity, that the velocity with which a working fluid passes through a conduit affects both the mechanical impedance presented to the working fluid by that conduit, and also the thermodynamic impedance with respect to the transfer of heat into and out of the working fluid. The use of the Bernouli effect, that is, the use of a change in cross-section of a conduit to influence the velocity and pressure of a working fluid flowing therein, is also affected by the location on the rotor. If the effect is used far out from the axis, the working fluid will typically be at a substantially higher pressure.

The use of the coriolis and Bernouli effects allows the distribution of the regions within which the heat transfer can be accomplished, and in which the working fluid has specific temperatures and pressures or ranges of temperatures and pressures. In this way, it can be utilized to affect the design and construction of impedance control means. It, in itself, can be utilized for changing the effectiveness of impedance control means by changing the velocities, pressures, and temperatures of working fluids therein. These effects, in turn, are influenced by the angular velocity with which the rotor is rotated. If the rotor is rotated at a very high velocity, then the coupling between thermal changes in density in the working fluid and mechanical work, in the sense of motion within the rotor, become stronger. If the rotor is rotated at very low angular velocities, this coupling between motion and thermodynamic work becomes smaller.

The use of supersonic nozzles becomes relatively uninteresting when the tangential velocity of the periphery of the rotor is below the sonic velocity in the working fluid used within its conduits. However, at relatively high tangential velocities, supersonic nozzles can be utilized in connection with the Coriolis effect, in the manner discussed in connection with FIG. 59. Moreover, the use of a high molecular-weight gas (e.g., one of the "Freons") as the working fluid can significantly reduce supersonic velocity at which the use of supersonic nozzles becomes interesting. Utilization of Coriolis, Bernouli and centrifugal effects together, is within the scope of the stabilization techniques based upon impedance, that is, slowly perturbed states of such systems will be stable if they satisfy the impedance criteria given previously.

Because the Bernouli effect allows a control of the pressure and temperature of a working fluid passing through a conduit, in addition to affecting its velocity, utilization of the Bernouli effect has as one of its consequences a change in the effective interaction, between heat exchange means of any given temperature and working fluid passing through a shaped conduit with a velocity corresponding to a kinetic energy representing a significant portion of its total energy. This, in turn, affects the temperatures at which the thermal energy is accepted and rejected, which has the effect of varying the thermodynamic impedance of the gas dynamic process occurring within the rotor.

Consider, for example, the exchange of heat with the gas flowing in conduit 1204, under the conditions described in connection with FIG. 59, in which the component of velocity of the working fluid in the radial direction is the only non-zero component seen in a non-rotating frame of reference. In that case, the exchange of heat occurs with a gas having the same properties as would be expected relatively near the axis, but over an area ordinarily not available. Or, suppose, at some intermediate point designated 1213 in FIG. 59, we were to introduce a somewhat smaller area ratio in the shape of a convergent and divergent nozzle, so as to convert the flow, once again, to subsonic velocities. Suddenly, the pressure would increase, as would the temperature. By combinations of these means, intricate rises and falls in temperature and pressure can be achieved at various points in the rotor.

Figure 60:
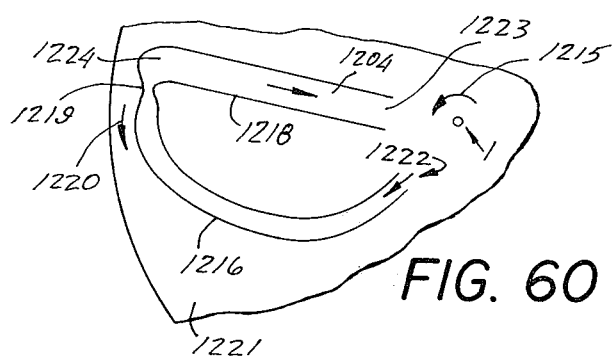

Similarly to a gas progressing radially inward, a gas moving radially outward with a high velocity can be conducted within a specially shaped conduit such that it does not experience centrifugal and Coriolis forces until it is near the periphery of the rotor. Such a specially shaped conduit 1216–1218 in a rotor 1221 is shown in FIG. 60. Rotor 1221 rotates in the direction designated by arrow 1215 about the axis 1. A nozzle 1219 interconnects ducts 1216 and 1218. The tangential velocity of the rotor in the vicinity of nozzle 1219 is designated by vector 1220. Gaseous working fluid is inlet from some other part of the system, not shown, at location 1222. It is outlet to some other part of the system at location 1223. The velocity of the gas as it enters inlet 1222 is entirely radially directed. As the working fluid progresses radially outward, the rotation of rotor 1221 brings each successive portion of conduit 1216 into line with it, so that it is not deflected by the walls. In the frame of reference of a stationary observer, the behavior of the working fluid is as if it were progressing through an essentially straight conduit. The working fluid retains essentially the conditions which it had at inlet 1217 until it reaches the vicinity of nozzle 1219. Suddenly, its temperature and pressure increase drastically as it is impacted against the high pressure gases built up in conduit 1218, near its outer end 1224. This ramming effect does not in any way require that energy be delivered from the mechanism providing for the rotation of the rotor. The angular momentum transferred to the gas upon its sudden passage through nozzle 1219 is redelivered by the gas again as it returns toward axis in the conduit 1218. Effects of this type are most pronounced when the velocity of the gas and the tangential velocity of the rotor are greater than the speed of sound in the gas, because under such circumstances, no acoustic wave propagates backwards from the pressure shock at nozzle 1219 to change the properties of gaseous fluid at the entry 1222.

In addition to the extreme cases discussed in connection with FIGS. 59 and 60 of minimal interaction between the flowing gas and the walls of curved conduits 1204 and 1216, respectively, the principle involved of curving the conduit to use the Coriolis effects to influence the behavior of the gas applies to a much wider range of situations.

Figure 61:
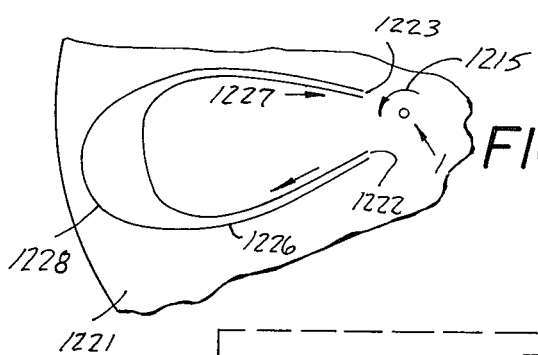

In FIG. 61 is illustrated a conduit similar to that shown in FIG. 60. This conduit has a shape which can be of interest in the case of a relatively lower velocity flow of gaseous working fluid. Conduit segments 1226 and 1227 both are curved to reduce the interaction of working fluid with the walls. A bulge 1228 is provided in the conduit. The bulge reduces the flow velocity and converts kinetic energy of the gas into increases in both pressure and temperature. For this reason, heat can be absorbed in region 1228 from a higher temperature heat source, without irreversible thermodynamic losses, than would be the case if the conduit were of the same cross-section throughout. The cross section of the conduit is then again reduced in conduit segment 1227.

It will be seen from the examples given above that for systems with high working fluid velocities, the various effects associated with the interaction of pressure, temperature, velocity, and rotation, should be treated in considerable detail. In particular, in cases in which supersonic flows are expected to occur, considerable attention should be paid to the stabilization of the shock waves associated with the conversion between subsonic and supersonic, and supersonic and subsonic, flows. By combining these effects, one could, in principle, construct conduits which have properties not unlike those associated with ram jets, in that a supersonic flow would be converted to a subsonic flow at high temperature in order to absorb heat from a high temperature heat source, and then be reconverted to a supersonic flow again at relatively lower temperature. Characterization of the behavior of the heat flows and mechanical flows associated with such types of operation requires a more detailed timedependent analysis then has been presented so far. However, the gross time independent features of steady state operation should display the characteristic impedance properties discussed already, in connection with systems involving lower velocity flows.

THERMODYNAMIC TRANSFORMER

The considerations of thermodynamic impedance and efficiency can be illustrated in a fairly simple example of a thermodynamic transformer. There are many processes in which a mechanism by which useful work is done has associated with it, intrinsically, a small temperature difference. In order to do useful work, a large amount of heat has to be transported thrugh this temperature difference. An excellent example of this is the purification of water by evaporative transport. This can be utilized in desalination of sea water, and also in the treatment of sewage. In both cases the distilled water is a useful product, and the concentration of the brine remaining, or of the sewage slurry remaining, requires the performance of thermodynamic work. However, for a variety of practical reasons the maximum input temperature at which such systems conventionally operate is approximately the boiling point of water, about 100° C. The minimum temperature at which heat is rejected to the environment typically is approximately the temperature of the inlet or outlet fluids, typically in the neighborhood of 20° C. For this reason, the absolute thermodynamic efficiency of the entire process, viewed as a Carnot cycle, is relatively low.

One useful way to raise the efficiency of the process would be to allow the entire thermodynamic process to accept heat efficiently from a higher temperature input. To this end, a rotary inertial thermodynamic compressor can be utilized in a heat transport system acting as a thermodynamic "transformer". In such a system, a small amount of heat is utilized in a rotary inertial thermodynamic gaseous compressor to actuate the transport of a large amount of working fluid over a relatively low pressure differential. The working fluid is raised to a sufficiently high pressure so that it will condense slightly above the temperature required for input to the small temperature difference thermodynamic process. The working fluid, after condensation, passes through a suitable expansion valve mechanism and is then evaporated at a slightly reduced pressure, so that it evaporates slightly below the temperature at which the thermodynamic process rejects heat. In this way, the overall effect is to use a small amount of heat flowing through a large temperature difference, (starting at the input to the gaseous compressor), to move a large amount of heat associated with the condensation and evaporation of the working fluid through the small temperature difference appropriate to the performance of the thermodynamic work required. This is the "transformer" action referred to above.

Figure 62:
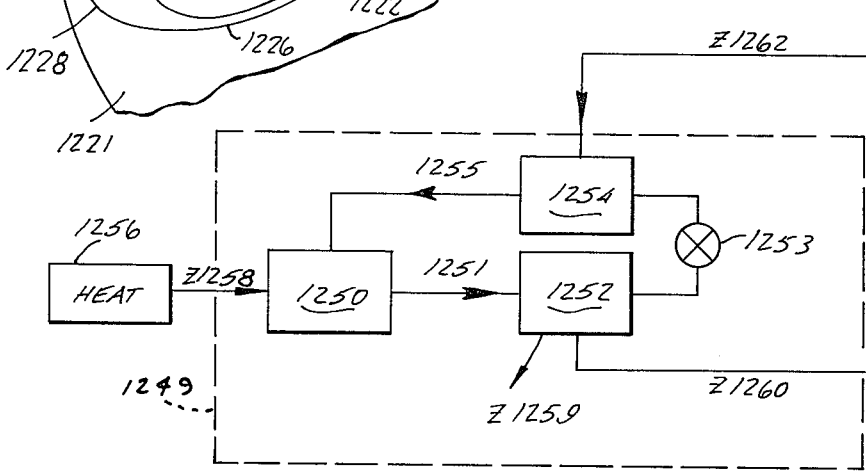

FIG. 62 shows schematically a rotary inertial thermodynamic transformer 1249 of the type described above. The transformer 1249 includes a rotary inertial thermodynamic gaseous compressor 1250 actuated by a heat source 1256 through a thermodynamic impedance Z1258. Working fluid is outlet from the compressor 1250, in the direction of arrow 1251, to a condensor 1252. From condenser 1252 the heat of condensation is delivered through two impedences, Z1259 which could be a very small load or zero laod, (i.e., high or infinite impedance) which is presumed to be heat rejected from the system entirely; and Z1260, which delivers the heat to a load 1261 requiring a small temperature difference. The load 1261 can be, for example, the evaporator and condenser of a conventional "flash" evaporation desalination plant. Outlet of heat from load 1261 is through two impedances. One of them is an impedence by which heat can be rejected from the system Z1263. The other is for the rejection of heat to the evaporator 1254, through an impendence Z1262.

Liquid working fluid flows from condenser 1252 through flow control means 1253 into evaporator 1254. Within the evaporator it evaporates, absorbing heat from the load 1261. Vapor form working fluid proceeds in the direction shown by arrow 1255 and reenters compressor 1250. For many applications, for example, desalination of water or purification of sewage, it would be desirable to make Z1259 an essentially negligible loss of thermal energy, and use Z1263 as a heat source for the operation of a cascaded evaporative transport or other thermal purification plant. Alternatively, the process of laod 1261 can represent evaporation across a single-stage still, utilizing the impendence conversion in the system as a whole to allow the process to accept heat efficiently from a high temperature heat source.

Preferably, the condenser 1252 and evaporator 1254 are stationary. 1265 represents some thermodynamic process running on rejected thermal energy, rejected from the process of laod 1261 through an impedence Z1263. For example, if load 1261 is the first stage of an evaporative transport purification plant, subsequent stages might be operated from the waste heat therefrom. In that case, 1265 would denote the thermodynamic process of the evaporative purification plant following the first stage. Such a plant, by the laws of thermodynamics, must reject heat to its environment, and the impedace though which it is rejected is desingated Z1264.

Stabilization of the operation of a system of this type depends upon making the flow through the total system have a positive impedance slope. This can be achieved by manipulation of impedance Z1258 and, in general, would occur if high-impedance heat source were used. Most of the heat sources of interest for actuating such treatment systems have the characteristic desired. These include combustion of fuel, nuclear sources,and solar energy sources.

For purposes of comparison, the maximum Carnot cycle efficiency which can be obtained, accepting heat at 100° C., are rejecting at a 20° C., is roughly 22 percent. The maximum Carnot cycle efficiency which can be achieved in a rotary gaseous compressor is appreciably greater than that. This allows a substantial increase in overall operating efficiency. A second characteristic of a transformer system of this type is that it does not require the utilization of a large number of cascaded evaporation stages to achieve its high efficiency. Therefore, the way in which efficiency is related to size of plant is not the same as it is for a conventional cascaded flash evaporation plant. A unit of this type can remain efficient even in relatively small sizes, utilizing an impedance matching system of this type for accepting heat from a high impedance source, efficiently for operating a low impendence thermodynamic load. With the transformer of the present invention, one can achieve a relatively quite large heat pumping ratio, that is, the amount of heat transported betwen condensor 1252 and evaporator 1254 can be many times the amount of heat transported from heat source 1256 to the external heat rejection point through impedances Z1259 and Z1263.

In the case of purification of salt water or sewage, the external heat sink can be the effluent from the plant, be in the purified material or the rejected concentrated impurities; that is, such materials can have somewhat higher temperature than those with which they entered the plant, the heat is rejected by this means and no special heat sink is required.

There are many low-grade heat processes in which this transformer can be used. For example, the concentration of alcohol, purification of water by freezing and/or clathrating, and the operation of distillation plants and related vapor transport purification processes. These processes are amenable to this type of thermodynamic impedance machine, which would allow them to be operated with higher efficiency from heat sources having characteristically high temperatures and thermodynamic impedances.

A thermodynamic transformer of the type shown in FIG. 62 is particularly attractive in the use of freezing or clathrate formation as a purification technique. It is a technique which requires a relatively small temperature difference, but which requires that temperature difference in a temperature domain not lending itself to operation directly in cascade form from a heat source. For this reason, fairly intricate systems typically are required to provide efficient operation in an ice type of water purification plant. Also, processes involving the utilization of differential solubility of one material in another for purifications typically can benefit from the availability of a large volume of heat flowing across a small temperature differential.

A transformer system of the type shown in FIG. 62 can also be used advantageously for the heating and cooling of large buildings and other types of installations utilizing the external environment as a heat source and/or heat sink. When used for such an application, a system of this type offers great flexibility in that the heat pumping ratio, defined as the amount of heat transported divided by the amount of heat drawn form the heat source, can be varied to take advantage of the operating conditions so as to always operate with high thermodynamic efficiency. Thus, if there is a small difference between the external environmental temperature and the desired temperature within an enclosure, the heat pumping ratio can be made very large. This allows a considerable saving in operating energy. This kind of flexibility is relatively difficult to obtain using existing absorption cycle systems or steam ejector type of systems. Very high heat pumping ratios are theroretically feasible. Moreover, high thermodynamic efficiency could be maintained over a relatively wide range of heat pumping ratios.

LOW LOSS REFRIGERATOR

Figure 64:
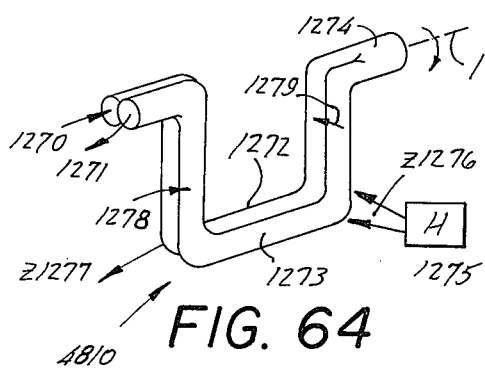

By utilizing a gaseous compressor and a gaseous expansion type refrigerator, one operating the other and coupled together thermodynamically with the other, it is possible to achieve a system which has a relatively low loss, so as to maintain an isolated region at relatively high pressure while permitting working fluid to flow into it and out from it. FIG. 64 shows such a system. In FIG. 64 the axis of rotation is 1. Working fluid enters at inlet 1270, passes through compressor 1272 into the high-pressure region 1274, thence through refrigeration-type heat pump 1273, and out at the outlet 1271. The temperature differences for operation of both the compressor 1272 and the refrigerator 1273 are maintained by the heat flow from heat source 1275 through impedance Z1276 into the devices, and out therefrom to a heat sink in the external environment through impedance Z1277. Heat flow between devives 1273 and 1272 is indicated by arrows 1278 and 1279. Because of the thermodynamic reversibility of the gaseous compression and refrigeration processes, device 4810 can equivalently be thought of as two gaseous compressors back to back, with the high pressure region 1274 between them. What is illustrated is the simplest case, a single stage. By utilizing a large number of stages in cascade, with half the stages operating in the forward direction, followed by a high pressure region, followed by the other half of the stages operating in the reverse direction, it is possible to achieve in the high-pressure region extremely high internal pressures and yet have relatively free flow of working fluid into and out of that region.

Such a process is interesting for use in chemical reactions, for example, for the production of ammonia, in which the utilization of a high pressure permits the equilibrium point for the chemical reaction to be appreciably shifted in the direction of the desired product. It is important, for an application of this type, that the compression and expansion portions of the system be in intimate thermal contact with each other. Thermal losses, in transferring heat from one to the other, give rise to effective pressure losses which must be overcome in maintaining the pressure. The source of energy for overcoming these losses is the flow of heat source to some heat sink. It is not necessary for the heat sink to be external to the device, provided that there is some way for working fluid to carry off that heat, which, by the laws of thermodynamics, must be rejected to the environment.

COMPRESSOR STRUCTURES

FIGS. 65 and 66 show a desirable form of construction for rotary inertial thermodynamic gaseous compressors. FIG. 65 is an exploded view of the compressor. In FIG. 65, 920 and 922 are impermeable plates made, for instance, of a suitably thermo-conductive material, such as aluminum or some other metal, or beryllium oxide. Core 921 is a circular disc made of a thermally insulating material, for example, a foamed epoxy resin formed as a syntactic foam, a polystyrene foam, or any other suitable insulating material. Into this material are formed slots, 923, 924 (FIG. 66) on opposite faces of the disc. Only a small number of slots are shown in FIG. 66, for the sake of simplicity. Actually the slots extend completely around the periphery of the disc 921.

Holes 926, 927, 929, etc., are provided in the disc 921 at the ends of the slots 923 and 924. This connects one end of a slot 923 with one end of a slot 924 on the opposite side, and the other end of slot 924 with one end of the next upper slot 923, and so forth around the disc 921. Face plates 920 and 922 are bonded to core 921, thereby closing the open faces of the slots formed therein and forming closed conduits suitable for carrying working fluid in a spiral path like that illustrated in FIGS. 12 and 13. Selected slots extend radially inward and connect with apertures in face plates 920 and 922 to serve as inlets and outlets. In FIG. 65, the aperture is designated 925 and the radially-extended slot connecting thereto is designated 930. Construction in this form has several advantages. First, plates 920 and 922 can be formed by simple stamping. Core 921 carries essentially all of the shaped structure defining the flow conduits. This piece can be formed simply by molding. With this construction technique, the number of parts used to form the assmbled rotary inertial thermodynamic gaseous compressor can be essentially independent of the complexity of the flow paths for the working fluid within. The device can have many parallel branches, and can have many stages in each branch. The conduits can be made shallower and deeper, they can be curved, they can have recesses left within them to accept heat exchange means, magnetic drag means, electromagnetic heat absorption means, radioisotope heat production means or other appropriate mechanisms or structures suitable for the stable operation of the rotary inertial thermodynamic gaseous compressor.

In a rotary inertial thermodynamic gaseous compressor formed of three layers (as shown in FIGS. 65 and 66) the two lids can be utilized as heat exchange surfaces, with one maintained at a relatively high temperature from which the internal processes absorb heat, and the other maintained at a relatively low temperature to which the internal processes reject heat, in the maner illustrated in FIGS. 12 and 13. In this way, thermodynamic connections for heat transfer with the various impedance control means within the conduits within such an assembly become relatively simple. A particularly desirable form of impedance control means is a set of finely spaced finely spaced fins which desirably are formed as part of the lids. For example, fins 1552 on lid 920 fit into the ducts when the device is assembled. External fins 1553 can be formed in the same way, in a single process if desired. The sealing properties and most of its structural properties are determined by the assembly of the three layers 920, 921 and 922. The shaft passes through a hole 931 in the assembled device. Alternatively, the device can be supported by hubs, or by assembly to some other rotating member. Optionally, the device can be sealed using a conventional type of can seal 1550 near the periphery, formed with extension 1550 of plate 920.

In FIGS. 67 and 68 is shown an alternative form of construction for gaseous compressor utilizing laminations assembled to each other to form ducts. In these FIGS. 1001 designates a molded body of insulating material bearing grooves 1009 which, when covered by a lid 1008, form conduits. In FIG. 67, these conduits, sections of which are 1002 and 1003, are seen to contain appropriate impendance control means 1004, 1005 and 1007 (e.g. heat exchangers as shown in FIGS. 39 and 40). A central hole for a shaft is designated 1006. Selected portions of the lid 1008 or core 1001 can be made thermally conductive to facilitate transfer of heat into or out of impendence control means, as appropriate.

FIG. 69 shows a preferred gaseous compressor construction utilizing lamination techniques. Laminates in the form of discs 510, 511, 512, 513, 514, 517, 518, 519, 520, 521 and 522, together with a core 516, form the conduits for conveying working fluid, and also the impendance control means operative therein. This is illustrated in section 70—70, (FIG. 70) in which can be seen holes 532 and 533 through core 516 for conveying working fluid into and out of impedance control means 520 and 531. The impedance control means is constructed by forming elongated, tapered slots in one half of the discs, and forming half-moon-shaped slots in the other half of the discs. Holes 532 and 533 are formed in the core 516. The discs are assembled with discs having half-moon slots alternating with those having elongated slots, thus forming thin flow passageways through which the working fluid can flow.

FIG. 70 shows that the slots are canted at an angle with respect to radii of the disc, so that when two stacks of the discs are formed, one group of slots "stage" or move over by one increment, and the facing slots stage over by the remaining portions of the increment necessary to complete an entire step, so that the fluid flow first through one conduit, through core 516, then through the conduit in the opposite stack, through the core again, and then on to the next stage of the conduits in the first stack. In this way, a large number of stages can be cascaded in a manner analogous to that utilized with a molded core and discussed in connection with FIGS. 65 and 66.

In a similar manner, laminations 526 can be seen in FIG. 71 to form an external set of heat exchange fins. Alternate ones of these fins have apertures extending out from the center, or extending in from the edge. This leaves a set of blades of the type 540, and a set of apertures of the type 539, such that it is possible for air to circulate through the stack. Dotted lines 538 and 537 denote the hidden edges of a set of apertures hidden behind blade 1300. In this way, stack 536 becomes a set of heat exchange fins for coupling heat to the external environment, in this case for rejection of waste heat thereto. Apertures 544 are inlets within intake manifold 508, allowing working fluid to flow into the multiple branches of the parallel-branched gaseous compresseor shown in FIG. 69.

Referring again to FIG. 69, 542 is a shaft. Bearings are at 507 and 524, rotary gas seals are at 501 and 525. Sheaves 503 and 505, belt 504, and motor 506, serve to rotate the rotary device. Outlet manifold 523 is illustrated diagrammatically in FIG. 72. In FIG. 72, 1301 is the wall of the manifold, 1302 denotes generically the outlet ports from the various branches of the parallel-branch compressor. 1303 denotes a few of the flap valves utilized to make the operation of this gaseous compressor unconditionally stable.

In FIG. 69, 527 is an anular baffle, utilized in conjunction with burner 528 with the inlet 529 to provide heating for the gaseous compressor. An assembly of this type can be formed from a simple stampings. The various laminations can be joined to each other using adhesives or other techiniques. For example, if the laminations are formed from titanium, or a number of other suitable materials, they can be diffusion bonded into a hermaticaly sealed stack. In order to avoid the possiblity of leakage at a large number of external seals, it is possible to use a thin outer wall 1304 formed by bringing lamination 510 past the thickness of the compressor to make a single seal, e.g. a conventional type of can seal, at location 1305. Although this is shown at just one location it is presumed to extend entirely around the periphery of the gaseous compressor device, and form a can having a single seal at the periphery. In this way, the reliability of the sealing of such a device can be greately improved, if desired. Inlet to the entire device is at 1306. Outlet from the entire device is at 1307. Flow is in the direction designated by arrow 1308. There are many ways in which devices of this type can be fabricated. For instance, when a lid is formed it can be formed bearing the necessary heat exchange devices upon it, in a single operation. Such variations of that type are within the scope of the analytic technique and principle of impedance control for stabilization.

WORKING FLUIDS

It is to be understood that the working fluid utilized in a rotary inertial thermodynamic device does not have to be of a single type, such as a gas or a liquid. It is possible to utilize the thermodynamic properties of aerosols, so as to delimit in a specified way magnitude and nature of the temperature dependance upon pressure during compression and during expansion.

INTERNAL REACTION FORCES FOR ROTARY DRIVE

In my copending application, I have described various ways in which a closed loop rotary inertial thermodynamic device can be caused to provide its own rotation. Quite generally, a rotary inertial thermodynamic compressor can be used to actuate a relative motion within a rotating device, which relative motion can be caused to rotate, or contribute to rotation of, the rotating device.

One way to do this is to allow a moving working fluid within the rotating device to react against a stationary piece, held stationary by some suitable means, such as a magnet, or gravity. The stationary piece does not have to be balanced, and a large amount of wear can be tolerated in its support bearing. In FIG. 74 is diagrammed such means for rotating a device. 1731 is any suitable rotary inertial thermodynamic compressor, in this case a gaseous device with one stage. 1730 denotes generally a rotary drive device, including chamber 1737, inlet tube 1732, jet nozzle 1733, stationary magnetic material bar 1735 mounted to rotate on shaft segment 1736 by means of bearing 1738, outlet 1739, and magnet 1734. Bar 1735 is kept from rotating by magnet 1734. Compressor 1731 is assumed connected to a larger system, not shown.

High pressure gaseous form working fluid is bled from compressor 1731 at location 1741, through conduit 1732, to produce a stream of high speed jet of gas flowing from nozzle 1733 into chanber 1737. Nozzle 1733 is directed tangentially, backwards from the direction of flow. The reaction force from the gas drives the nozzle backwards, rotating the rotary device. The equal and opposite reaction occurs when the swirling gas in chamber 1737 strikes stationary bar 1735, which in turn transmits this reaction force to magnet 1734, thus removing the opposted reaction force form the rotary device. Thus, the reaction force against jet nozzle 1733 has no counterbalancing force within the rotary device, and so produces a net torque to rotate it. Note that even relatively severe wear of bearing 1738 has little effect on performance of the rotary drive device. The stationary piece can be extended, with magnets placed symmetrically about it, so that essentially no component of the magnetic force appears as a load on the bearing. Alternatively, in chamber 1737 can be located a balanced magnetic rotor, spun in the reverse sense to the direction of rotation of the larger rotary device, and serving as the rotor of an electric generator, whose stator is approximately placed outside chamber 1737. Electric power production in the generator gives rise to a magnetic drag on the magnetic rotor, consuming the reaction forces from the gas whirling in chamber 1737, and thus serving the same purpose as bar 1735 with magnet 1734.

From rotary drive 1730 and modification for use as a generator, one can proceed by simple steps to the incorporation of elabrorate mechanical devices within the rotary device, operated with working fluid compressed by a rotary inertial thermodynamic compressor. As long as coupling is provided to allow reaction forces to leave the rotating devices, a driving effect can be achieved. Of course, the use of working fluid for such purposes must be included in determining the impedance into which the compressor will have to deliver working fluid, and, consequently, the mechanical and thermodynamic impedances throughout the compressor. The ability to use a stationary "rotor" in a turbine or similar device operating within a rotary device can greatly simplify the stationary "rotor". For example, it can be unbalanced. Also, the life of bearings inside the rotary device, used to support stationary parts within it, can easily be made quite long. Thus, their relative inaccessability, compared to external bearings, is not a severe handicap. The definition of failure of such bearings is also often much less stringent, because of the relative absence of wear-induced wobble.

A secondary pump means can be used to compress a working fluid which does not necessarily condense within the rotary interial device. In FIG. 73 is illustrated such a rotary inertial thermodynamic device, 1720. In device 1720, 1700 is the inlet, 1714 the outlet, 1704 denotes generally a secondary pump means actuated by rotary inertial compressor 1725, in this example including nozzle 1702 and diffuser 1703; condensor 1705, evaporator 1708, rotary inertial trap 1707, heat source 1711. Gaseous working fluid A enters at 1700 in direction of arrow 1701. It is compressed in secondary pump 1704, in which it mixes with vapor form working fluid B, which enter condensor 1705 in the direction of arrow 1715. In condensor 1705, vapor B condenses, giving up its heat of condensation through thermodynamic impedance 1712 to a heat sink not shown, flows radially outward into trap 1707, filling it to some radius 1706. Liquid B proceeds in direction of arrow 1719, entering chamber 1708 to form annular pool 1709. Liquid B is vaporized by heat from heat source 1711 through impedance Z1710, returning through conduit 1723 to actuate secondary pump means 1704. Difference in radial location 1722 of liquid surfaces 1718 and 1706 is associated with operation of device 1721 as a compressor, as in FIG. 26. Uncondensedd working fluid A leaves device 1720 at 1714 in direction of arrow 1713. Devices of this type can be combined, with a cooling device with shared condensors, as shown in my copending application. Used separately, a device 1720, with suitably designed secondary pump means, can be used as a vacuum pump, compressor, etc. Inlet 1700 and outlet 1714, of course, do not have to be on axis 1. Stable operation of a device of this type depends on stable operations of its rotary inertial thermodynamic portion, and thus on the mechanical and thermodynamic impedances of the device and the total system of which it is a part.

As can be seen from FIG. 26, it is important in the design of heat exchange chambers to consider the tendency of liquid to move radially outward. For this reason, it is highly desirable that ports for gas inlet and outlet be located radially inward from those through which liquid passes. This same design consideration applies to the details of heat exchange means and, more generally, impedance control means. Following this design practice avoids unwanted back-pressures and thermodynamic inversibilities associated with forcing a gas to bubble radially inward through a liquid.

GENERAL ANALYTICAL MODEL OF SYSTEM

FIG. 75 shows schematically the analytic strucure of a rotary inertial thermodynamic system, identified by its acronym "RITS" in FIG. 75. The system is depicted as including a rotary inertial thermodynamic device 1350, (designated RITD) having within it internal mechanical impedances designated generally by $[Z_M \text{ INT}]$ to denote that there can be a plurality of such impedances and internal thermodynamic and impedances designated $[Z_T \text{ INT}]$ a geometric configuration represented by G. Input to this system is an angular velodity designated W, and operating in conjunction therewith are mechanical impedances external to the device and thermodynamic impedances external to the device, designated generically $Z_M$ EXT. and $Z_T$ EXT., respectively. The performances of the rotary inertial thermodynamic device is affected by all of these impedances. The conditions set forth in this patent application are appropriate for the analysis of all rotary inertial thermodynamic systems of this general form. A number of selected examples have been given in the disclosure in order to show the generality of the method of analysis, and illustrate ways in which they can be applied in specific cases. The applications in these cases serve also to illustrate the great advantages which rotary inertial thermodynamic systems possess for a wide variety of applications of practical importance.

It is to be understood that although specific details have been described in the context of examples, the various features disclosed herein can be used in combination with each other and can be extended in ways which will be apparent to workers in the field, without departing from the technique of stabilization of flow of working fluid within a rotary inertial thermodynamic device by controlling its internal and external mechanical and thermodynamic impedances.

I claim:

1. A rotary thermodynamic system including a rotatable fluid flow conduit having radially outwardly-directed and inwardly-directed sections in which conduit the thermodynamic pressure drop decreases with an increase in the rate of flow of working fluid through said system, and impedance control means for providing an increase of pressure drop for an increase in the rate of flow of working fluid through said conduit, the amount of said increase in pressure drop being effective to cause the overall pressure drop for said system to increase with an increase in said rate of flow, and thereby stabilizing the flow of working fluid through said conduit.

2. A system as in claim 1, said impedance control means including means for controlling the heat exchange between said rotary thermodynamic device and the environment.

3. A system as in claim 1 including heat exchanger means providing multiple heat conducting surfaces in said conduit.

4. A system as in claim 1 in which said rotary thermodynamic device has a plurality of said conduits connected in parallel, and a flow-restricting heat exchanger in each of said conduits.

5. A system as in claim 3 in which said impedance control means includes means for controlling the mechanical impedance to fluid flow in said system.

6. A system as in claim 5 in which said system includes a positive-displacement pump for pumping working fluid through said conduit.

7. A system as in claim 6 in which said pump is a reciprocating piston pump.

8. A system as in claim 6 in which said pump is a sliding vane pump.

9. A system as in claim 1 in which said impedance control means includes means for controlling the thermodynamic impedance of said system.

10. A rotary thermodynamic system including a rotatable fluid flow conduit having radially outwardly-directed and inwardly-directed sections, impedance control means for providing an increase of pressure drop for an increase in the rate of flow of working fluid through said conduit and thereby stabilizing the flow of working fluid through said conduit, heat exchanger means in said conduit, said heat exchanger means comprising at least one group of parallel contiguous tubes forming in said conduit plural flow passageways each of a cross-sectional area smaller than that of said conduit.

11. A system as in claim 10 in which said tubes are substantially polygonal in cross-sectional shape.

12. A system as in claim 10 in which said tubes have a wall thickness which is smaller near the center of said conduit than it is adjacent the walls of said conduit.

13. A method of stabilizing the operation of a rotary thermodynamic system including a rotatable fluid flow conduit with radially outwardly-directed and inwardly-directed sections, there being a decrease in the pressure drop in said conduit with an increase in the rate of flow of working fluid through said conduit, said method comprising controlling the flow impedance in said system so that there is an increase in pressure drop for an increase of the flow rate of working fluid through said system, said increase being greater than said decrease so as to give said system an overall pressure drop which increases with increases in said flow rate.

14. A method as in claim 13 in which said controlling step comprises controlling the thermodynamic impedance of said system.

15. A method as in claim 13 in which said controlling step comprises controlling the mechanical impedance to fluid flow in said system.

16. In a rotary thermodynamic device having a plurality of parallel-connected conduits, each having a first section extending outwardly from a common rotational axis, and a second section extending inwardly towards said axis, rotary drive means for rotating said conduits about said axis, means for extracting heat from a working fluid flowing outwardly through each of said outgoing sections, means for pumping said working fluid outwardly from said axis through each of said outgoing sections and inwardly towards said axis, the back-pressure of said working fluid in said inwardly-extending section due to the action of centrifugal force being greater than the forward pressure of said fluid in said outgoing section due to centrifugal force, the difference between said forward and back pressures being called the thermodynamic pressure drop, said thermodynamic pressure drop decreasing with increasing flow rate through said conduits, and means for restricting the cross-sectional areas of said conduits in an amount effective to give an overall increase in the total pressure drop in the fluid with increasing rates of flow.

17. In a rotary thermodynamic device having at least one fluid flow conduit having a first section extending outwardly from a common rotational axis, and a second section extending inwardly towards said axis, rotary drive means for rotating said conduits about said axis, means for pumping said working fluid outwardly from said axis through said outgoing section and inwardly towards said axis, the back-pressure of said working fluid in said inwardly-extending section due to the action of centrifugal force being greater than the forward pressure of said fluid in said outgoing section due to centrifugal force, the difference between said forward and back pressures being called the thermodynamic pressure drop, said thermodynamic pressure drop decreasing with increasing flow rate through said conduits, and impedance means for partially blocking the flow of fluid through said conduit and thereby increasing the mechanical impedance to flow through said conduit in an amount effective to give an overall increase in the total pressure drop in the fluid with increasing rates of flow.

18. A device as in claim 17, in which said impedance means comprises a heat-exchanger with at least one passageway of cross-sectional area substantially smaller than that of said conduit.

19. A device as in claim 18 in which said heat-exchanger has a plurality of said passageways.

* * * * *